(12) United States Patent
Hankins et al.

(10) Patent No.: US 9,659,270 B2
(45) Date of Patent: *May 23, 2017

(54) SUPPLEMENTAL SYSTEM FOR BUSINESS INTELLIGENCE SYSTEMS

(71) Applicant: Motio, Inc., Dallas, TX (US)

(72) Inventors: Lance W. Hankins, Allen, TX (US); Roger P. Moore, Dallas, TX (US)

(73) Assignee: Motio, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,437

(22) Filed: Mar. 21, 2016

(65) Prior Publication Data

US 2016/0203426 A1 Jul. 14, 2016

Related U.S. Application Data

(63) Continuation of application No. 14/147,416, filed on Jan. 3, 2014, now Pat. No. 9,292,822, which is a continuation-in-part of application No. 13/369,210, filed on Feb. 8, 2012, now Pat. No. 8,972,349, which is a continuation of application No. 12/982,560, filed on Dec. 30, 2010, now Pat. No. 8,140,477, which is a continuation of application No. 11/324,603, filed on Jan. 3, 2006, now Pat. No. 7,885,929.

(60) Provisional application No. 61/856,569, filed on Jul. 19, 2013.

(51) Int. Cl.
*G06F 17/00* (2006.01)
*G06Q 10/06* (2012.01)
*G06F 9/44* (2006.01)
*G06F 11/36* (2006.01)
*G06F 17/22* (2006.01)
*G06Q 10/10* (2012.01)

(52) U.S. Cl.
CPC ............. *G06Q 10/067* (2013.01); *G06F 8/71* (2013.01); *G06F 11/368* (2013.01); *G06F 17/2288* (2013.01); *G06Q 10/0637* (2013.01); *G06Q 10/10* (2013.01); *Y10S 707/944* (2013.01)

(58) Field of Classification Search
CPC ...... G06F 8/71; G06F 11/368; G06F 17/2288; G06Q 10/10; G06Q 10/067
USPC ......................................... 707/638, 695, 944
See application file for complete search history.

(56) References Cited

U.S. PATENT DOCUMENTS

| | | | |
|---|---|---|---|
| 6,539,396 B1 * | 3/2003 | Bowman-Amuah | G06F 17/30607 707/769 |
| 6,542,841 B1 * | 4/2003 | Snyder | H04B 10/0795 372/26 |
| 7,505,991 B2 * | 3/2009 | Fifield | G06Q 10/00 707/999.103 |
| 7,930,149 B2 * | 4/2011 | Haag | G06Q 10/087 700/97 |
| 7,945,589 B1 * | 5/2011 | Weiss | G06F 8/38 707/795 |
| 2002/0198868 A1 * | 12/2002 | Kinzhalin | G06F 11/3672 714/E11.208 |

(Continued)

*Primary Examiner* — Phong Nguyen
(74) *Attorney, Agent, or Firm* — Ferguson Braswell Fraser Kubasta PC; Elizabeth Philip Dahm; Kelly J. Kubasta

(57) ABSTRACT

In various implementations, a supplemental system may be provided. The supplemental system may be coupled to business intelligence environment(s) to facilitate deployment, version control, testing, and/or other processes.

20 Claims, 21 Drawing Sheets

(56) References Cited

U.S. PATENT DOCUMENTS

| | | | |
|---|---|---|---|
| 2003/0050886 A1* | 3/2003 | Cohen | G06Q 10/06 705/37 |
| 2003/0204835 A1* | 10/2003 | Budhiraja | G06F 8/71 717/120 |
| 2004/0168115 A1* | 8/2004 | Bauernschmidt | G06F 17/2241 715/238 |
| 2005/0071390 A1* | 3/2005 | Midgley | G06F 11/1451 |
| 2005/0229159 A1* | 10/2005 | Haba | G06F 11/368 717/122 |
| 2006/0075114 A1* | 4/2006 | Panasyuk | H04L 67/28 709/227 |
| 2006/0235732 A1* | 10/2006 | Miller | G06Q 10/06 705/7.23 |
| 2006/0277155 A1* | 12/2006 | Bell | G06F 9/5077 707/E17.032 |
| 2007/0033212 A1* | 2/2007 | Fifield | G06Q 10/00 707/999.102 |
| 2007/0038683 A1* | 2/2007 | Dixon | G06Q 10/10 707/E17.005 |
| 2007/0038977 A1* | 2/2007 | Savage | G06F 8/20 717/106 |
| 2007/0061154 A1* | 3/2007 | Markvoort | G06F 17/50 705/51 |
| 2007/0067254 A1* | 3/2007 | Chen | G06Q 10/10 707/999.001 |
| 2007/0106982 A1* | 5/2007 | Dalal | G06F 8/71 717/128 |
| 2007/0192113 A1* | 8/2007 | Sadowski | G06Q 10/06 705/1.1 |
| 2007/0294321 A1* | 12/2007 | Midgley | G06F 11/1451 707/E17.007 |
| 2008/0288451 A1* | 11/2008 | Jiang | G06F 17/30415 707/999.003 |
| 2010/0306782 A1* | 12/2010 | Engrand | G06Q 10/10 719/312 |
| 2013/0097585 A1* | 4/2013 | Jentsch | G06F 8/71 717/122 |
| 2013/0262419 A1* | 10/2013 | Kilian | G06F 17/2705 707/695 |
| 2014/0365519 A1* | 12/2014 | Middelfart | G06F 17/30477 707/769 |

* cited by examiner

200
LABEL A, V1
R1, V2 ←—210
R2, V1 ←—220
R5, V5 ←—230
Property Set, V2 ←—240

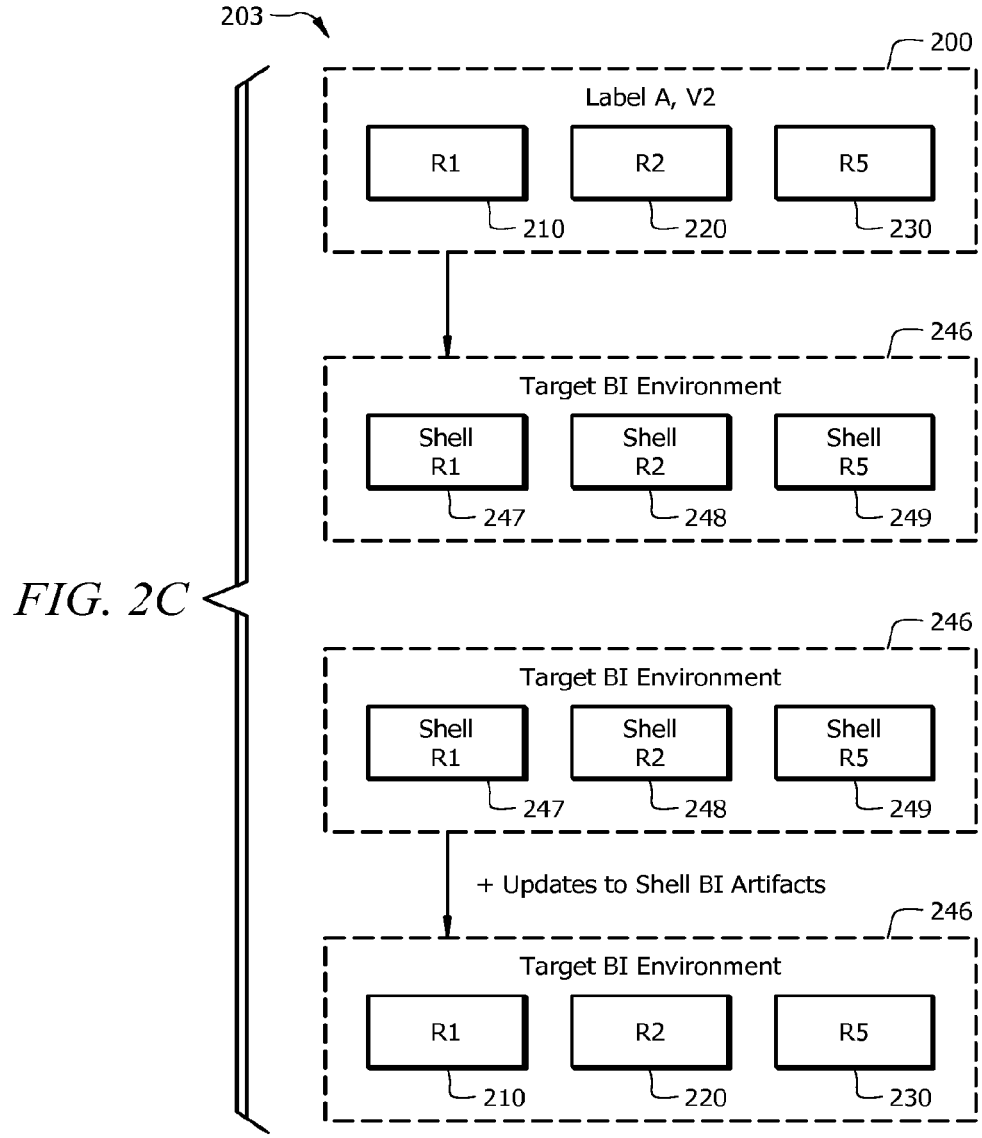

SUPPLEMENTAL SYSTEM FOR BUSINESS INTELLIGENCE SYSTEMS

CROSS-REFERENCE TO RELATED APPLICATIONS

This application is a continuation of U.S. patent application No. 14/147,416, which was filed on Jan. 3, 2014 and will issue on Mar. 22, 2016 as U.S. Pat. No. 9,292,822 and is entitled "Supplemental System for Business Intelligence Systems," and which claims priority to and the benefit under 35 U.S.C. §119(e) of U.S. Provisional Patent Application No. 61/856,569, entitled "Supplemental System for Business Intelligence Systems," filed on Jul. 19, 2013, all of which are hereby incorporated by reference for all purposes. U.S. patent application No. 14/147,416 is also a continuation-in-part of U.S. patent application No. 13/369,210, entitled "Continuous Integration of Business Intelligence Software,"filed Feb. 8, 2012, and is a continuation of U.S. patent application No. 12/982,560 now issued as U.S. Pat No. 8,140,477, entitled "Continuous Integration of Business Intelligence Software,"filed Dec. 30, 2010, which is a continuation of U.S. patent application Ser. No. 11/324,603now issued as U.S. Pat. No. 7,885,929, entitled "Continuous Integration of Business Intelligence Software," filed Jan. 3, 2006, all of which are incorporated by reference herein for all purposes. This application is also related to U.S. patent application Ser. No. 12/982,620 now issued as U.S. Pat. No. 8,285,678, entitled "Continuous Integration of Business Intelligence Software,"filed Dec. 30, 2010, which is incorporated by reference herein for all purposes.

TECHNICAL FIELD

The present invention relates to business intelligence systems.

BACKGROUND

As companies continue to collect a wide variety of data, business intelligence systems may be utilized to evaluate the collected data. Business intelligence systems can collect and analyze data to provide historical information, current operational information, and/or predictive information. For example, a business intelligence system may be utilized in data mining analyses to facilitate business decision-making.

SUMMARY

In various implementations, a supplemental (SI) system may be provided. The supplemental system may be coupled to business intelligence environment(s) to facilitate deployment; analyses (e.g., identifications of similarities and/or differences, comparison to criteria, and/or other analyses); version control, tracking, management, and/or control; identification of differences between, for example, BI Artifacts; testing; test creation, association, and/or management; collaboration; release management; and/or other processes. In various implementations, the supplemental system (a continuous integration (CI) system and/or a modified CI system) may be utilized and the SI system may include one or more features for use in and/or with a business intelligence system.

Implementations of the SI system may include one or more of the following features. The SI system may facilitate deployment. For example, the deployment order and/or process may be managed by the SI system. The SI system may facilitate redeployment of previous versions of a deployment package in a BI environment. The SI system may perform impact analysis of changes, potential changes, and/or related to the deployment of changes from one BI environment into another BI environment. The SI system may version (e.g., identify, monitor, track, and/or store changes) one or more BI environments or portions thereof and/or one or more SI systems or portions thereof. For example, different versions of label(s), package(s), BI Artifact(s), property set(s), test(s), assertion(s), files, edits, etc. may be stored and/or monitored. The SI system may facilitate generation, completion, and/or prioritizing of tests, in some implementations.

In various implementations, a first BI Artifact Output may be retrieved (e.g., from a memory of the SI system and/or from the BI environment). The first BI Artifact Output may be generated by execution of a first version of a BI Artifact in a first BI Environment. The first specification associated with the first version of the BI Artifact may include specification marker(s), which may have been, for example, injected into the first specification by the SI system. The first BI Artifact Output may include output marker(s) associated with at least one of specification markers in the first specification. A second version of the BI Artifact may be retrieved. The second specification may be associated with the second version of the BI Artifact and may include specification marker(s), which may have been, for example, injected into the second specification by the SI system. The second version of the BI Artifact may be executed in the first BI environment to generate a second BI Artifact Output. The second BI Artifact Output may include one or more output markers associated with at least one of the specification markers in the second specification. A set of portions to ignore may be retrieved (e.g., from a memory of the SI system and/or from a user request). The first BI Artifact Output may be compared to the second BI Artifact Output based at least partially on at least one of the output markers in the first BI Artifact Output and at least one of the output markers in the second BI Artifact Output. Differences between the first version of the BI Artifact (or the first BI Artifact Output) and the second version of the BI Artifact (or the second BI Artifact Output) may be identified based at least partially on the comparison. A determination may be made whether the identified difference(s) are included in the retrieved set of portions to ignore to determine whether differences exist between the first version of the BI Artifact and the second version of the BI Artifact.

Implementations may include one or more of the following features. The portions to ignore may be associated with a type of portion and/or a part of a portion of a specification and/or BI Artifact output. Retrieving the first BI Artifact Output may include retrieving a first version of the BI Artifact and executing the first version of the BI Artifact in the first BI Environment to generate a first BI Artifact Output. The first specification and/or second specification may include specification marker(s) that identify portions of the specification. Specification markers may not be included in BI Artifacts created in a BI environment, in some implementations. The SI system may insert and/or inject a specification, associated with a BI Artifact, with specification markers. The specification makers may identify portions of the specification and/or BI Artifact Output. Output markers may include a non-visual marker. In some implementations, the first specification of the first version of the BI Artifact may be altered such that specification marker(s) are inserted into the first specification to identify one or more portions of the first specification and/or the second specification of the second version of the BI Artifact may be altered such that specification marker(s) are inserted into the second specification to identify one or more portions of the second specification. Comparing the first BI Artifact Output to the second BI Artifact Output may include identifying first output portion(s) of the first BI Artifact Output and/or second output portion(s) of the second BI Artifact Output associated with portion(s) identified in the retrieved set of portions to ignore, and comparing the first output portion(s) to the second output portion(s) of the second BI Artifact. In some implementations, difference(s) that exist between the first version of the BI Artifact and the second version of the BI Artifact may be identified based at least partially on the determination of whether one or more of the identified differences are included in the retrieved set of portions to ignore. In some implementations, a notification may be generated (e.g., to be presented to a user) based at least partially on the identified difference(s) between the first version of the BI Artifact and the second version of the BI Artifact. The identified differences between the first version of the BI Artifact and the second version of the BI Artifact may be saved in a memory of the SI system. In some implementations, one or more similarities that exist between the first version of the BI Artifact and the second version of the BI Artifact may be identified based at least partially on the comparison of the first BI Artifact Output to the second BI Artifact Output. In some implementations, difference(s) may be determined to not exist between the first version of the BI Artifact and the second version of the BI Artifact when each of the identified differences are included in the retrieved set of portions to ignore. In some implementations, the portions to ignore may be utilized to determine which portions of the BI Artifact Output may be compared. For example, the SI system may compare portions of a first BI Artifact Output and a second BI Artifact Output that are not identified in the retrieved portions to ignore to identify differences and/or similarities. The determination of whether differences exist between the first version of the BI Artifact and the second version of the BI Artifact may be based on the identified differences and/or similarities.

In various implementations, a first version of a first BI artifact may be retrieved. The specification of the first version of the first BI artifact may be adjusted to produce a first instrumented specification. The first instrumented specification may include one or more specification markers to uniquely identify portions of the specification of the first BI Artifact and the specification marker(s) may emit one or more associated output markers into a resultant BI output. The first instrumented specification may be executed in a BI environment to produce a first instrumented BI Artifact Output. The first instrumented BI Artifact Output may include one or more of the associated output markers emitted by one or more of the specification markers of the first instrumented specification. The first instrumented BI output and/or an association between the first instrumented BI output and the first version of the first BI artifact may be stored in a memory (e.g., a memory of the SI system). At least one first assertion may be generated (e.g., using the SI system). The first BI Artifact may be associated with at least one of the first assertions. One or more specification portions to ignore from the first BI Artifact may be associated with at least one of the first assertions. The first instrumented BI Artifact Output may be associated with at least one of the first assertions. A second version of the First BI Artifact may be retrieved. The specification of the second version of the first BI artifact may be adjusted to produce a second instrumented specification. The second instrumented specification may include one or more specification markers to uniquely identify portions of the specification of the second version of the first BI Artifact. The second instrumented specification may be executed in the BI environment to produce a second instrumented BI Artifact Output. The second instrumented BI Artifact Output may include one or more of the associated output markers emitted by one or more of the specification markers of the second instrumented specification. A second instrumented BI output may be compared to the first instrumented BI output such that output portions that are associated with the specification portions designated in the "specification portions to ignore" are restricted from being compared. An indication that the assertion has failed may be generated if one or more differences are identified based on the comparison.

Implementations may include one or more of the following features. Adjusting the specification of the first version of the first BI Artifact may include instrumenting the specification of the first version of the first B Artifact such that specification markers are injected into the specification of the first version of the first BI Artifact. Adjusting the specification of the second version of the first BI Artifact may include instrumenting the specification of the second version of the first BI Artifact such that specification markers are injected into the specification of the second version of the first BI Artifact. The memory may include a memory coupled of the SI system. An indication that the assertion has failed may be generated if one or more differences are identified based on the comparison.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of the present disclosure and its features, reference is now made to the following description, taken in conjunction with the accompanying drawings, in which:

FIG. 1I depicts a schematic illustration of an example report execution profile, namely a UML Analysis Class Diagram.

FIG. 2C illustrates an implementation of an example deployment.

FIG. 2D illustrates an implementation of a second version of the example label illustrated in FIG. 2A.

Like reference symbols in the various drawings indicate like elements.

DETAILED DESCRIPTION

Enterprises may utilize commercially available business intelligence (BI) software, such as IBM Cognos available from International Business Machines Corp (Armonk, N.Y.), to create, collect, access, analyze, and/or create presentations of business data, such as sales, workforce, costs, etc. Using the BI software, one or more BI environments may be created on computer system(s). For example, to minimize disruptions to a production environment, one or more other environments, such as a QA environment and/or development environment, may be utilized to develop and/or test new, altered, and/or deleted BI Artifacts.

A supplemental (SI) system, such as a CI system and/or a modified CI system (e.g., as described in U.S. Pat. No. 7,885,929 filed on Jan. 3, 2006 and entitled "Continuous Integration of Business Intelligence Software"), may communicate with BI environment(s), external database(s), datasource(s), webservice(s), and/or other system(s). In some implementations, the SI system may operate on a separate computer system from the BI environment(s) and/or portions of the SI system may be included in the BI environment (e.g., links to SI operations in a graphical user interface generated by the BI environment).

Figure 1A:
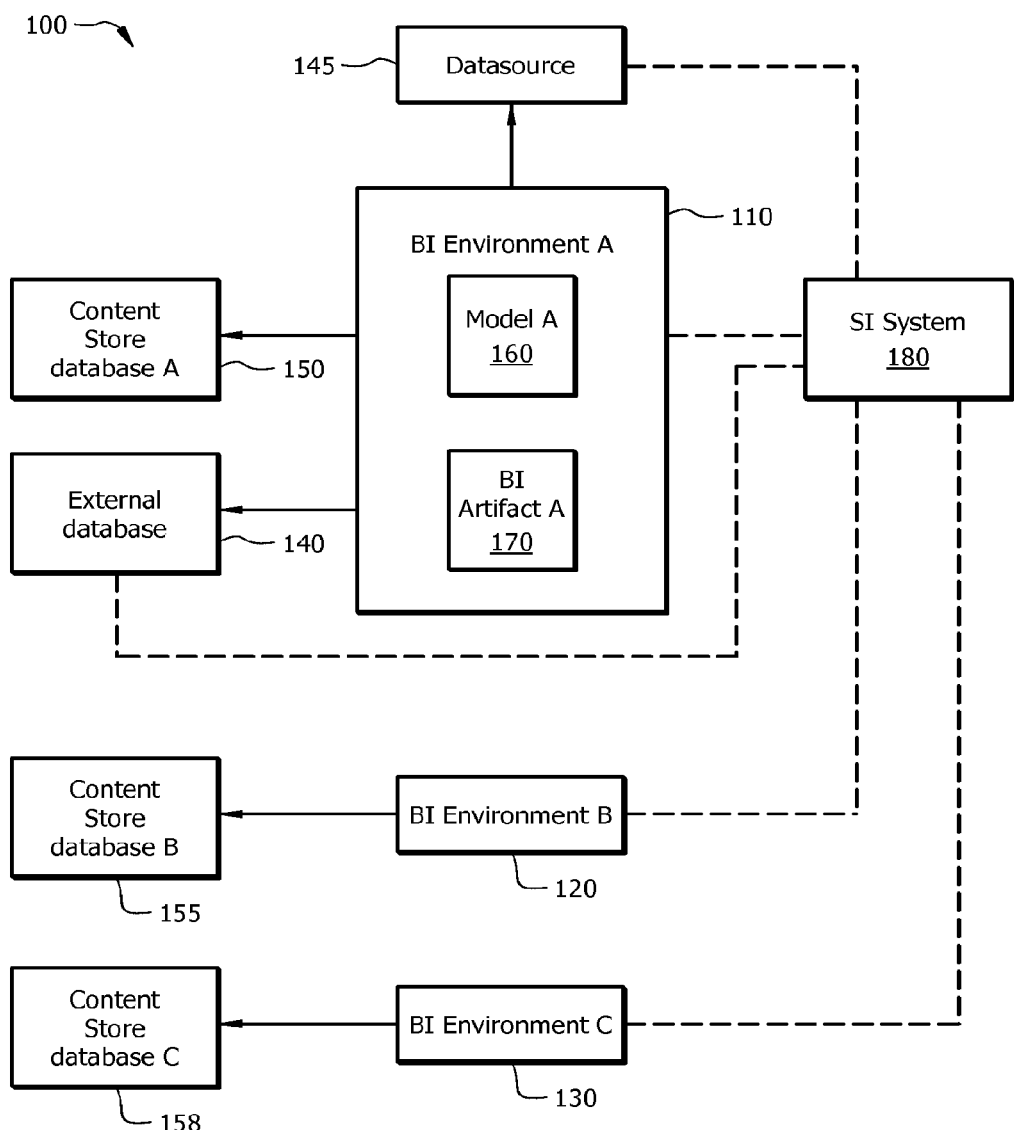
FIG. 1A illustrates an implementation of a simplified example of a system that includes a SI system and more than one BI environment.

FIG. 1A illustrates an implementation of an example system 100. The system 100 may be utilized by an enterprise. As illustrated, a system 100 may include one or more BI environments (e.g., instances of a BI system such as IBM Cognos instances). For example, an enterprise may utilize business intelligence software, such as IBM Cognos to create BI environment(s). In some implementations, a first BI software may be utilized to create a first BI environment and a second BI software may be utilized to create second BI environment(s). For example, a first region of an enterprise may utilize IBM Cognos to create a first BI environment and a second region of an enterprise may utilize SAP Business Objects to create a second BI environment.

As illustrated, more than one BI environment may be operated, in some implementations, such as BI environment A 110, BI environment B 120, and BI environment C 130. For example, an enterprise may operate separate BI environments for development, quality assurance (QA), and/or production. In some implementations, different parts of the enterprise (e.g., during a merger and/or for regulatory compliance) may operate different BI environments. The SI system may communicate between the two or more of the environments. In some implementations, each BI environment may be run on separate computer systems (e.g., servers and/or databases) and/or may share one or more components of a computer system. In some implementations, at least one of the BI environments may be at least partially independent of another BI environment, such that a BI Artifact associated with a first BI environment may not be directly run from a different BI environment. For example, a BI Artifact, such as Report A, may be created in BI environment A. BI environment B may be restricted from executing BI Artifacts outside of BI environment B, and thus, may not be able to execute Report A. Thus, Report A, which was created in BI environment A, may be deployed in BI environment B to allow Report A to be executed in BI environment B. In some implementations, BI environment B may include BI Artifacts, such as Query B. BI environment A may be restricted from reading, retrieving, and/or executing Query B, which resides in BI environment B. In some implementations, Query B may be deployed in BI environment A to allow BI environment A to execute Query B in BI environment A.

In some implementations, the BI environments may have different or similar properties to each other. For example, the permissions (e.g., access, editing, and/or other permissions of a user and/or group) may differ between BI environment A and BI environment B. In some implementations, the datasource(s) (e.g., relational database, OLAP cube or dynamic cube) that the BI environment is coupled to may differ.

The BI environment(s) may be coupled to one or more external databases. As illustrated, the BI environment A 110 may be coupled to external database 140. The external database may include business data (e.g., sales, workforce information, and/or any other information useful to the business). The BI environments may be coupled to the same and/or different external databases (e.g., a database may be replicated and/or partially replicated for use with one or more BI environments; for example, a development BI environment may be coupled to a partially replicated version of the database to which the production BI environment is coupled). For example, the BI environments may be coupled to different external databases that store at least a portion of the same business data.

In some implementations, the BI environment(s) may be coupled to datasource(s) (e.g., database, cube, flatfile, and/or webservice). A BI environment, such as BI Environment A 110, may be coupled to a datasource 145 in addition to being coupled to an external database 140, as illustrated, and/or may be coupled to a datasource instead of being coupled to an external database. For example, the BI environment may be coupled to the datasource, which provides access to data, such as business data. The data may be stored on a database, in some implementations, and access to the data may be obtained by the BI environment through the datasource.

The BI environment, such as BI environment A 110, may include a content store database A 150. As illustrated, each BI environment may include a content store database (e.g., BI environment B 120 may include content store database B 155 and BI environment C 130 may include content store database C 158). The content store database A 150 may include, for example, information such as BI Artifacts; report specifications; models; packages, such as published model(s) and/or deployment packages (e.g., a set of one or more BI Artifacts in a first BI environment to deploy to a second BI environment); and/or properties of the BI Artifacts.

In some implementations, to facilitate creation of a BI Artifact that references a set of data, a user may create a metadata model. A user may create a metadata model that references datasouce(s) and/or databases. As illustrated in FIG. 1, a user may create a Model A 160 in BI environment 110 (e.g., using Framework Manager in IBM Cognos). The Model A 160 may allow data to be retrieved using a datasource 145 and/or an external database 140. When creating the metadata model (e.g., Model A 160), a metadata model file (e.g., a file associated with the creation of the metadata model; the file may include metadata regarding the metadata model) may be created. The metadata model file may reside on a user computer, in some implementations. The user may then create one or more BI Artifacts based at least partially on the created metadata model. Thus, the BI Artifact may obtain access to a set of data based on the datasources and/or databases in the metadata model. For example, a BI Artifact, such as Report A, may retrieve data using a datasource. A BI Artifact, such as Query A, may perform a query of data using a connection to an external database provided by the metadata model.

The BI environment may include one or more BI Artifact studios (e.g., a BI environment created by IBM Cognos may include Report Studio, Query Studio, Analysis Studio, Metric Studio, etc.) that allow BI Artifact(s) to be authored (e.g., created, edited, and/or deleted) by the user. The user may access the BI Artifact studio via one or more web-based graphical user interfaces. The BI Artifact studio(s) may allow a user to create, delete, and/or edit BI Artifacts. Thus, a user may access a BI Artifact studio to create, for example, a BI Artifact A 170 in the BI environment A 110. The BI Artifact A 170 may be created using the Model A 160 to allow access to data stored in the external database 140 and/or accessed via the datasource 145.

In some implementations, the user may create a package in a BI environment. One or more BI Artifacts in the BI Environment may be associated with the package (e.g., the reference to a package may be a property of a BI Artifact). A BI Artifact may be associated with more than one package, in some implementations. The BI Environment may contain report BI Artifacts, such as R1, R2, and R5 (e.g., R1, R2, and R5 may be associated with the package). The SI system may create a label and associate the label with the package and its associated BI Artifacts (R1, R2 and R5) in order to facilitate deployment. When a BI Artifact is created in the BI environment, a set of properties may be associated with the created BI Artifact. For example, properties may include: Name, Description, Tooltip, Specification, Policies, Metadata Model, and/or other appropriate properties. In some implementations, a first set of properties may be associated with a first BI Artifact created in a first BI environment. When the first BI Artifact is deployed in a second BI environment, the first collection of properties may be deployed with the first BI Artifact. When the SI system is utilized in the deployment, the user may generate a property set that includes one, more than one, or none of the properties selected from the first collection of properties and/or other properties. The property set generated in the SI system may be utilized when deploying the first BI Artifact in the target BI environment. For example, when a BI Artifact resides in a first BI environment, a first collection of properties may be utilized (e.g., to grant appropriate permissions to users). When the BI Artifact resides in a second BI environment, a second collection of properties may be associated with the BI Artifact that provides different and/or the same properties. When the second property set is different than the first property set, the SI system may utilize a property set with deployment of BI Artifact(s), content(s) of package(s), and/or content(s) of label(s) to retain the existing property set and/or selectively deploy a portion of the first collection of properties with the deployment of the BI Artifact in the second BI environment. For example, the property set may include a listing of properties from the first collection of properties to deploy with the BI Artifact and/or to restrict from deploying with the BI Artifact.

Figures 2A, 2B:
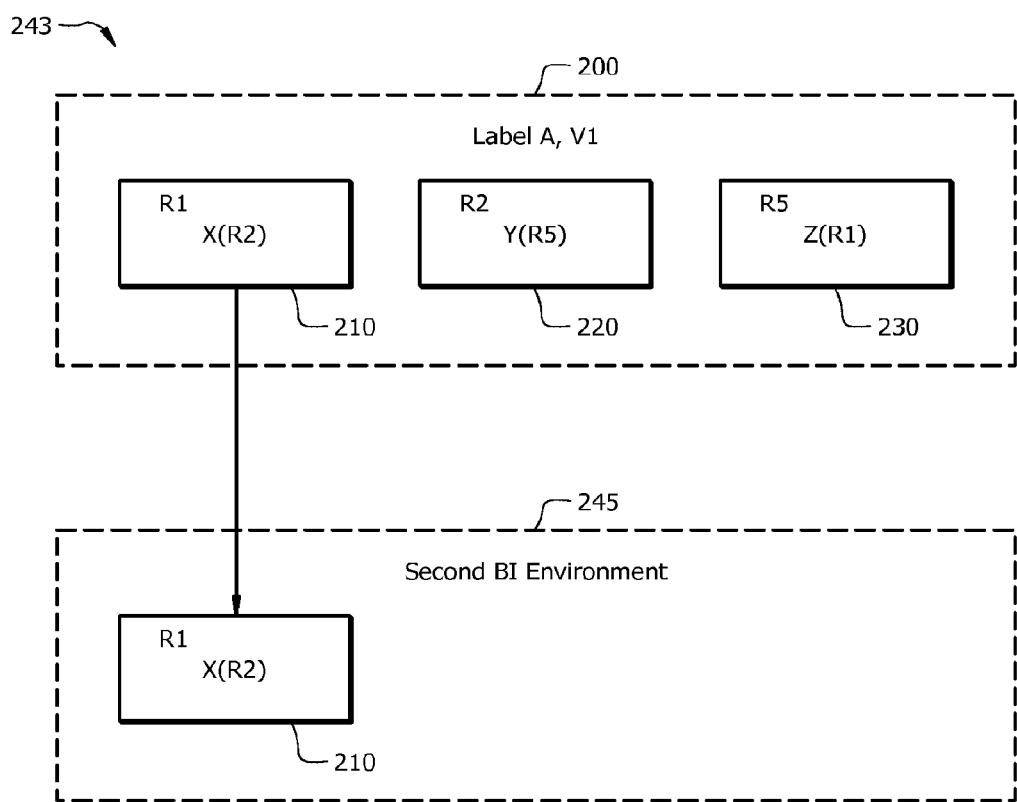
FIG. 2A illustrates an implementation of an example label.
FIG. 2B illustrates an implementation of an example deployment.

In some implementations, the SI system (e.g., instruction(s) executed by a processor of the SI system) may allow a label to be assigned to one or more BI Artifacts (e.g., a set of selected BI Artifacts and/or a package for deployment) and/or property sets. A BI Artifact may be associated with more than one label, in some implementations. In some implementations, a label may be associated with a specific version of a BI Artifact and/or property set. FIG. 2A illustrates an example label 200. The label may include (e.g., associate) one or more selected BI Artifacts 210, 220, 230 and/or one or more selected Property Sets 240. The property set may be associated with a BI Artifact. The property set may be the same and/or different from the property set associated with the BI Artifact, when created in a BI environment. For example, when BI Artifact 210 is created in a BI Artifact, a BI Artifact Studio may automatically associate the BI Artifact 210 with a first property set. The property set 240 may be the first property set, for example, and/or the property set 240 may be a different property set. In some implementations, a BI Artifact may not be associated with a property in a label. For example, BI Artifact 220 may not be associated with a property set in the label 200. Thus, when the BI Artifact 220 is deployed in another BI environment, an existing property set (e.g., in the BI environment) may not be overwritten.

In some implementations, in the SI system, a label may be associated with one or more packages from a BI environment. For example, a package may be defined in a BI environment as including one or more BI Artifacts. The label may be associated with package(s) and/or portions thereof, in the SI system. In some implementations, a label may be restricted from being associated with property set(s) associated with a package and/or a user may select to not associate property set(s) associated with the package. When the set of package(s), BI Artifact(s) and/or Property Set(s) is stored in the SI system, an identifier, such as Label A, may be associated with the label. As illustrated, the label 200 may include three BI Artifacts, such as reports R1 210, R2 220, and R5 230.

In some implementations, BI artifacts may be executed, viewed, presented, and/or edited in one or more of the BI environments. For example, a Report A created in BI environment A may be modified by a user in BI environment A. If Report A is deployed in BI environment B, the deployed Report A may be modified in BI environment B and the originally created Report A may be modified in BI environment A, in some implementations.

A supplemental system, such as a SI system 180, may be coupled to one or more of the BI environments. For example the SI system 180 may be communicably coupled to the BI environment A 110, BI environment B 120, and BI environment C 130. The SI system 120 may include a computer system, which includes a server and a memory, such as a database (e.g., SI database), in some implementations. The SI system 120 may access databases, such as external database 140, coupled to BI environment(s) through the BI environment(s) and/or independently.

The SI system may be accessed independently of a BI environment and/or through the BI environment (e.g., via one or more user interface elements, such as buttons, generated by the SI system for presentation in a graphical user interface of the BI environment). The instructions (e.g., a module) for operation(s) of the SI system may at least partially reside on the SI system. In some implementations, at least a portion of the instructions may reside in a BI environment.

The SI system may facilitate (e.g., via instruction(s) stored on a memory of the SI system and executed by a processor of the SI system): deployment of BI Artifacts (e.g., from one BI environment to another BI environment); assignment of labels to one or more BI Artifacts and/or property sets; identification, management and/or storage of versions of various components (e.g., BI Artifacts, files, Aspects of BI Artifacts, property sets, labels, tests, assertions, test scripts, etc.) of the SI system and/or BI system; testing of one or more components of the SI system and/or BI system (e.g., BI Artifacts); and/or messaging. The SI system may perform one or more other operations, as appropriate.

Figure 1B:
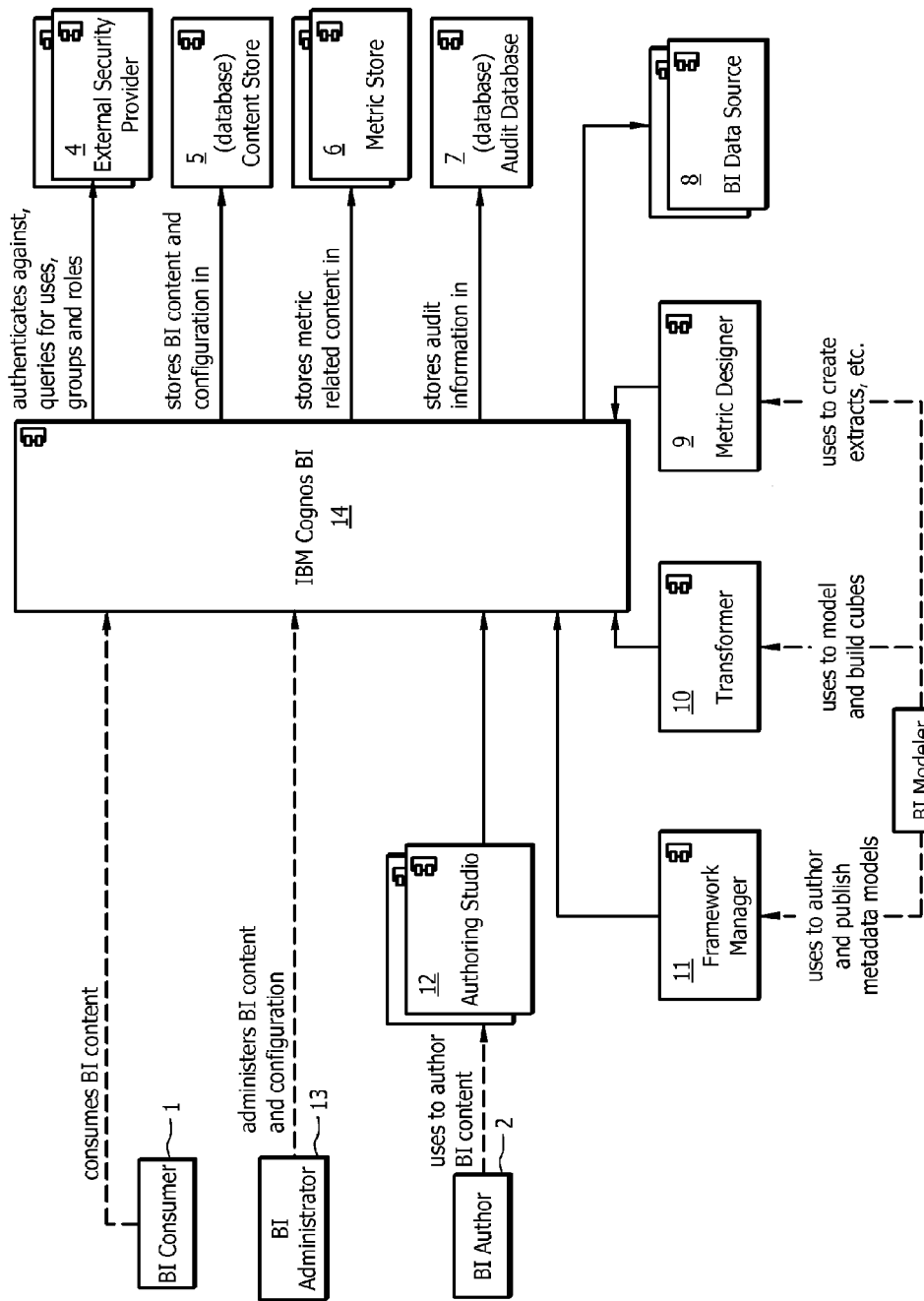
FIG. 1B depicts a simplified schematic illustration of example components of an implementation of a BI environment, namely, a UML (Unified Modeling Language) Component Diagram.
Figure 1C:
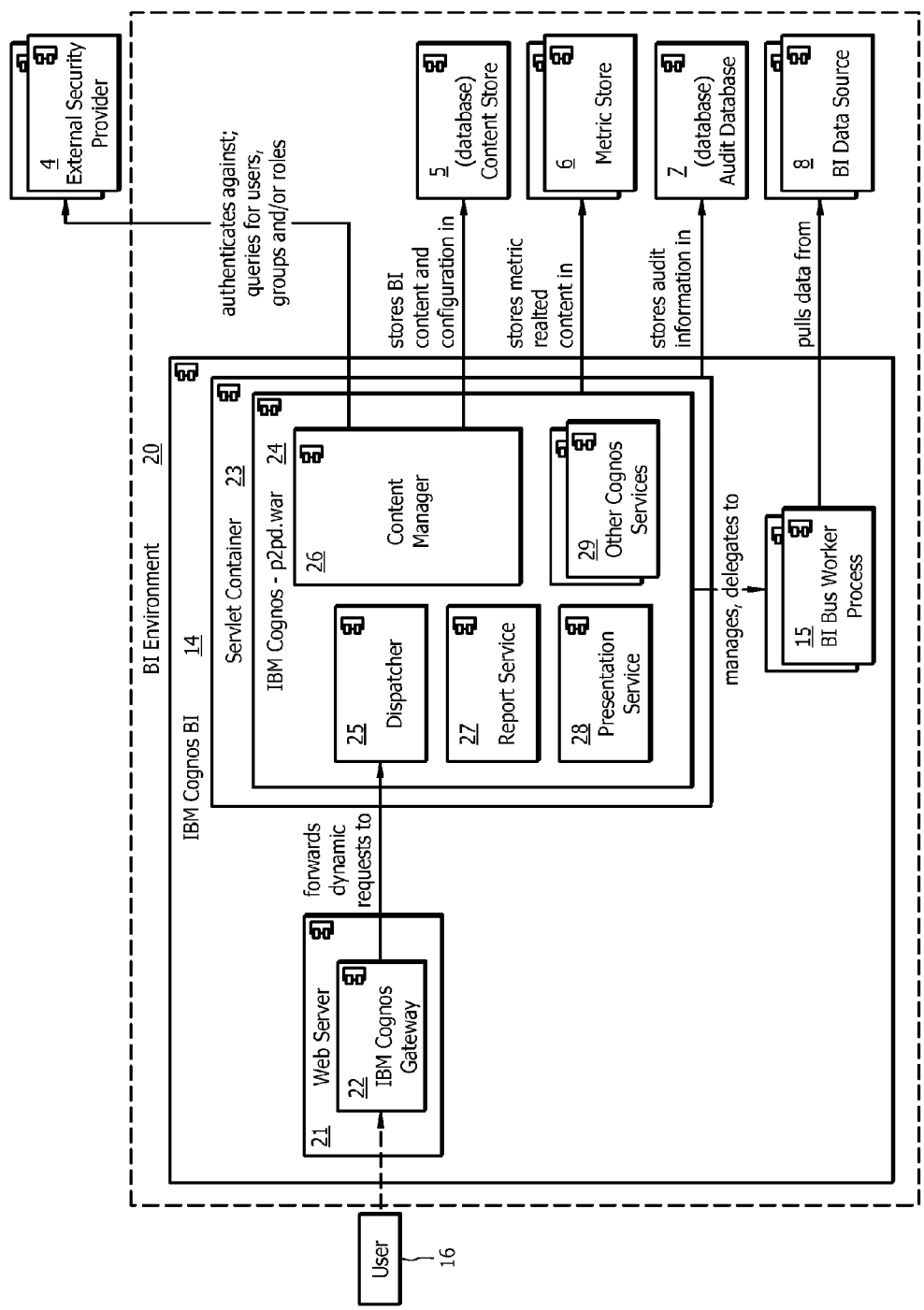
FIG. 1C depicts a schematic illustration of an expanded view of example components of an implementation of a BI environment, namely, a UML Component Diagram.
Figure 1D:
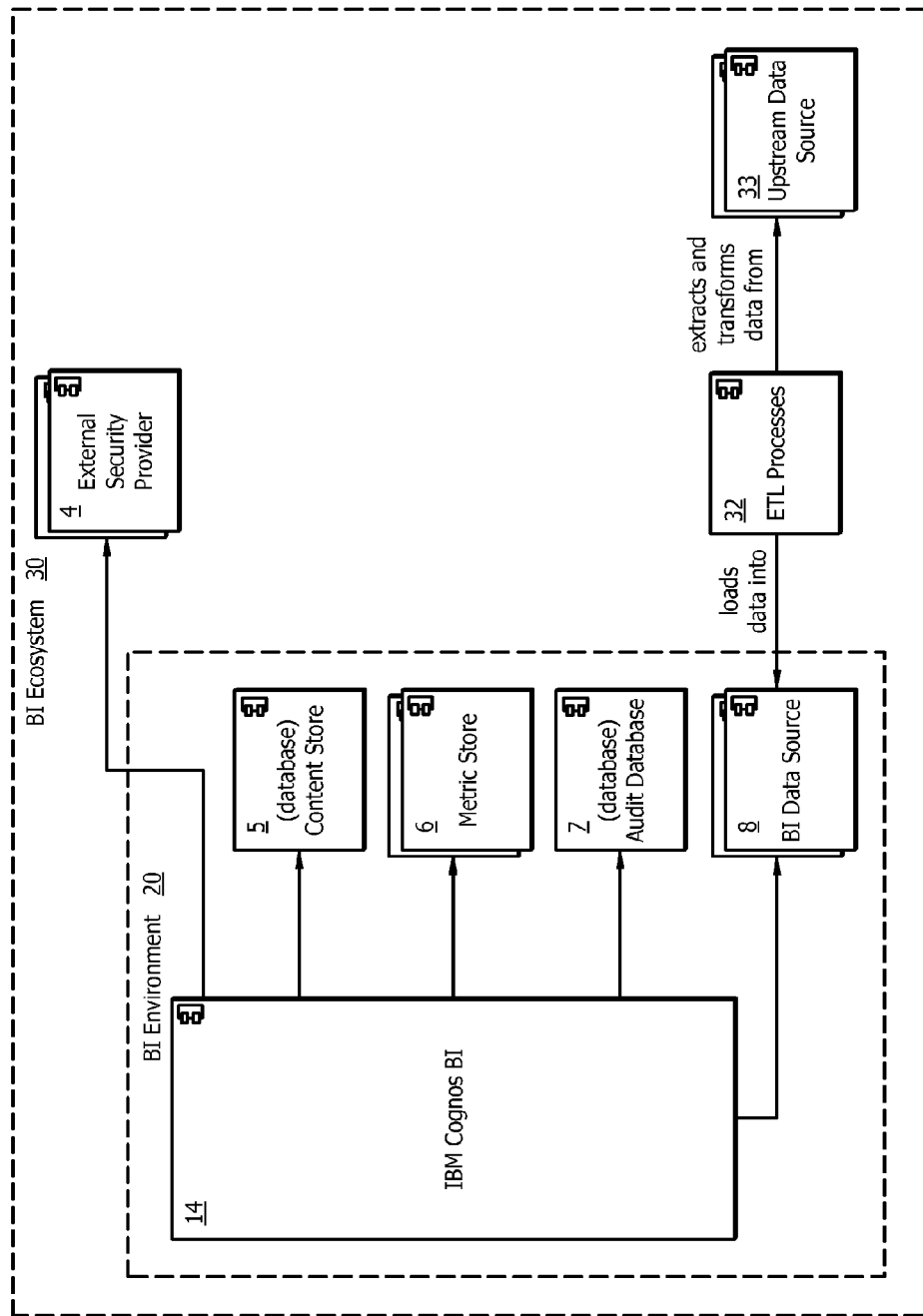
FIG. 1D depicts a schematic illustration of example components of an implementation of a BI ecosystem, namely, a UML Component Diagram.

FIGS. 1B through 1D are schematic illustrations of an implementation of an example BI ecosystem and various components. It should be understood that BI ecosystem and its components shown in FIGS. 1B through 1D are for illustrative purposes only and that any other suitable system or subsystem may be used in conjunction with, or in lieu of, the depicted BI ecosystem according to the described systems and processes.

FIG. 1B illustrates an implementation of a UML (Unified Modeling Language) Component Diagram that depicts a high level view of selected components in an example BI environment. An IBM Cognos BI environment is illustrated in FIG. 1B, but a BI environment utilizing BI software provided by any other appropriate software vendor (or open source BI software) may be utilized. In FIG. 1B, a single instance (i.e., single UML component) 14 of the BI software is depicted for the sake of simplicity. In some implementations, however, instance 14 may comprise a plurality of collaborating software processes running on a plurality of computers (e.g., Gateways, Application Servers, and/or BI Bus Processes in an IBM Cognos® based implementation).

To develop, maintain, and/or use a BI environment, several Users may be involved. As depicted in FIG. 1B, Users may include one or more BI consumers 1, BI administrators 13, BI authors 2, and BI modelers 3. The "Users" may include a discrete individual or a group/team of individuals such that there may be a plurality of BI consumers 1, a plurality of BI administrators 13, a plurality of BI authors 2, and/or a plurality of BI modelers 3. In some implementations, a User may perform the action(s) of more than one User and/or the User may be more than one category of User.

A BI consumer 1, one example category of User, may represent a consumer of information available in and/or produced by instance 14 of the BI software. Activities of a BI consumer 1 may include, but are not limited to: executing BI artifacts to examine the BI outputs; scheduling BI artifacts, such as reports to be executed according to a selected frequency (e.g., every morning at 7:00 AM); requesting that generated report outputs be transmitted to BI consumer 1 (and/or other recipients) via a specified process of transmission (e.g., email); and/or viewing multiple BI outputs aggregated into different panes of a dashboard or workspace hosted within instance 14 of the BI software.

A BI administrator 13, an example category of User, may be responsible for administering the content and/or the configuration of instance 14 of the BI software. Activities of a BI administrator 13 may include, but are not limited to: changing tuning parameters; configuring BI data sources 8; mapping Users, groups and/or roles from an External Security Provider 4 to specific entitlements on content and/or capabilities in instance 14 of the BI software; mapping Users, groups and/or roles from an External Security Provider 4 to groups and/or roles in an internal Cognos security namespace; installing or upgrading instance 14 of the BI software; and/or otherwise administering the configuration and/or the content of instance 14 of the BI software.

BI author 2, an example category of User, may represent a BI professional and/or a "power User" who creates and/or updates BI content. The BI author 2 and/or a plurality of BI authors may be responsible for creating and/or updating new BI artifacts such as reports, queries, and/or analysis objects. BI author 2 may use vendor-supplied authoring studio(s) 12 when editing BI content. In some implementations in which IBM Cognos is used for the BI environment, different types of authoring studios 12 may be provided for different types of BI artifacts. For example, Report Studio may be used to edit reports, Analysis Studio may be used to author analyses, Business Insight Advanced may be used to author dashboards, Event Studio may be used to author events, Cognos Insight may be used to author BI artifacts and/or other suitable authoring studios may be used for additional BI artifacts.

BI modeler 3, another category of User, represents a BI professional (e.g., a power User) who creates and/or updates foundational BI content. BI modeler 3 may be generally responsible for building and/or publishing models upon which other BI artifacts are created. Examples of such models may include, but are not limited to: metadata models (e.g., both framework models and their associated packages), models used to generate OLAP cubes, metrics extracts and/or scorecards, and/or any other suitable models. In some implementations, a single individual may perform the role of both BI modeler 3 and BI author 2. In some implementations, in which IBM Cognos is used for the BI environment, different modeling tools may be provided for authoring different types of models. For example, Framework Manager 11 may be used to author framework models (e.g., offline) and/or publish slices of these models (e.g., "packages") to instance 14 of the IBM Cognos BI software. Transformer 10 may be used to author models that are used to build OLAP cubes and/or other modeling tools may be used to build additional models, as appropriate.

Instance 14 of the BI software depicted in FIG. 1B may be configured to authenticate Users against one or more External Security Providers 4. For example, External Security Providers 4 may include Microsoft Active Directory, LDAP or Netegrity SiteMinder, NTLM, and/or any other suitable external security providers. In some implementations, in addition to authenticating Users against an External Security Provider 4, an instance 14 of BI software of FIG. 1B may also discern some or all of an authenticated User's group and/or role membership from the External Security Provider 4. Instance 14 of the BI software of FIG. 1B may query an External Security Provider 4 for information such as Users, groups, roles and/or organizational hierarchies. For example, BI administrator 13 may define permissions on BI content and/or capabilities, or define group and/or role membership by mapping from an External Security Provider 4 to an internal security namespace.

Instance 14 of the BI software may store content and/or configuration data in a Content Store database 5. For example, the Content Store Database 5 may store various BI artifacts, configurations, and/or content, such as packages (e.g., metadata models or portions thereof), report specifications, report outputs (e.g., by default and/or by User selection), folder structure, dashboards, portal pages, configurations, and/or User profiles and/or preferences. In some implementations, certain configuration data may be maintained in Content Store database 5, and additional configuration data may be stored on the file system(s) of the computer(s) hosting instance 14 of the BI software (e.g., XML configuration files, property files, xsd files, xslt files, etc.).

Instance 14 of the BI software may store metric related information in one or more Metric Stores 6.

Instance 14 of the BI software may further log "audit information" to an optionally configured audit database 7. Audit information may include historical audit data including, but not limited to, information on: User sessions, User actions, which BI artifacts have been executed in the system (e.g., including information about how the BI artifacts were executed and/or by whom), and/or any other suitable historical data. Instance 14 of the BI software may be configured to log this type of audit information at various levels and to various destinations (e.g., local log files and/or an audit database).

Instance 14 of the BI software may query for data stored in one or more BI data sources 8. BI data source 8 may include any one or more of a plurality of data store types that the BI environment may utilize. For example, relational databases (e.g., Oracle 11g, Microsoft SQL Server, and/or IBM DB2), ODBC data sources, OLAP cubes, flat files, XML files, web services, and/or physical and/or virtualized data sources (e.g., Composite Information Server®).

FIG. 1C illustrates an implementation of a UML (Unified Modeling Language) Component Diagram that depicts a more detailed view of an example BI environment—more particularly, FIG. 1C illustrates BI environment 20, which is an expanded view of instance 14 of the BI software in FIG. 1B. As in FIG. 1B, an IBM Cognos BI environment is shown as an example but a BI environment utilizing the BI software provided by any other appropriate BI vendor would be equally applicable. Also as in FIG. 1B, a single instance (i.e., single UML component) 14 of the BI software is depicted in FIG. 1C for the sake of simplicity. In some implementations, however, instance 14 may comprise a plurality of collaborating software processes running on a plurality of computers.

BI environment 20 depicted in FIG. 1C may include instance 14 of the BI environment (e.g., an IBM Cognos BI environment), its associated Content Store database 5, associated metrics store databases 6, an optional audit database 7, and/or BI data sources 8.

Figure 1E:
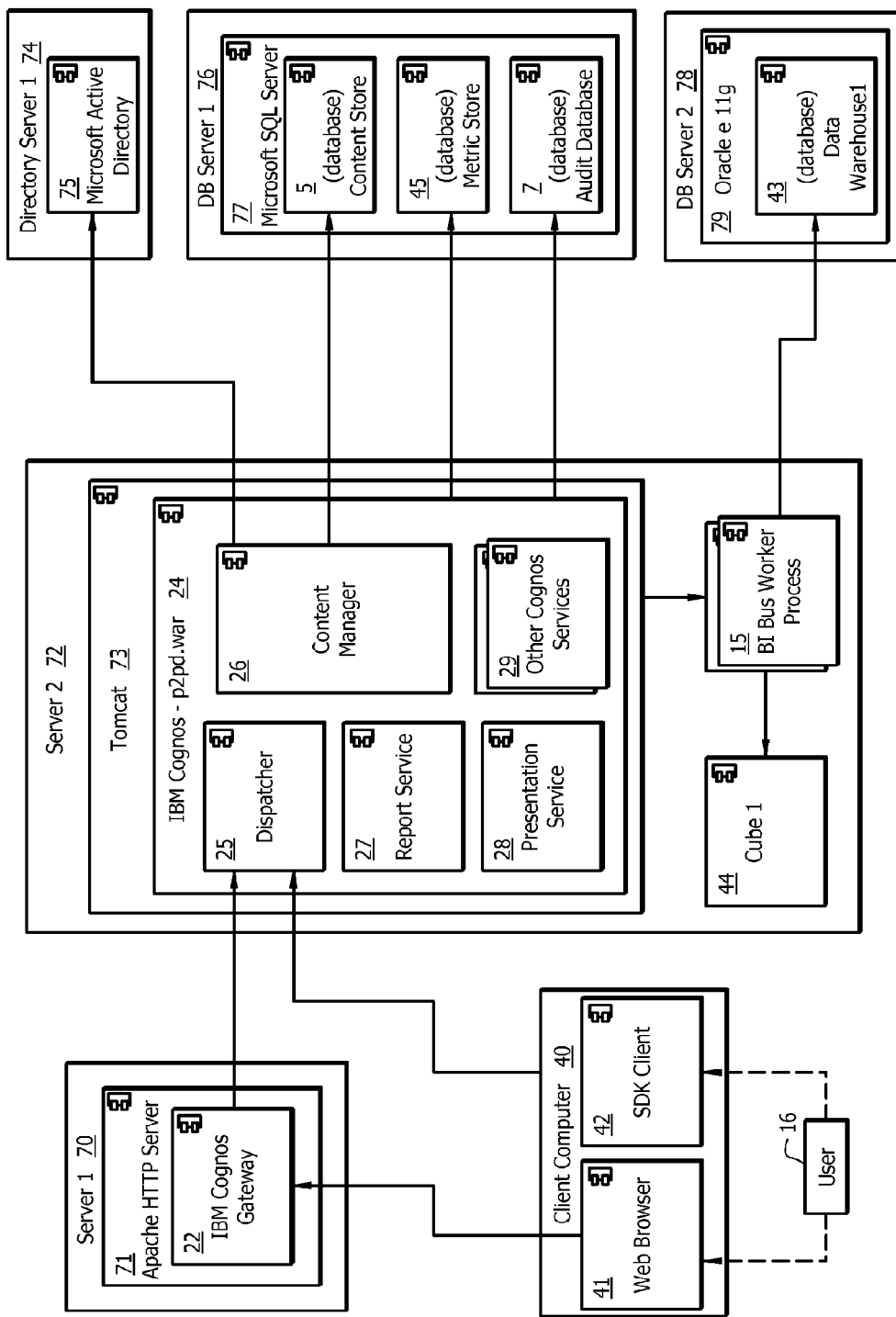
FIG. 1E depicts a schematic illustration of an example deployment of an implementation of a BI environment, namely, a UML Deployment Diagram.

An instance of a BI environment may be configured and deployed in many variations. For example, the instance of the BI environment may be hosted on single or multiple servers, configured with single or multiple gateways, configured with single or multiple servlet containers/application servers, and/or any other suitable configurations. While FIG. 1C depicts a single set of the components and FIG. 1E depicts one way to deploy this single set of components, various implementations may use different appropriate configurations deployed in different manner(s).

In some implementations, instance 14 may be divided into two tiers the web tier and the application tier. The web tier may include a gateway 22 of the BI environment that may be hosted in a web server 21, such as Apache's HTTP Server or Microsoft's IIS, for example. The application tier may include a web application 24 and/or a BI Bus Worker Processes 15. A web application 24 is depicted as p2pd.war and may be hosted in an application server and/or servlet container 23 (e.g., IBM Websphere Application Server or Apache Tomcat). Zero or more BI Bus Worker Processes 15 may be managed by p2pd.war 24.

Webserver 21 may handle incoming HTTP requests that are generated by a web browser and/or some other HTTP based client. While the term "HTTP requests" is used herein, any suitable protocol can be utilized, including but not limited to HTTP protocol, HTTPS protocol, SPDY protocol, and/or any other suitable alternative to HTTP. Gateway 22 may be responsible for serving static web content such as, HTML, CSS, JavaScript, images of various formats, and/or any other suitable static content. This static content may constitute at least a portion of the web interfaces of the BI environment. Examples of such web interfaces may include Cognos Connection, authoring studios 12, and/or any other suitable web interfaces. Gateway 22 may be responsible for forwarding certain HTTP requests to the dispatcher 25 that is hosted inside p2pd.war 24 of the BI environment.

p2pd.war 24 may be responsible for managing and/or orchestrating much of the behavior of instance 14 of the BI software, such as, rendering dynamic content (e.g., as shown in Cognos Connection, in response to an HTTP request from a browser based client; responding to requests to execute BI artifacts, such as reports; initiating scheduled activities, such as scheduled report execution; initiating delivery of the generated report outputs; and/or any other suitable actions. p2pd.war 24 may host service(s) and/or component(s) including, but not limited to the following examples:

1. Dispatcher 25 which may be responsible for routing incoming requests to their appropriate target.
2. Report service 27 which may be responsible for servicing various artifact execution related requests. Artifact execution related requests may be delegated in whole or in part to BI Bus Worker Process 15. The BI Bus Worker Processes 15 may be responsible for performing queries, aggregating results, etc.

3. Presentation service 28 which may be responsible for rendering various visual representations used in interface screens and/or components for transforming generic XML responses from other services into an output format such as HTML or PDF.

4. Content manager 26 which may be responsible for serving as access point for objects that live in Content Store database 5. Operations may include add, query, update, delete, move and/or copy. The content manager 26 may be responsible for import and/or export of content and/or archives; and/or may serve as the conduit for authentication requests for interacting with External Security Provider(s) 4.

5. Other BI services 29 which may represent the numerous other services that are or may be deployed inside of p2pd.war 24. Services may include agent service, batch report service, data movement service, delivery service, event management service, job service, log service, metric studio service, migration service, planning job service, planning web service, planning administration console service, planning data service, system service, and/or any other suitable services.

As noted, FIG. 1C depicts an IBM Cognos BI environment as an example. As such, reference to IBM Cognos documentation such as the "IBM Cognos Business Intelligence Version 10.1.1 Architecture and Deployment Guide" as well as Version 8.4.1, is hereby incorporated by reference to the extent that it does not conflict with the described systems and processes) may help to further describe details of the UML Component Diagram of FIG. 1C (available at "Cognos Business Intelligence Version 10.1.1 Product Documentation." IBM. N.p., n.d. Web. 22 October 212. <http://www-01.ibm.com/support/docview.wss?uid=swg2721353>; and "Cognos 8 Business Intelligence Version 8.4.1 Product Documentation." IBM. N.p., n.d. Web. 22 October 212. <http://www-01.ibm.com/support/docview.wss?uid=swg2722336>.).

Certain services in p2pd.war 24 may delegate to BI Bus Worker Process 15, which may be responsible for querying, aggregating, and/or summarizing data stored in one or more BI data sources 8.

As depicted in FIG. 1C, User 16 may be a generic classification for a User of instance 14 of the BI software. As noted with reference to FIG. 1B, User 16 may be a BI consumer 1, a BI administrator 13, a BI author 2, a BI modeler 3, and/or some other category of User of the system. In some implementations, User 16 may interact with instance 14 of the BI software via a web browser and the web browser, in turn, issues HTTP or HTTPS requests to the gateway 22. In some implementations, a User 16 may use a tool that targets requests directly at Dispatcher 25 (e.g., a tool that utilizes a Software Development Kit (SDK) from the relevant BI vendor to issue SOAP (simple object access protocol) requests or other remote requests and/or a tool that directly issues raw SOAP requests and/or other remote requests which are targeted at remotely accessible services exposed by instance 14 of the BI software).

FIG. 1D illustrates an implementation of a UML Component Diagram that depicts a high level view of selected components in an example BI ecosystem 30. As illustrated in FIGS. 1B and 1C, a single instance 14 of the BI software is depicted; however, in other implementations, instance 14 may comprise a plurality of collaborating software processes running on a plurality of computers. In some implementations, depiction of instance 14 may include more than one UML component.

The BI Ecosystem 30 may include the BI environment 20, data sources accessed by the BI environment, external security provider 4, ETL processes 32 which load the data into the BI Data sources 8, and/or Upstream Data sources 8, from which the ETL Processes pull data. BI environment 20 may include instance 14, an associated Content Store database 5, associated metrics store databases 6, an optional audit database 7, and/or BI data sources 8 (e.g., a variety of data source types, such as relational database, OLAP cubes, flat files, XML files, web services, and/or other physical and/or virtual data sources).

In some implementations, Upstream data sources 33 may include sources of data not intended for direct use by instance 14 such as, databases that support OLTP systems, databases conceived and/or used for other purposes, databases not designed for efficient access by BI systems, data sources that contain data duplicative of other data accessible by instance 14, data sources that contain data that must be transformed to increase its usefulness when accessed by instance 14, flat files and/or data exports from other systems, and/or various other sources of data not directly accessible by instance 14 (e.g., for either technical or non-technical reasons).

ETL (extract, transform, and/or loading) processes 32 may be responsible for extracting and/or transforming data from one or more upstream data sources 33, and pushing the data into one or more BI data sources 8 (e.g., operational data sources and/or data warehouses). ETL processes 32 may be implemented using third party ETL software (e.g., Informatica Power Center, IBM InfoSphere DataStage, IBM Cognos Data Manager, Talend Open Studio and/or Microsoft SQL Server Integration Services) and/or via software programs written in a selected programming/scripting language. In some implementations, both third party ETL software and custom ETL program(s) may be used in combination.

BI ecosystem 30 may include BI environment 20, External Security Provider(s) 4, and/or a set of ETL processes 32 and/or upstream data sources 33.

Figure 1F:
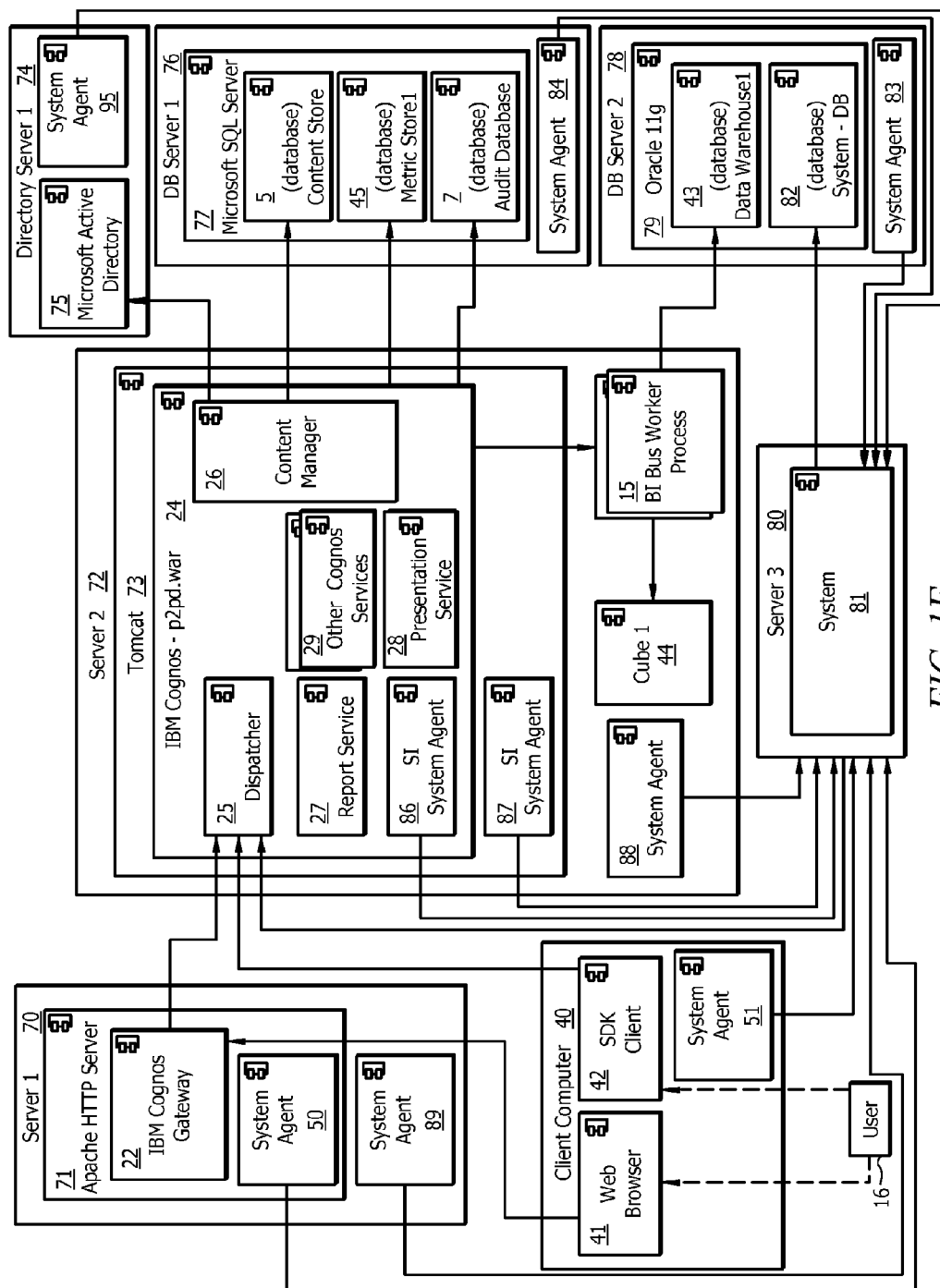
FIG. 1F depicts a schematic illustration of an example deployment of an implementation of a BI environment and system, namely, a UML Deployment Diagram.

FIGS. 1E and 1F are schematic illustrations of an implementation of an example deployment of a BI environment and various components. It should be understood that BI ecosystem, and the deployment thereof, shown in FIGS. 1E and 1F are for illustrative purposes only and that any other suitable system or subsystem could be used in conjunction with, or in lieu of, the described BI ecosystem.

FIG. 1E illustrates an implementation of a UML Deployment Diagram that depicts a high level view of an example of how a portion of the components of the BI environment 20 may be deployed on one or more physical computers.

Addressing first the client side components depicted in FIG. 1E, User 16 may utilize client computer 40 to access a BI environment and an instance of a BI software. Client computer 40 may host a web browser 41 and an SDK client 42.

Web browser 41 may be directed by User 16 to issue requests (e.g., HTTP requests) to Gateway 22, which is hosted in Apache HTTP server 71, running on server 1 70. The Gateway 22 may forward the requests or at least a portion of the requests to the Dispatcher 25, in some implementations. When utilizing web browser 41 to access instance 14, various components of instance 14 may be depicted and utilized from web browser 41 including, but not limited to, authoring studios 12, BI dashboards, BI prompt screens, BI outputs, BI administration screens, and/or any other suitable information generated by or pertaining to instance 14.

SDK client 42 may be an example of any client program that issues SOAP requests and/or other remote invocation requests. These SOAP requests may be frequently targeted directly at dispatcher 25. In some implementations in which IBM Cognos is used for the BI environment, examples of SDK client 42 may include certain modeling tools provided by IBM Cognos such as framework manager 11, transformer 10, and/or metrics designer 9. In some implementations in which third party tools are used (e.g., instead of and/or in addition to those provided by IBM Cognos), examples of SDK client 42 may include third party tools that utilize SOAP requests and/or other remote invocation requests to access and/or manipulate content and/or configuration in instance 14 and/or orchestrate various activities in instance 14. Although not shown in FIG. 1E, in some implementations, SDK client 42 may issue requests to gateway 22.

Now addressing the server side components depicted in FIG. 1E, Apache HTTP server 71 may be an implementation of web server 21 depicted in FIG. 1C. Tomcat 73 may be an implementation of servlet container 23 depicted in FIG. 1C. Cube 1 44 and Data Warehouse1 43, alone or together, may be implementations of BI data sources 8 depicted in FIG. 1C.

In some implementations as illustrated in FIG. 1E, server 1 70 may run Apache HTTP server 71, which is configured with gateway 22. Gateway 22 may be configured to serve static content deployed on a file system accessible to Apache HTTP server 71 processes. Gateway 22 may recognize one or more instances of dispatcher 25. Although depicted in FIG. 1E as a single instance of dispatcher 25, a plurality of instances of dispatcher 25 may be used. In some implementations, at least a portion of the requests targeted at gateway 22 (e.g., requests for non-static content) may be forwarded to dispatcher 25 for processing.

As depicted in the implementation of FIG. 1E, Tomcat 73 (a servlet container) may be a process that can run on server 2 72. The p2pd.war 24 web application may also be deployed and run inside of Tomcat 73. In some implementations, zero or more instances of BI Bus Worker Process 15 may run on server2 72. The p2pd.war 24 may manage and/or delegate processes to BI Bus Worker Process 15. BI Bus Worker Process(es) 15 may be used to access data from data warehouse 1 43 (e.g., an Oracle Database 79) and/or Cube 1 44.

The directory server 1 74 may host Microsoft active directory 75, which is an implementation of external security provider (e.g., External Security Provider 4 depicted in FIG. 1C). Content manager 26 may interact with Microsoft active directory 75 for operations such as authentication requests, enumerating lists of Users, groups, roles and/or organizational hierarchy structures, and/or querying for Users, groups and/or roles (e.g., that match predetermined criteria).

The DB server 1 76 may be a server that hosts an instance of Microsoft SQLServer 77. The instance of Microsoft SQLServer 77 may host database(s) that are utilized by instance 14, including, but not limited to, the p2pd.war 24 component of instance 14. The databases may include the Content Store database 5, Metric Store 1 database 45, and/or audit database 7. Moreover, content manager 26 may access, store, and/or manipulate BI content and/or configuration in Content Store database 5. The p2pd.war 24, and/or components or delegates thereof, may store and/or access metric related data in Metric Store 1 database 45 and may store and/or access audit data in audit database 7. DB server 2 78 may host an instance of Oracle 11g 79 and this instance of Oracle 11g 79 may host data warehouse1 database 43 (e.g., a database schema). The BI Bus Worker Process 15 may access data in the Data warehouse 1 database.

FIG. 1F illustrates an implementation of a UML Deployment Diagram that depicts a high level view of an example of how BI environment 20 may potentially change when the described system(s) and/or process(s) are implemented and/or configured.

System 81 depicts an implementation of the described system(s) and process(s). As illustrated in FIG. 1F, system 81 may be hosted on server 3 80. The system 81 may be communicably coupled (e.g., directly coupled and/or indirectly coupled through a network connection) with component(s) of the BI ecosystem and/or system agent(s). System 81 may orchestrate one or more modules, such as system agents 83 through 51. The described systems and/or processes are not limited to any particular number or type of system agents, and any suitable number and/or type of system agents may be orchestrated by system 81. System agents 83 through 51 may be utilized to collect, record (e.g., store on a memory coupled to the system), and/or transmit statistics, such as resource usage, server load, and/or network traffic on any one or more components of BI environment 20 or BI ecosystem 30. System agents 83 through 51 may also be utilized to record communication requests issued by and/or targeted to components of BI environment 20 or BI ecosystem 30. Module(s) (e.g., instructions executed by processor(s) of the SI system) such as the described system agent(s) may perform and/or facilitate (e.g., collaborate, assist, and/or be involved in) one or more of the operations as described in FIGS. 5A, 5B, 5C, 5D, 5E, 6A, 6B, 7A, 7B, 7C, 8A, 8B, 8C, and/or 9. Although shown in one example configuration in FIG. 1F, system agents may be deployed inside or alongside any of the components or servers in the BI Ecosystem.

In some implementations, system 81 may direct system agents 83 through 51 remotely by instructing them to perform operations such as: start recording, stop recording, transmit recorded data, respond to queries regarding recorded data or local environment, purge recorded data, update configuration, list configuration, shutdown, reset, recalibrate and/or initialize. System agents 83 through 51 may be deployed on the various computers hosting components related to BI ecosystem 30 and/or inside container components that are related to BI ecosystem 30. The locations and/or configurations of system agents depicted as 81 through 51 in FIG. 1F are illustrations of an implementation of the described systems and processes; however, and any appropriate location and/or configuration may be utilized.

As illustrated in FIG. 1F, system agents 83 through 51 include:

1. System agent 83 which may be utilized to monitor and/or record data such as resource usage, server load and network traffic on DB server 2 78.
2. System agent 84 which may be utilized to monitor and/or record data such as resource usage, server load and network traffic on DB server 1 76.
3. System agent 805 which may be utilized to monitor and/or record data such as resource usage, server load and network traffic on directory server 1 74.
4. SI system agent 86 which may be utilized to monitor and/or record data such as process calls (e.g., including the corresponding context and timings thereof), resource usage, and/or other suitable data residing within p2pd.war 24.

In some illustrative embodiments, SI system agent 86 is a module that receives messages directed to content manager 26. Messages may be received from any other service in web application 24, for example, dispatcher 25. Messages may also be received from another application running on server 2 72 or another server. SI system agent 86 receives the messages directed to content manager 26 and identified particular content in the messages. In one illustrative embodiment, SI system agent 86 identifies the type of operation to be performed by content manager 26, as requested by the sender of the message.

Further, SI system agent 86 may identify the content in Content Store 5 to which the operation is to be performed. For example, SI system agent 86 may be configured to identify messages directed to content manager 26 that include a request to create, update or delete content in Content Store 5. SI system agent 86 may identify other operations and/or other types of messages directed to content manager 26 in other illustrative embodiments.

When SI system agent 86 identifies a message that matches a predefined type of message, SI system agent 86 generates a notification containing information from the message and/or information derived from the message. For example, SI system agent 86 may identify a message directed to content manager 26 requesting that content manager 26 update metadata about an object in Content Store 5. SI system agent 86 receives the message and determines whether SI system agent 86 is configured to generate a notification based on the message. In one illustrative embodiment, SI system agent 86 identifies messages that request content manager 26 modify and/or delete an object in Content Store 5. In such an illustrative embodiment, SI system agent 86 identifies the object in the message that is to be modified and how the object is to be modified. SI system agent 86 then generates a notification with the type of operation, the object to be modified, and the new metadata to be saved.

SI system agent 86 may then retransmit the message to content manager 26. In some illustrative embodiments, however, SI system agent 86 may not retransmit the message and/or inhibit content manager 26 from receiving the message. In other illustrative embodiments, SI system agent 86 may retransmit the message to another server, module, or other similar entity.

In some illustrative embodiments, SI system agent 86 may send the notification to system 81 on server 3 80 when SI system agent 86 generates such a notification. In other illustrative embodiments, SI system agent 86 may notify multiple servers from a predefined group of servers, another module in web application 24, a module in Tomcat 73, or another such entity.

5. SI system agent 87 that may be utilized to monitor and/or record data relevant to hosted components, services, requests and/or other data within Tomcat 73.

In some illustrative embodiments, SI system agent 87 is also configured to receive requests for information. The information requested may include connection information for establishing a connection with system 81, information for identifying web application 24 when communicating with system 81, and other such information. For example, the connection information may include a URL for accessing system 81 and an identifier for web application 24 that identifies web application 24 to system 81.

When a request for information is received from SI system agent 87, SI system agent 87 provides the requested information. In some illustrative embodiments, SI system agent 87 verifies an authentication and/or an authorization for the requestor. In other illustrative embodiments, SI system agent 87 includes a proxy component. The proxy component in SI system agent 87 receives a request for information in system 81 from a requestor. In such illustrative embodiments, SI system agent 87 may forward at least a portion of the request for information to system 81. SI system agent 87 may then receive a response from system 81 and return at least a portion of the response to the requestor.

6. System agent 88 which may be utilized to monitor and/or record data such as resource usage, server load and network traffic on server2 72.
7. System agent 89 which may be utilized to monitor and/or record data such as resource usage, server load and network traffic on server 1 70.
8. System agent 50 which may be utilized to monitor and/or record data, such as requests and timings, residing within Apache HTTP server 71.
9. System agent 51 which may be utilized to monitor and/or record relevant data such as resource usage, machine load, and network traffic and requests on a client side computer 40 that is utilizing BI environment 20 or viewing outputs produced from BI environment 20.

System 81 may monitor and/or record persistent information such as content, configuration, history and/or statistics in system DB database 82. The data monitored and/or recorded by the system agent(s) may be delivered to and/or stored in a memory (e.g., coupled to the system and/or of the system).

In some implementations, system 81 and/or portions thereof (e.g., modules of the system) may:
1. render a User experience for the described system(s) and process(es), respond to User input for various User interactions with the described system(s) and process(es), including but not limited to the described User interactions;
2. execute and/or orchestrate tests;
3. perform and/or orchestrate analysis of selected BI content or BI configuration; and/or
4. perform other operations disclosed (e.g., operations described in FIGS. 5A-9 and/or other operations and/or combinations of operations) as part of the described system(s) and process(es).

Figure 1G:
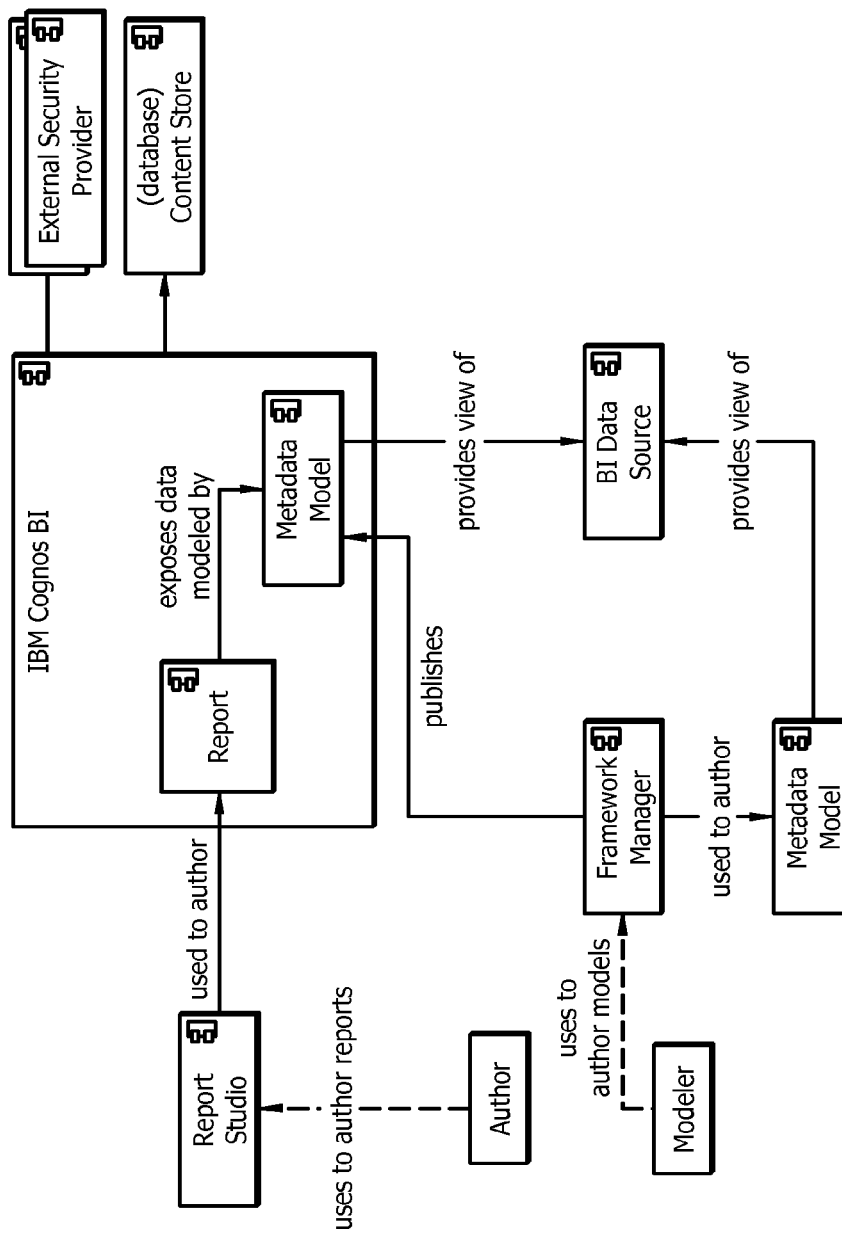
FIG. 1G depicts a schematic illustration of an example metadata model in an implementation of a BI environment, namely a UML Component Diagram.

FIG. 1G depicts a schematic illustration of an example metadata model in a BI environment, namely a UML Component Diagram, according to an implementation of the present disclosure. A metadata model (e.g., package in Cognos) may provide a view of one or more data sources. The metadata model may provide a more business friendly and/or User-friendly "semantic" layering on top of one or more physical data sources. This layer may be used to organize data into hierarchical dimensions, define aggregation (e.g., "rollup") rules, define row level security, internalizations, etc. A portion may be an exposed portion (e.g., slice) of a larger metadata model that is authored in the Framework Manager. For example, a User may build a metadata model and publish at least a portion as a package. The package may be stored in a database, such as IBM Cognos Content Store database.

In some implementations, BI artifacts such as reports may be associated with a metadata model. The report may expose data through the associated metadata model (or in some cases, a report may expose data directly from a BI data source, effectively bypassing the metadata modeling layer). In some implementations, the BI environment may include a Framework Manager Metadata Model. The Framework Manager Metadata Model may be offline and/or unpublished. The Framework Manager Metadata Model may be stored in a file system.

Figure 1H:
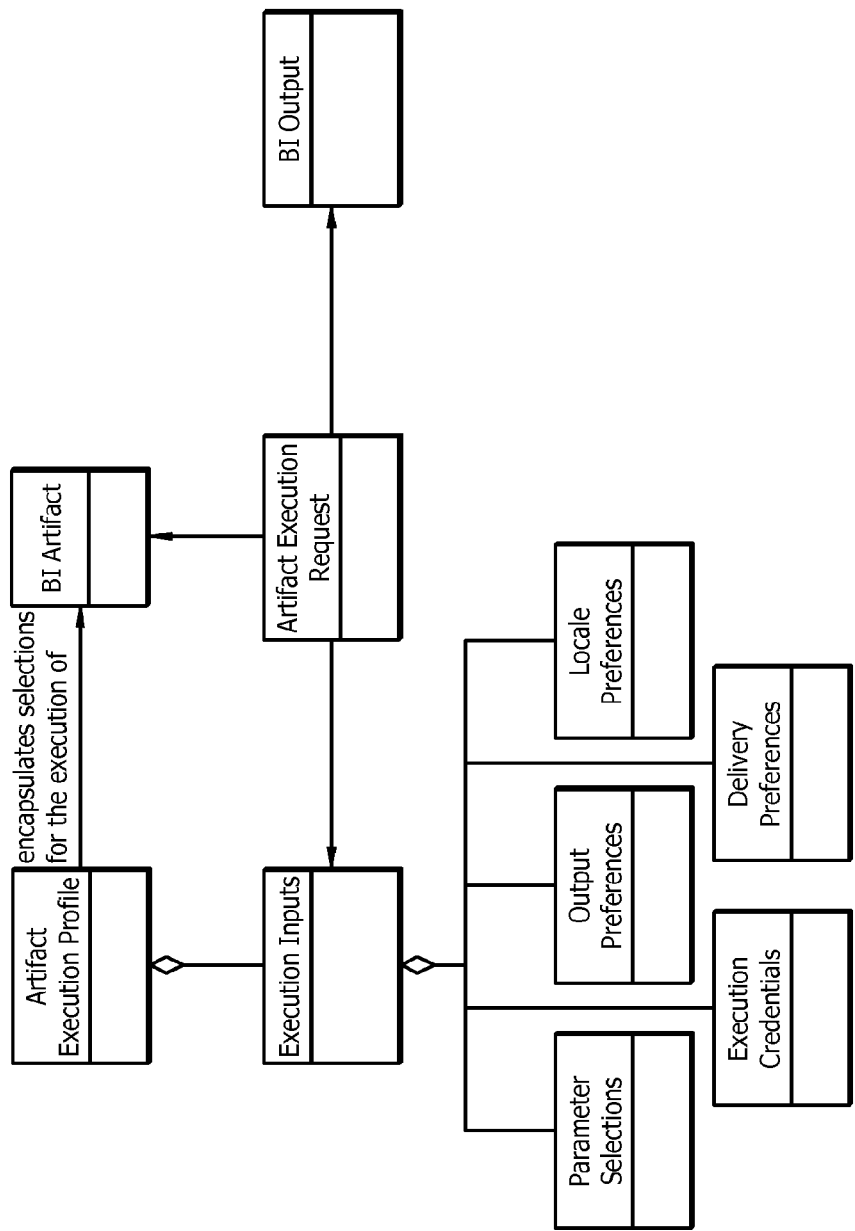
FIG. 1H depicts a schematic illustration of an example artifact execution profile, namely a UML Analysis Class Diagram.

FIG. 1H depicts a schematic illustration of an example artifact execution profile, namely a UML Analysis Class Diagram, according to an implementation of the present disclosure. An artifact execution profile represents one way to execute a BI artifact. An artifact execution profile aggregates and persists one set of execution input selections. It can be burdensome on Users if there are a large number of choices that must be made each time they execute a BI artifact. An artifact execution profile allows a User to save off these selections so that they can later re-execute the same BI artifact with the exact same selections. One or more BI outputs (e.g., one for each requested format) may be generated by the BI system in response to the execution of a BI artifact in the BI environment (e.g., successful execution). For example, the BI Output may be a PDF, an Excel, an HTML, and/or any associated resource and/or any other appropriate type of file. The BI output may be delivered as a file or a stream of data (in compressed or uncompressed form).

FIG. 1I depicts a schematic illustration of an example report execution profile, namely a UML Analysis Class Diagram, according to an implementation of the present disclosure. A report execution profile represents one way to execute a report. A report execution profile aggregates and persists one set of execution input selections. It can be burdensome on Users if there are a large number of choices that must be made each time they execute a report. A report execution profile allows a User to save off these selections so that they can later re-execute the same report with the exact same selections (e.g., parameters such as "North America", "Europe", and/or "Asia"). One or more report outputs (e.g., one for each requested output format) may be generated by the BI System in response to an execution of a report (e.g., a successful execution). For example, the report output may include a PDF, an Excel, an HTML, an MHTML and/or any associated resource and/or any other appropriate type of file. The report output may be delivered as a file or a stream of data (in compressed or uncompressed form).

In various implementations, BI Artifact(s), property set(s), package(s), content associated with packages, and/or content associated with label(s) may be deployed to a BI environment. In some implementations, a BI Artifact, a package, and/or a contents of a label (e.g., one or more BI Artifacts, packages and/or a property set identified in the SI system) associated with a first BI environment may be deployed in a different BI environment. For example, BI Artifact(s), package(s), and/or the content of label(s) may be created in a development BI environment by BI developers and may be later deployed in a QA BI environment. In some implementations, for example, a package may be tested in a QA BI environment by QA professionals and may be deployed in a production BI environment for consumption by BI consumers. When the BI Artifact(s), package(s), and/or content(s) of label(s) are deployed by the SI system, the SI system may access the BI Artifact(s), package(s), and/or label(s). For example, the SI system may retrieve a BI Artifact and/or a label (e.g., label and/or contents of the label) from a memory of the SI system and/or the BI environment. In some implementations, the SI system may determine a label associated with the BI Artifact and/or package (e.g., from a memory coupled to the SI system) and retrieve (e.g., from a memory of the SI system) the BI Artifact and/or package based on the associated label. The SI system may generate a copy of the BI Artifact, content of a package, and/or content of a label in the second BI environment, such that the BI Artifacts (e.g., in the copied BI Artifact(s), package(s) and/or label(s)) may be tested and/or executed in the second BI environment. For example, the SI system may retrieve a copy of a package from a database coupled to the SI system (e.g., SI database) and generate the package in the second BI environment based at least partially on the retrieved copy. In some implementations, the SI system may retrieve a copy of the contents of a label associated with a package selected for deployment and generate the label contents and/or the selected package in the second BI environment based at least partially on the retrieved copy.

Figure 3A:
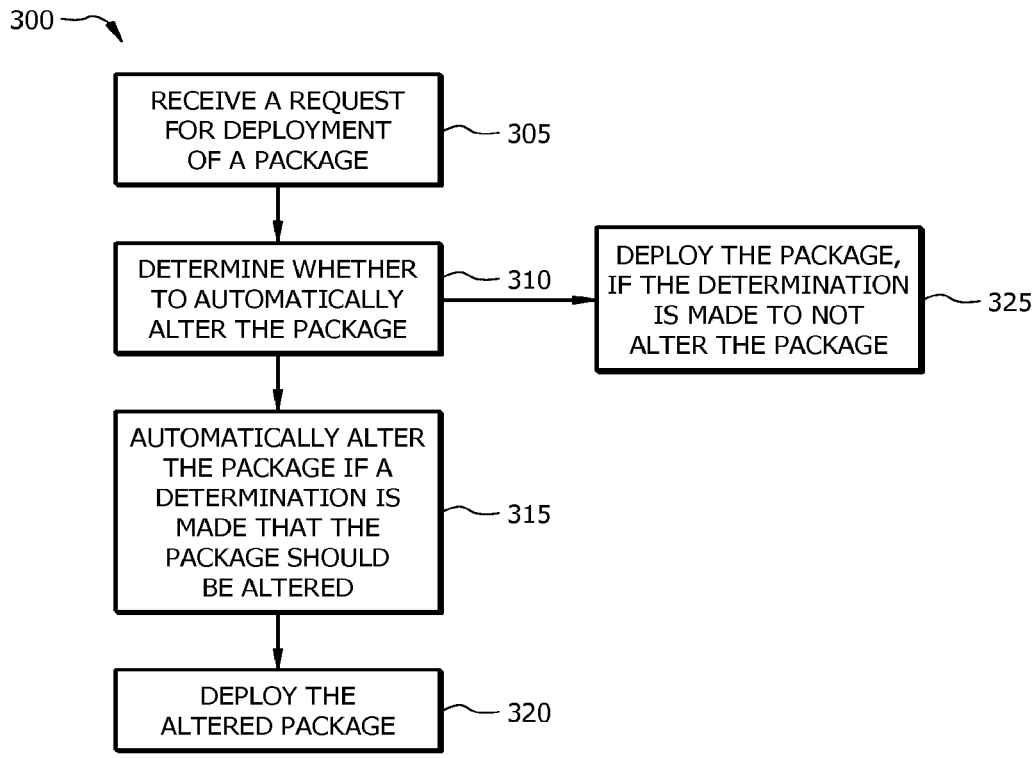
FIG. 3A illustrates an implementation of an example process for deployment using the SI system.

In some implementations, packages, the content of the packages, and/or the content of labels may be altered (e.g., automatically by the SI system and/or manually, for example, by prompting the user to provide the appropriate alteration) prior to deployment. FIG. 3A illustrates an implementation of an example process 300 for deployment using a SI system. A request for deployment of a package may be received (operation 305). For example, a user may request that a package identified in a first BI environment be deployed in a second BI environment. The package may include one or more BI Artifacts (e.g., which may be created, altered, and/or previously deployed in a first environment). The user may request that the package be deployed through an interface of the SI system.

A determination may be made whether to automatically alter the package (operation 310). For example, a determination may be made whether to alter the package based on properties of the first BI environment, properties of the second BI environment, properties of the package, properties of the property set associated with the package, properties associated with other components (e.g., associated components), etc. A determination may be made to alter a package, in some implementations, if reference(s) to external datasource(s) are different between the first BI environment and the second BI environment. For example, first data in a first external database with a first object path (e.g., a search path in IBM Cognos) may be associated with the first BI environment and the same first data in a second external database may be associated with a second object path. In some implementations, a first data source may be coupled to a first BI environment and a second datasource may be coupled to a second BI environment. The first data may be accessible through the first datasource with a first object path and the same first data may be accessible through the second datasource with a second object path. When deploying a BI Artifact that references the first data from a first BI environment to a second BI environment, the object path to refer to the first data should be altered from the first object path to the second object path. Thus, the SI system may be utilized to determine whether the package and/or BI Artifact include information that may be altered to facilitate deployment.

If a determination is made that the package should be altered, then the package may be automatically altered (operation 315). For example, references to a first object path associated with data in the first BI environment may be changed to references to a second object path that is associated with similar data in the second BI environment. In some implementations, a property set associated with a package may be automatically altered based on properties of the second BI environment. For example, a first user and/or group of users may be allowed a first set of permissions (e.g., alterations) in the first BI environment and a second set of permissions in the second BI environment. A determination of whether the package is to be altered may be based on whether the first set of permissions is similar or different with the second set of permissions; and, when the second set of permissions is different from the first set of permissions then the set of permissions may be changed to the second set of permissions. In some implementations, a property set associated with a BI Artifact, package, and/or label may be retrieved. The retrieved property set may be analyzed to determine whether the package should be automatically altered. For example, the retrieved property set may be compared to a predetermined property set (e.g., associated with a previous version of the BI Artifact, associated with the BI environment in which the package will be deployed, and/or associated with other components) to determine whether the package should be automatically altered.

The altered package may be deployed (operation 320). For example, the SI system may save the altered package in a memory of the SI system (e.g., as a version of the package, BI Artifact, and/or label associated with the package). The SI system may retrieve and/or transmit the altered package to the second BI environment such that a copy of the altered package is generated in the second BI environment. The altered package may thus be deployed in the second BI environment.

In some implementations, a determination may be made that the package should not be altered, and the package may be deployed (operation 325). Alteration of the package may be restricted, in some implementations. For example, a user may select an option to restrict alteration of the package (e.g., deploy as selected request from a user). A copy of the package may be retrieved, in some implementations, from a memory coupled to the SI system and a copy of the package may be generated in the second BI environment for deployment.

Process 300 may be implemented by various systems, such as the systems illustrated in FIGS. 1A and 1F. In addition, various operations may be added, deleted, and/or modified. For example, more than one package may be selected for deployment. In some implementations, BI Artifact(s), property set(s), and/or contents of label(s) may be selected for deployment. When BI Artifact(s), property set(s), and/or the contents of label(s) are selected for deployment, a determination may be made whether to alter the contents of the BI Artifact(s), property set(s), and/or contents of label(s). In some implementations, a request for deployment of a package may be received and a label associated with the package may be identified. A determination may be made whether to alter the label (e.g., the label and/or contents thereof). BI Artifact(s) may be selected for deployment, in some implementations. For example, rather than or in addition to selecting a package for deployment and/or contents of a label for deployment, a BI Artifact may be selected for deployment. A determination whether to alter the BI Artifact may be made and the altered or unaltered BI Artifact may be deployed, as appropriate. In some implementations, the content(s) of a package and/or the content(s) of a label may be manually altered. For example, the SI system may identify one or more portions for alteration (e.g., based on invalid file paths, based on different property sets, etc.). The SI system may generate an interface for presentation of the portions for alteration to a user and the user may alter the portions of the package and/or portions of the content of a label. In some implementations, the alteration of the BI Artifact, package, and/or contents of a label may be made to the copy to be provided to a BI environment for deployment.

In some implementations, the SI system may utilize deployment criteria to determine whether to alter (e.g., automatically and/or manually) BI artifact(s) prior to deploying BI artifact(s). The BI Artifact(s) may be included in a package and/or label, in some implementations. For example, as illustrated in FIG. 1, the SI system 180 may receive a request from a user for deployment of a BI Artifact, such as Report A, from BI environment B 120 to BI environment C 130. Report A may have been created in BI environment A 110 and previously deployed in BI environment B 120. The SI system may identify and/or retrieve a set of deployment criteria. For example, the deployment criteria may include predetermined rules (e.g., stored in a memory of the SI system). The rules may be rules applicable to one or more BI environments, types of BI Artifact(s), types of user(s), regions of operation for an enterprise, etc. The SI system may modify and/or restrict modification of the BI artifact for deployment based on the deployment criteria. For example, when deploying a BI Artifact from a BI environment to a different BI environment, object paths may need to be altered (e.g., to be associated with the correct database). Thus, for example, the deployment criteria may identify the origin (e.g., BI environment in which the BI Artifact was created), the residence (e.g., the BI environment from which the BI Artifact is requested to deploy), and/or the target (e.g., the BI environment in which the BI Artifact will be deployed). The deployment criteria may then alter the BI artifact based at least partially on the identified origin, residence, and/or target. For example, if the BI artifact includes images, then the object paths to the images may be altered such that they correspond to an appropriate source of the images that is accessible in the target BI environment. The deployment criteria may be user specified. In some implementations, a configuration of a BI artifact may be altered to be appropriate for a target BI environment.

In some implementations, deployment of the content(s) of label(s), package(s), property set(s), and/or one or more BI Artifact(s) may be facilitated with the SI system. FIG. 2A illustrates an example label 200. As illustrated, the label 200 may include three BI Artifacts, such as reports R1 210, R2 220, and R5 230. The BI Artifacts in the label 200 may be related, in some implementations. FIG. 2B illustrates an implementation of an example deployment 243. For example, R1 210 may include a reference to R2 220 (e.g., the BI Artifact R1 may refer to an output of BI Artifact R2), and R2 may include a reference to R5 230, and R5 may include a reference to R1. In some implementations, the BI Artifact R1 210 may contain a reference, such as, for example, a drill through link to BI Artifact R2 220. Thus, when the contents of label 200 are deployed to a second BI environment 245, direct sequential copying of the BI Artifacts in the label (e.g., copy R1 210, then copy R2 220, then copy R5 230) may be inhibited since the references to other BI Artifacts in the label may not be set, may not be provided and/or may be null without the deployment of the other BI Artifacts. For example, as illustrated in FIG. 2B, when deploying R1 210 in the second BI environment, deployment may fail since R1 refers to R2 220 but R2 has not yet been deployed in a target BI environment (e.g., a BI environment in which the BI Artifact is to be deployed) and/or an appropriate version of R2 (e.g., a version that includes information to which R1 refers) has not yet been deployed in the second BI environment.

In some implementations, the relationship between the BI Artifacts associated with a label may inhibit arbitrary copying of the BI Artifacts into a BI environment. For example, a first BI Artifact, Report, R1, and a second BI Artifact, Query, Q1, may be associated with a label and/or deployment package. The BI Artifact Output of the Query, Q1, (e.g., a result of the Query Q1) may be utilized and/or included in the Report, R1. Thus, the BI Artifact Output of Report, R1, may include a reference to the BI Artifact Output of the Query, Q1. To allow deployment (e.g., a deployment without creating unsatisfied references), an order for deployment and/or a multi-stage deployment operation may be determined.

Figure 3B:
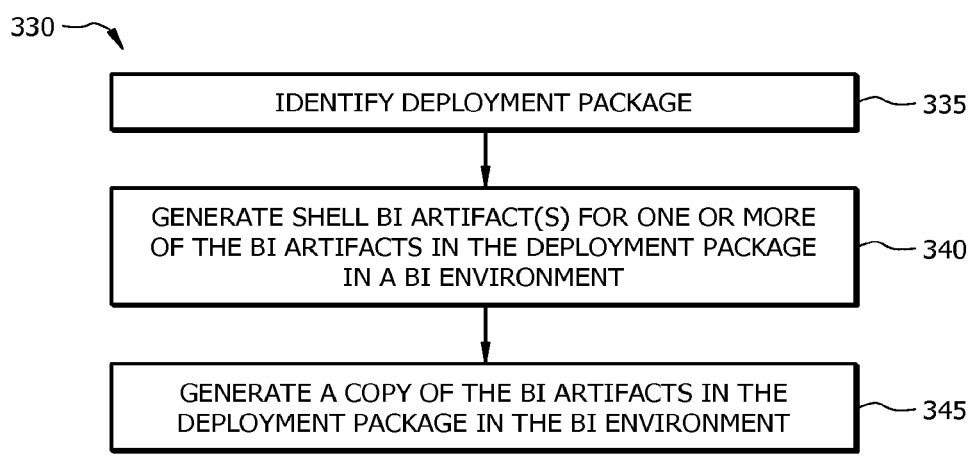
FIG. 3B illustrates an implementation of an example process for multi-part deployment using the SI system.

Thus, the SI system may allow a multipart deployment. For example, the SI system may deploy BI Artifact(s) and/or Property Set(s) in more than one step (e.g., to inhibit failure of the deployment due to unsatisfied references, such as a reference whose object is not available). FIG. 3B illustrates an implementation of an example process 330 for multipart deployment. A deployment package may be identified (operation 335). For example, a user may request (e.g., via an interface of the BI environment and/or the SI system) deployment of a package that includes one or more BI environments. The SI system may identify the deployment package based on the request.

The SI system may generate a shell BI Artifact for one or more of the BI Artifacts in the deployment package in a BI environment (operation 340). A shell BI Artifact may precede deployment of an associated BI Artifact. The shell BI Artifact may include less information than the BI Artifact with which the shell BI Artifact is associated (e.g., a portion of the information included in an associated BI Artifact). For example, the shell BI Artifact may not include reference to one or more other BI Artifacts (e.g., other BI Artifacts in the BI environment and/or other BI Artifacts in the package). The shell BI Artifact may include a name and/or type of BI Artifact. The shell of the BI Artifact may be generated by the SI system based at least partially on the associated BI Artifact. For example, the SI system may identify a first BI Artifact in a deployment package and generate a first shell BI Artifact that includes a portion of the information from the first BI Artifact. The shell BI Artifact may be stored in a memory of the SI system and/or the SI system may generate a copy of the shell BI Artifact in the BI environment in which the deployment package will be deployed.

A copy of the BI Artifacts in the deployment package may then be generated in the BI environment (operation 345). For example, the SI system may overwrite the shell BI Artifact associated with the BI Artifact. In some implementations, the SI system may delete the BI Artifact and generate a copy of the BI Artifact included in the deployment package. In some implementations, a shell BI Artifact and/or portions thereof may be updated to generate the associated BI Artifact from the shell BI Artifact. For example, a shell BI Artifact may not include the same property set as the associated BI Artifact. The shell BI Artifact may then be updated to include the same property set as the associated BI Artifact to allow the associated BI Artifact to be generated from the shell BI Artifact.

Process 330 may be implemented by various systems, such as the systems illustrated in FIGS. 1A and 1F. In addition, various operations may be added, deleted, and/or modified. For example, a label may be selected to allow contents of the label to be deployed in addition to and/or instead of a deployment package. The BI Artifacts included in the label may be identified and shell BI Artifacts may be generated. The label may include a property set. The property set may indicate which of the properties associated with a BI Artifact and/or shell BI Artifact are to be deployed with the label. For example, the property set may include instructions, identifications, and/or other indications of which of the properties associated with a BI Artifact should be deployed in a target BI environment with the BI Artifact. The property set may restrict deployed of the all of the properties associated with the BI Artifact in the target BI environment, in some implementations. In some implementations, a shell BI Artifact may be generated in a target BI environment for each BI Artifact in the deployment package and/or label. In some implementations, the BI Artifacts may be retrieved from a memory of the SI and shell BI Artifacts may be generated and/or copies of the BI Artifacts may be generated in a BI environment based on the retrieved BI Artifacts.

In some implementations, the SI system may generate a shell in a target BI environment (e.g., a BI environment in which a BI Artifact, package, and/or contents of a label may be deployed) for each BI Artifact in a label prior to allowing deployment of the BI Artifact. FIG. 2C illustrates an implementation of an example deployment 203. As illustrated, a Label A, v2 200 may include BI Artifacts, such as R1 210, R2 220, and R5 230. Label A, v2 200 may reside in a memory of the SI system. When deploying the contents of Label A, v2 200 in a target BI environment 246, the SI system may first generate a shell R1 247, a shell R2 248, and a shell R5 249, and then generate R1 210, R2 220, and R5 230 in a second BI environment after generating the shell BI Artifacts in the target BI environment. For example, the SI system may write shell R1 247, shell R2 248, and shell R5 249 and then, as illustrated, update each shell BI Artifact to create the BI Artifact (e.g., R1 210, R2 220, and R5 230) in the target BI environment. The SI system may first write one or more of the shell BI Artifacts, and then, write additional information to the shell BI Artifact(s). For example, the SI system may write shell R1, shell R2, and shell R5 and then write additional information to the shell R1 to create R1 in the second BI environment, to shell R2 to create R2 in the second BI environment, and/or to shell R5 to create R5 in the second BI environment. The additional information written to the shell BI Artifacts may differ and/or may be at least partially the same.

Figure 3C:
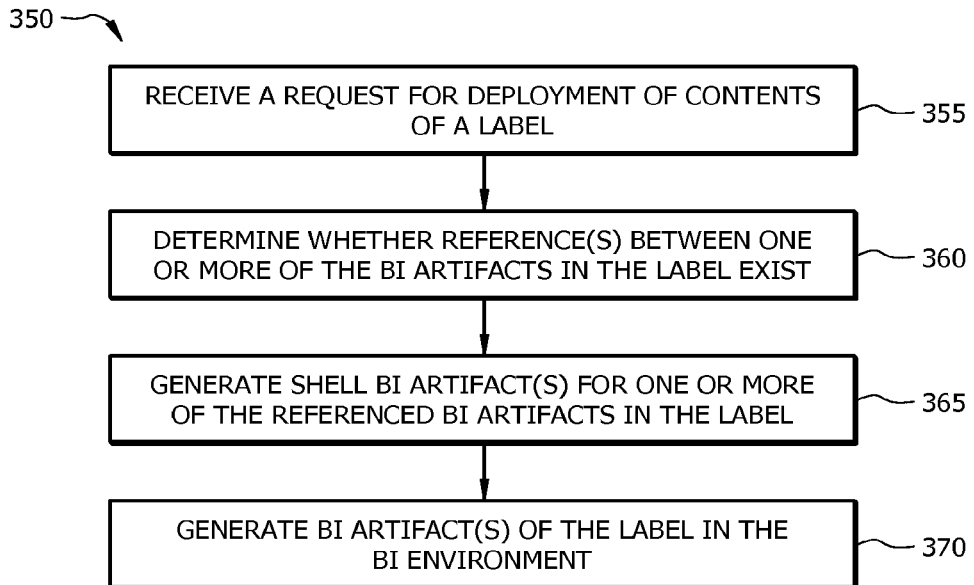
FIG. 3C illustrates an implementation of an example process for multi-part deployment using the SI system.

FIG. 3C illustrates an implementation of an example process 350 for multipart deployment. The SI system may receive a request for deployment of a label (operation 355). For example, a user may request deployment of a label and/or a package associated with a label. The SI system may retrieve the label and/or contents of the label from a memory of the SI system. The SI system may identify one or more versions of BI Artifacts that are included in the label.

A determination may be made whether reference(s) exist among one or more of the BI Artifacts in the label include a reference to other BI Artifact(s) in the label (operation 360). In some implementations, the SI system may analyze the BI Artifact to determine whether a reference to other BI Artifact(s) in the label exists. For example, the SI system may perform a relational analysis on the package or portions thereof (e.g., based on path, depth of path, folder structure, etc.). The SI system may analyze the specification of the BI Artifact to determine whether reference(s) to other BI Artifact(s) in the label exist, in some implementations. In some implementations, the SI system may analyze references, relationships, and/or dependencies of BI Artifact(s) to determine whether reference(s) exist among the one or more BI Artifacts in a label.

Shell BI Artifact(s) may be generated for one or more of the referenced BI Artifacts in the label (operation 365). The shell BI Artifact may include less information than the associated BI Artifact (e.g., may not include reference(s) to other BI Artifacts in the package). For example, if R1 210 includes a reference to R2 220, then a shell R2 may be generated in the BI environment in which the contents of the label will be deployed.

The BI Artifacts of the label may be deployed in the BI environment (operation 370). For example, the portion of the BI Artifact that is not included in the shell BI Artifact may be written to the shell BI Artifact in the BI environment. In some implementations, the BI Artifacts included in the label may be generated and the shell BI Artifacts may be deleted from the BI environment. Since the shell BI Artifacts for the BI Artifacts that are referenced by other BI Artifacts in the label have been generated, then the BI Artifacts may be deployed without failure due to reference issues (e.g., unsatisfied and/or null references).

Process 350 may be implemented by various systems, such as the systems illustrated in FIGS. 1A and 1F. In addition, various operations may be added, deleted, and/or modified. For example, a package may be selected in addition to and/or instead of a label. The BI Artifacts included in a deployment package may be identified and analyzed and shell BI Artifacts may be generated based on the analysis. In some implementations, BI Artifacts referenced in and/or by the package, and/or BI Artifacts, which reference the package may be identified and analyzed and shell BI Artifacts may be generated based on the analysis. In some implementations, a package may be identified for deployment in a user request and the SI system may determine the associated label. In some implementations, a shell BI Artifact may be generated for each BI Artifact in the label and referenced by another BI Artifact. Shell BI Artifacts may be generated for each of the BI Artifacts in a label, when a reference is determined to exist, in some implementations. In some implementations, a label may include BI Artifacts that are referenced by other BI Artifacts (e.g., in the label, in the BI environment, and/or will be in the BI environment) and BI Artifacts that do not reference other BI Artifacts. The SI system may create a shell BI Artifact for each BI Artifact that is referenced by other BI Artifact(s) in a target BI environment. The SI system may allow deployment of the BI Artifact for each BI Artifact that does not reference other BI Artifacts in the target BI environment. After deployment of the BI Artifacts that do not reference other BI Artifacts, the BI Artifacts that reference other BI Artifacts may be deployed in the target BI environment. Then, the shell BI Artifacts may be replaced and/or updated to create the BI Artifacts associated with the shell BI Artifacts in the target BI environment.

In some implementations, the SI system may allow a multistep deployment without determining whether references to other BI Artifacts in the label and/or package exist. In some implementations, if a package and/or a label do not include BI Artifacts that reference each other, the SI system may allow a multipart deployment in which shells of the BI Artifacts are utilized. In some implementations, the SI system may identify a first set of BI Artifacts of a label that include a reference to other BI Artifacts and may allow multistep deployment (e.g., creation of a shell BI Artifact) for the identified first set of BI Artifacts. In some implementations, the SI system may retrieve the BI Artifacts in the label from a database coupled to the SI system rather than directly from the BI environment from which the contents of the label are being deployed. After the SI system has generated the BI Artifacts referenced by the label in the second BI environment, the BI Artifacts of the label or portions thereof may be allowed to be executed in the second BI environment.

Figure 3D:
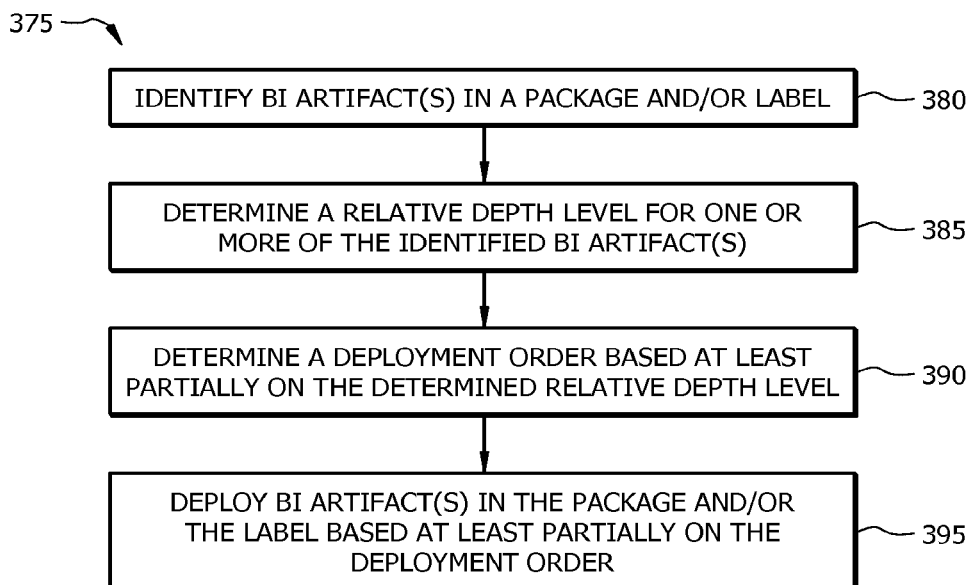
FIG. 3D illustrates an implementation of an example process for deployment using the SI system.

In some implementations, the order of deployment of components of a package and/or label may be determined. FIG. 3D illustrates an implementation of an example process 375 for determining a deployment order. BI artifact(s) in a package and/or label may be identified (operation 380). For example, a request may be received to deploy a package and/or contents of a label associated with a first BI environment in a second BI environment. The SI system may identify the components, such as the BI Artifact(s), included in the package and/or label.

A relative depth level for one or more of the identified BI Artifacts may be determined (operation 385). For example, the SI system may analyze the path and/or the depth of a path of a BI Artifact. The SI system may analyze the folder structure to which the BI Artifact belongs, in some implementations. The SI system may determine the relative depth level based at least partially on the type of the identified BI Artifact.

A deployment order may be determined based at least partially on the determined relative depth (operation 390). For example, since the relative depth level may identify which BI Artifact must be deployed prior to another BI Artifact (e.g., a folder BI Artifact may be deployed prior to contents of the folder), a deployment order may be determined.

The BI Artifacts in the label and/or package may be deployed based at least partially on the deployment order (operation 395). For example, at least a portion of the BI Artifacts may be included in the deployment order and may be deployed in the sequence listed in the deployment order.

Process 375 may be implemented by various systems, such as the systems illustrated in FIGS. 1A and 1F. In addition, various operations may be added, deleted, and/or modified. For example, in some implementations, a determination of an absolute relative depth level may be inhibited (e.g., due to references to a third party namespace and/or cloaking in an external database), and thus, an approximate relative depth may be determined. The deployment order may include deploying BI Artifact(s) with a first relative depth level first and deploying BI Artifacts with a second relative depth level next, where the first relative depth level corresponds to a highest relative depth level of the BI Artifacts in the package and/or label. In some implementations, shell BI Artifacts may be deployed based at least partially on the determined deployment order, and the associated BI Artifacts may be deployed in the same deployment order or a different deployment order. In some implementations, references between two or more BI Artifacts in a label and/or package may be determined, and the deployment order may be at least partially based on the references (e.g., such that the references are inhibited from being null references due to the deployment order and/or the references are inhibited from being made to objects that do not exist). In some implementations, a determination may be made whether to deploy based on one or more properties in a property set. For example, if a property set is not included in the label, then a default property set may be deployed. In some implementations, overwriting of an existing property set in a BI environment may be restricted, if a determination is made not to deploy a property set (e.g., a property set is not included in the label, and/or deployment criteria is not satisfied to deploy a property set). In some implementations, a property set may be retrieved from the SI system. When the deployment package and/or property set is deployed in a BI environment, a copy of the contents of the deployment package and/or property set may be retrieved from the SI environment and written to the BI environment. The SI system may determine the label associated with a package for example by querying (e.g., in a database coupled to the SI system) the label associated with a package.

In some implementations, shell BI Artifacts may be utilized when a property set is utilize by the SI system in deployment of a BI Artifact (e.g., which may or may not be associated with a package and/or label). For example, when a first version of BI Artifact is being deployed into a target BI environment with a property set, the SI system may populate properties to be associated with the BI Artifact in the target BI environment based on the property set. When a second version of the BI Artifact exists in the target BI environment, the first BI Artifact may overwrite the second version. Thus, a property not populated based on the property set may have the same value as when property was associated with the second version of the BI Artifact, in some implementations. When a second version of the BI Artifact is not present in the target BI environment, the SI system may allow population of properties based on the property set; however, since some properties associated with the first BI Artifact in another BI environment may not be deployed to the target BI environment (e.g., based on the property set), a shell BI Artifact may be generated. This shell BI Artifact may not include values for the properties that were not deployed with the BI Artifact.

In some implementations, the SI system may be utilized to undo deployments and/or revert to previous deployments. The SI system may store versions of the BI Artifacts and/or other portions of the BI environments and/or SI systems (e.g., files, labels, etc.). Thus, as BI Artifacts, for example, are changed, the SI system may identify and/or store various versions of a BI Artifact (e.g., BI Artifact with a first change, BI Artifact with no change, etc.). In some implementations, if a user would like to revert to a previous version of a BI Artifact and/or package, the user may utilize the SI system to redeploy the previous version of the BI Artifact and/or package (e.g., since the BI environment may store only a single version (e.g., latest version, current version, etc.) of a BI Artifact and/or package) at a given time.

The SI system may monitor and/or store (e.g., in a memory coupled to the SI system) packages and/or contents of labels deployed to BI environment(s), including, but not limited to, versions of labels associated with deployment packages, versions of packages, versions of property sets, versions of BI Artifacts, etc. In some implementations, the SI system may allow a user to assign an identifier (e.g., alphanumeric characters) to a label. In some implementations, the SI system may automatically assign a label to a package and/or property set (e.g., default, based on previous label identification, and/or based on user criteria) The SI system may allow changes to the contents (e.g., BI Artifacts and/or Property Sets) of the label while retaining the label identifier. The SI system may save the changes to the package as a version of the label. For example, as illustrated in FIG. 2A, the SI system may receive a label identifier of Label A, v1 200 (e.g., version 2 of Label A) from a user to be associated with a package including BI Artifacts, such as: R1, v1 210 (e.g., version 2 of the Report, R1); R2, v1 (e.g., version 1 of Report, R2); R5, v5 (e.g., version 5 of Report, R5); and Property Set, v2 240 (e.g., version 2 of the Property Set). The user may alter one or more of the components in the label, Label A, v1 200 and the SI system may (e.g., automatically or based on a user request) assign the modified set to a second version of the label, Label A, v2 202, illustrated in FIG. 2D. For example, the user may change R2, v2 210 associated with Label A, v1 200 to R2, v3 250 (e.g., version 3 of Report, R2), R5, v5 230 associated with Label A, v1 to R5, v4 (e.g., version 4 of Report, R5), and Property Set, v2 240 associated with Label A, v1 to Property Set, v1 280.

In some implementations, the label may facilitate deployment. For example, a request for deployment of a package in a BI environment may be received (e.g., by the SI system). A label associated with the package may be determined. A determination may be made whether a property set is associated with the determined label. For example, the SI system may store labels and packages and/or property sets associated with a label. Thus, when a package is identified by a user, a label associated with the package may be retrieved from a memory of the SI system. If a property set is not associated with the label, overwriting of the property set in the BI environment may be restricted. If a property set is associated with the label, then the property set included in the label may be retrieved (e.g., from a memory of the SI system) and deployed with the package for deployment. In some implementations, if a property set is not associated with the label, a default property set may be generated in the BI environment.

Figure 4:
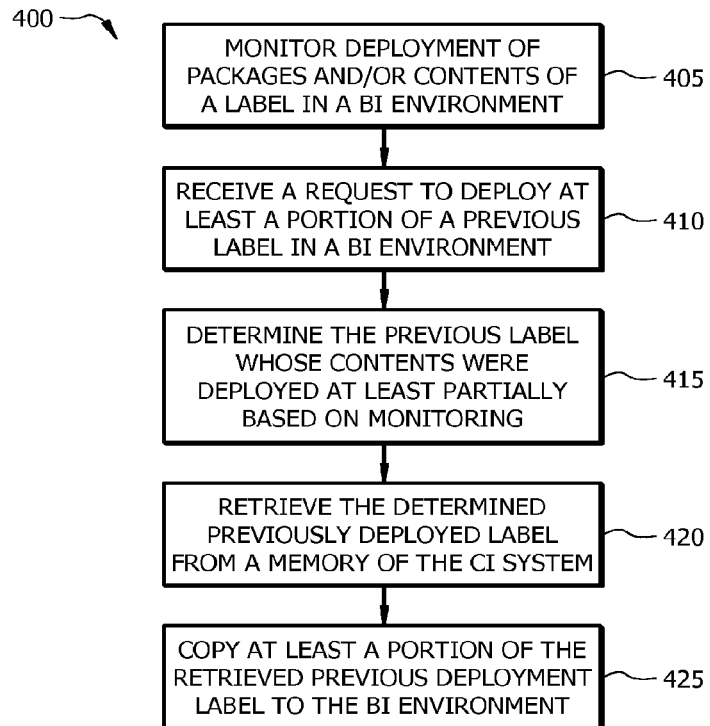
FIG. 4 illustrates an implementation of an example process for deploying a previous deployment.

FIG. 4 illustrates an implementation of an example process 400 for deploying previous deployments. Deployment of packages and/or content(s) of labels in BI environment(s) may be monitored (operation 405). For example, the SI system may monitor and/or store information related to when a package is deployed and/or the content of the packages and/or labels.

A request may be received to deploy at least a portion of a previously deployed label (e.g., contents of the label) in a BI environment (operation 410). The request may identify which previous deployment the user would like to deploy in the BI environment. For example, a user may request that a deployment of the contents of a label be undone (e.g., undo the current deployment by selecting a user interface element, such as an "undo" button). In some implementations, the user may request that a BI Artifact be reverted to a previous BI Artifact.

The previously deployed label (e.g., label associated with previously deployed BI Artifacts) may be determined based at least partially based on the monitoring. For example, if the user requests that the SI system undo the current deployment, the SI system may determine which label was replaced by the currently deployed label. The currently deployed label may be the label associated with one or more of the currently deployed BI Artifacts in a BI environment, in some implementations. If the user request that the SI system revert to a user identified previous deployment, the SI system may determine which label is associated with the identified previous deployment.

The determined previously deployed label may be retrieved from a memory of the SI system (operation 420). For example, since the SI system may monitor and/or store versions of the packages and/or contents of labels deployed, the SI system may have access to the version of the label that is determined to be the previous label.

A copy of at least a portion of the content(s) of the retrieved label may be deployed in the BI environment (operation 425). For example, the portion of the content(s) of the retrieved label that is deployed in the BI environment may be based at least partially on the request (e.g., a request may specify a portion of a label to be deployed). A copy of the content(s) of the retrieved label may be generated in the BI environment by the SI system, in some implementations.

Process 400 may be implemented by various systems, such as the systems illustrated in FIGS. 1A and 1F. In addition, various operations may be added, deleted, and/or modified. For example, a request may be received to deploy at least a portion of a package. The SI system may determine the identity of a previously deployed package and/or a label associated with the previously deployed package. The previously deployed label and/or package may be the label and/or package associated with the last deployed BI Artifact(s) or versions thereof. For example, the previous version of a package may be the last version of a package deployed prior to the current version that has been deployed (e.g., to effectively undo a last deployment package).

The previously deployed label and/or package may be a version of the label and/or a version of the package associated with BI Artifacts deployed more than one deployment ago. In some implementations, when the contents of the retrieved label and/or package are deployed, the contents of the current deployment label and/or package may be deleted and/or overwritten.

In some implementations, a determination may be made (e.g., by a module of the SI system) whether a BI Artifact in the BI environment existed in the previous deployment; and if the BI Artifact did not exist in the previous deployment, the BI Artifact may be deleted. The SI system may compare the properties in the BI environment when the previous deployment was operating in the BI environment, in some implementations. For example, the SI system may compare a first Property Set previously deployed in the BI environment when the previously deployed package was operating to the current second Property Set. If the SI system determines that the first property set and the second property set are different, the SI system may automatically redeploy at least a portion (e.g., a portion related to the package) of the first Property Set with the previously deployed package.

One or more tests may be performed on the previous deployment prior to, after, and/or during deployment. The request for a previous deployment may be from a user, from an external change management system, from test results (e.g., instabilities identified), from candidate improvements identified by the SI system or other systems, etc. The user may provide a confirmation (e.g., via a message transmitted to the SI system) that a copy for deployment, such as the content associated with the retrieved previously deployed label and/or package is the appropriate version for deployment.

In some implementations, the SI system may determine the identity of a previous label and/or package, at least a portion of whose contents were deployed, based at least partially on the tracking of versions of labels and/or packages. In some implementations, when a SI system monitors deployment of packages and/or deployment of the content(s) of labels, the SI system may generate a deployment log that includes information about versions deployed and/or timings of deployments. The SI system may identify previous deployments based at least partially on the deployment log. In some implementations, the SI system may identify differences between the current deployment and/or the previous deployment (e.g., based on the content of the labels) and deploy the contents of a retrieved previously deployed label and/or package at least partially based on the identified differences. For example, if a BI Artifact is substantially unchanged between the two deployments, then alteration of the BI Artifact may be restricted. If a Property Set is different between two deployments, then the Property Set may be deployed, in some implementations. By deploying components of a label and/or package based at least partially on identifying differences, deployment time (e.g., time to complete a deployment) may be reduced (e.g., since redeployment of the identical BI Artifacts may be restricted, in some implementations). The SI system may utilize a multistep deployment, in some implementations.

In some implementations, the SI system may store a record of deployments. Thus, the user may request an undo of a package deployment and the SI system may automatically identify the version of the package that was deployed immediately prior to the last deployment and retrieve the identified version of the package. For example, the SI system may store versions of the labels associated with packages and/or Property Sets. As illustrated in FIG. 2A, the SI system may identify the version of the BI Artifact based at least partially on the label and/or version of a label. For example, if a user deploys a package associated with Label A, v2 and requests that the SI system undo the deployment, the SI system may automatically identify the previous version of the package based on the label. The SI system may identify Label A, v1 as the previous version of the label associated with the package and deploy the package and/or content associated with Label A, v1, based on the user request to undo the package deployment.

In some implementations, the SI system may utilize version control (e.g., management and/or storage of various versions of portions of the BI environment and/or SI system) to facilitate one or more operations of the SI system. The SI system may allow version control by identifying changes to BI Artifacts and storing the BI Artifact (and/or changes to the BI Artifact) as a version of the BI Artifact. The SI system may store the versions of the BI Artifact in a database coupled to the SI system, such as a SI database. In some implementations, the SI database may store and/or store associated with the BI artifact other information related to the BI Artifact including metadata, such as an identify of the user who made a change, a change time, a comment about a nature of a change etc. The SI database may be different from the database (e.g., content store database, external database, etc.) of the BI system. The SI system may identify new BI Artifact(s), deleted BI Artifacts, and/or changes to BI Artifact such as modifications, additions, revisions, and/or deletions. The SI system may identify changes using version control module(s) ("version control") of the SI system. For example, the SI system may monitor a BI environment at a predetermined interval and/or when manually prompted and/or modifications may be detected as they occur in the BI Environment). When new BI Artifacts are identified and stored in the database, a user may access the versions through the SI system. Thus, a user may be able to access previous versions of BI Artifacts, identify changes between versions of BI Artifacts since access to versions of the BI Artifacts are identified, identify when changes are made, identify changes in packages, undo changes and/or deployments, etc. through the SI system (e.g., as opposed to in the BI environment where versions may not be stored or tracked).

In some implementations, the SI system may identify and/or store versions of other components of the SI system and/or BI environment, such as files, labels, property sets (e.g., a designation of which properties associated with a BI Artifact are to be deployed with the BI Artifact, when the BI Artifact is deployed), etc. In various implementations, the SI system may allow version control of files, such as metadata model files. For example, a user may utilize a tool of a BI environment, such as a Framework Manager in IBM Cognos, to create a metadata model file. The metadata model file may be stored on a user device (e.g., a user computer), in some implementations. The metadata model file may then be utilized to create a metadata model in a BI environment. The metadata model may be utilized with one or more BI artifacts in the BI environment. Thus, in some implementations, the metadata model file may be stored on a local computer system and the model generated by the metadata model file may be published to the BI environment.

Figure 5A:
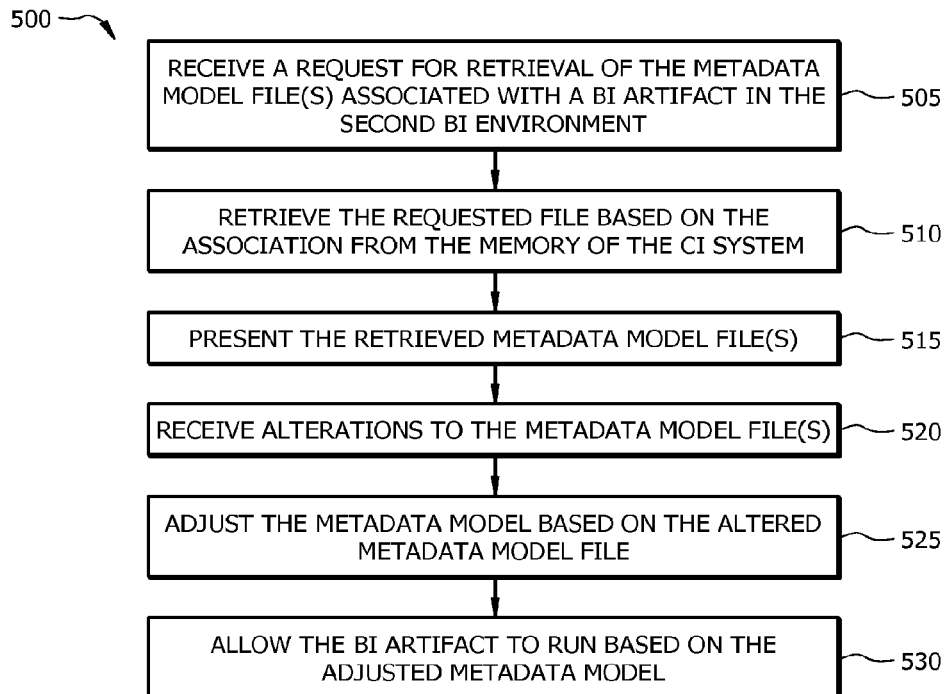
FIG. 5A illustrates an implementation of an example process for altering metadata model files.

The SI system may identify and store versions of the metadata model files and store associations with models generated. Thus, for example, when a model is deployed from a first BI environment to a second BI environment, the metadata model file and/or versions of the metadata model file associated with the model may be identifiable to other users based on the stored associations through the SI system. Thus, a user may be able to download, change, and/or view the metadata model file used to create a model that was deployed in a second BI environment even though it was created in a first BI environment. For example, FIG. 5A illustrates an implementation of an example process 500 for altering metadata model files.

A request may be received for retrieval of the metadata model file associated with a BI Artifact in a second BI environment (operation 505). The second BI environment may be a different BI environment than the BI environment in which the BI Artifact and/or the metadata model were created. For example, the BI Artifact and its associated metadata model may have been created in a first BI environment and the BI Artifact may have been deployed in the second BI environment.

The requested file may be retrieved from a memory of the SI system at least partially based on the association (operation 510). For example, metadata model file(s) may be stored in a memory of the SI system. The associations between metadata model file(s) and BI Artifacts (e.g., individually, in packages, and/or in labels) may be stored, for example, in an association table. Thus, when a user requests a metadata model file associated with a BI Artifact, the associated metadata model file may be identified and/or retrieved based on the information in the association table.

The retrieved metadata model file may be presented (operation 515). For example, the retrieved metadata model file may be presented on a graphical user interface of the SI system and/or BI environment.

Alteration(s) to the presented metadata model file may be received (operation 520). For example, the user may provide one or more changes to the metadata model file.

The metadata model may be adjusted based on the alterations received (operation 525). When the metadata model file is altered, then the metadata model generated in the BI environment (e.g., second BI environment) may be altered based on the altered metadata model file.

The BI Artifact may be allowed to run based on the adjusted metadata model (operation 530). Since the BI Artifact may be at least partially based on the metadata model, when the metadata model is adjusted the output of the BI Artifact may be adjusted. For example, if a change in the metadata model includes a change in a file path, then an output of the BI Artifact that is based on the changed file path may change.

Process 500 may be implemented by various systems, such as the systems illustrated in FIGS. 1A and 1F. In addition, various operations may be added, deleted, and/or modified. For example, the SI system may query the data stored in the memory of the SI system to determine the associated metadata model file.

Figure 5B:
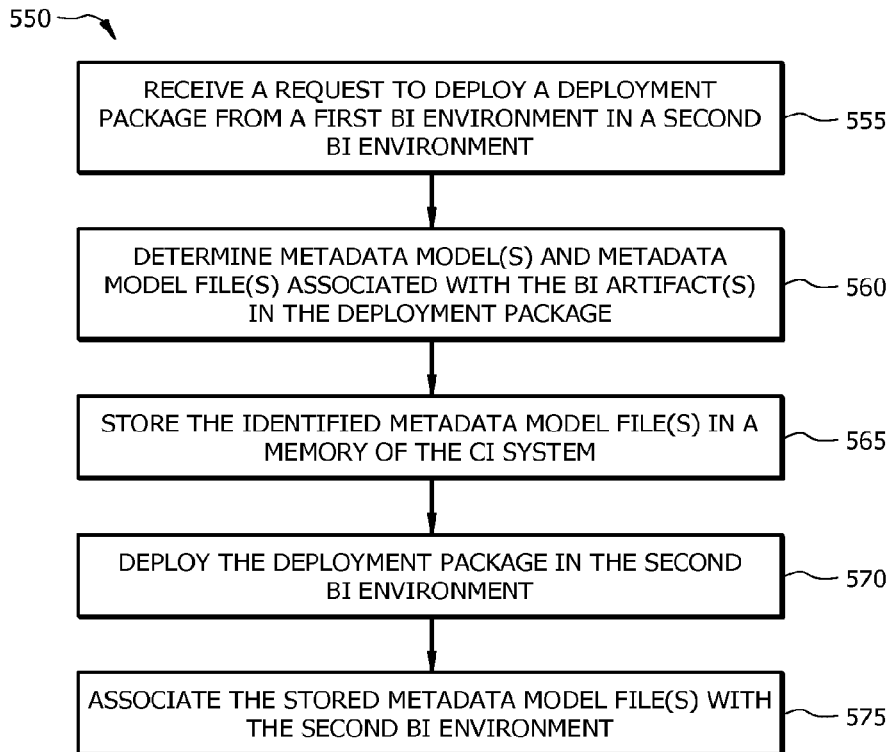
FIG. 5B illustrates an implementation of an example process for deployment.

In some implementations, the stored associations (e.g., in the association table) may include associations between a metadata model file or versions thereof and packages and/or updates to deployments. FIG. 5B illustrates an implementation of an example process 550 for deployment.

A request for deployment of a deployment package associated with a first BI environment to a second BI environment may be received (operation 555). For example, the deployment package may be created and/or previously deployed in the first BI environment and the user may request deployment of the package to the second BI environment. The user may provide the request through an interface of the BI environment and/or the SI environment.

A metadata model file associated with the BI Artifact(s) in the deployment package may be determined (operation 560). For example, the SI system may identify the BI Artifact(s) in the deployment package. The metadata model file associated with the BI Artifact(s) may be stored in a local memory of a user device. The metadata model file may be automatically retrieved. In some implementations, the SI system may request that the user provide the metadata model file (e.g., upload the file).

The identified metadata model file may be stored in a memory of the SI system (operation 565). For example, the metadata model file may be retrieved and stored in a memory coupled to the SI system.

The deployment package may be deployed to the second BI environment (operation 570). For example, the deployment package may be retrieved and a copy of the contents of the deployment package may be generated in the second BI environment by the SI system.

The stored metadata model file may be associated with the second BI environment (operation 575). The association may be stored in an association table that includes, for example, but not limited to, associations between metadata model files and metadata models, BI Artifacts, packages, property sets, and/or labels.

Process 550 may be implemented by various systems, such as the systems illustrated in FIGS. 1A and 1F. In addition, various operations may be added, deleted, and/or modified. For example, when a user requests the metadata model file of a BI Artifact deployed in the second BI environment, the SI system may retrieve the metadata model file from a memory of the SI system (e.g., rather than requesting the metadata model file which may or may not exist on a local user memory). In some implementations, the metadata model file may be stored with the deployment package in a memory of the SI system. The metadata model file and/or associations may be automatically updated based on versioning of labels, packages, and/or other components of the BI environment and/or SI system. In some implementations, at least a portion of the property set, such as permissions, may be automatically adjusted based at least partially on the properties of the BI environment. For example, user permissions may be adjusted such that the metadata model file may be viewed, adjusted, and/or executed in the second BI environment. In some implementations, the associations with a project may be determined and/or stored in a memory of the SI system.

Figure 6:
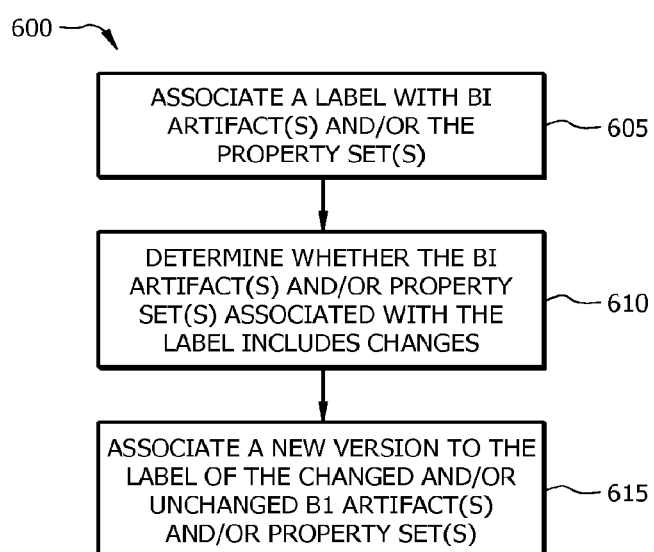
FIG. 6 illustrates an implementation of an example process for versioning of labels.

In some implementations, the SI system may allow version control (e.g., management and/or storage) of labels. FIG. 6 illustrates an implementation of an example process for versioning label(s).

A label may be associated with a set of BI Artifact(s) and/or property set(s) (operation 605). For example, the SI system may allow users to associate a label with one or more packages, one or more BI Artifacts, and/or one or more property set(s). The label may include an identifier, such as an alphanumeric name.

A determination may be made whether component(s) associated with the label include changes (operation 610). For example, the SI system may monitor changes in the BI environment and determine when components of a label, such as package(s), BI Artifact(s), and/or property set(s) have changed. In some implementations, a user may retrieve a label and edit component(s) of the label.

A new version of the label may be associated with the at least partially set of label components (operation 615). For example, if a label is identified as Label A, when a set of components associated with the Label A is at least partially changed (e.g., a BI Artifact is altered, a Property Set is added). The new version may be stored in a memory of the SI system.

Process 600 may be implemented by various systems, such as the systems illustrated in FIGS. 1A and 1F. In addition, various operations may be added, deleted, and/or modified. For example, BI Artifacts, packages, and/or property sets may be retrieved based on a label and/or version. In some implementations, the SI system may automatically assign a label to a package and/or property set. Deployments may be requested, using the SI system, based on labels and/or versions, in some implementations. Assignment of a version to a label may facilitate identification of previous versions (e.g., previously deployed labels). In some implementations, a property set may be related to one or more of the BI Artifacts in the label. For example, the property set may assign permissions related to a BI Artifact in the label. In some implementations, versioning labels may facilitate updating of the contents of the labels. For example, a request may be received (e.g., from a user and/or from a corporate change management system) to update contents of a label. The SI system may determine whether newer versions of each component (e.g., BI Artifact and/or property set) exist in the SI system and/or a BI environment. The SI system may automatically update one or more of the components of the label with the determined newer versions. In some implementations, the label may be at least partially updated manually.

For example, as illustrated in FIG. 2A. The SI system may receive a Label A 200 to be associated with a package that includes BI Artifacts, such as reports R1, R2, and R5. In some implementations, the BI Artifacts may not reside in a folder under the package folder. The package may reference and associate one or more BI Artifacts independent of where the BI Artifacts reside (e.g., content store). A property set may be associated with the Label A. The contents of the package(s), in some implementations, may be stored in and/or associated with a different folder than the package. For example, a BI Artifact, such as a report, may be stored in a portion of the BI environment (e.g., Content Store in IBM Cognos). In some implementations, content(s) of the package(s) may be stored in a folder in the BI environment and/or the SI system. In some implementations, each version of a Label A may be associated with specific versions of one or more of the contents of the label, such as BI Artifacts, files, and/or property sets. As illustrated, Label A, v1 200 includes R1, v2 210; R2, v1 220; R5, v5 230; and property set, v2 240.

The user may provide changes to the contents of the package (e.g., BI Artifacts may be updated or otherwise altered). For example, the user may change a version to a previous version or a later version of a BI Artifact; the user may alter a BI Artifact in the package, etc. The SI system may determine whether one or more of the contents of the label has been changed, in some implementations, and associate a new version of the label with the changed package. As illustrated in FIG. 2D, Label A, v2 202 includes R1, v2 250; R2, v3 260; R5, v4 270; and property set v1 280.

Thus, by assigning a new version of a label to a changed package and/or property set, the SI system may allow identification and access to previous versions of a package and/or property set (e.g., to facilitate a deployment undo, to allow changes to be tracked and/or monitored, etc.). Allowing a package to keep the same label, in the SI system, and allowing changes in the version of the label, may facilitate making changes to packages (e.g., groups of BI Artifacts for a business may be packaged together for multiple deployments under the same label, may provide a fail safe since BI Artifact and/or property sets in a previous deployment can be easily identified for later deployments, revisions may be easily managed, etc.).

In some implementations, the SI system may allow a user to automatically or manually update BI Artifact(s), portion(s) of BI Artifact(s), package(s), portion(s) of package(s), label(s), and/or portion(s) of label(s). For example, the SI system may generate a user interface (e.g., a button on a BI environment widow) that allows a user to update a package or portion thereof that is associated with a label. In some implementations, the label may include one or more packages, one or more BI Artifacts and/or one or more property sets. A user may request update of the contents (e.g., replacement of content or portions thereof with more recent versions of the contents or portions thereof) associated with a label and/or with portions thereof (e.g., a package, a BI Artifact, and/or a property set). For example, a user may request update of Label A, v2, illustrated in FIG. 2A, and the SI system may identify more recent versions of the contents of the label, and create a new Label A, v3 that includes more recent versions of R1, R2, R5, and/or Property Set. For example, the SI system may utilize versioning features to determine which version of a BI Artifact is the most recent version. In some implementations, the SI system may utilize a time stamp associated with a BI Artifact to identify a most recent version. The SI system may determine whether a BI Artifact has been checked in, in a BI Artifact Studio, to identify a more recent version. In some implementations, a user may provide instructions to the SI system to facilitate identification of more recent versions of labels, packages, BI Artifacts, and/or property sets.

In some implementations, when a user requests that a package identified in a BI environment be updated, the SI system may determine the label associated with the package. For example, the SI system may receive a selection of a package (e.g., via identification of a label, via selection of a button in a Report Studio, etc.) and a request an update of the contents of the package. The SI system may identify the contents of (e.g., BI Artifacts associated with) the package. The SI system may retrieve and/or identify the latest version (e.g., the last version) of the content(s) of the package (e.g., BI Artifacts), from a listing of versions of the contents of the BI Artifacts stored in a memory of the SI system. The SI system may alter the package to include the latest versions of each of the contents in the package, in some implementations. In some implementations, the SI system may assign a new version of the label associated with the changed package in the SI system. The SI system may then deploy the new version of the package to the BI environment based on a user request.

In some implementations, the SI system may be utilized to automatically or manually update the contents of a label. For example, a label may include contents frequently updated approximately concurrently (e.g., yearly update, updated at project milestones, manually updated together, and/or related BI Artifacts). A user may request update of the contents of a label by identifying (e.g., via a selection of the label and/or by entering the label) a label for updating. The SI system may identify the latest version (e.g., the last version) of the label and/or contents thereof (e.g., BI Artifacts and/or property sets). The SI system may alter the contents of the label to include the latest versions of each of the items (e.g., BI Artifacts and/or property sets) in the label, in some implementations. The SI system may associate a new version of the label with the changed label contents. The new version of the label may be saved in a memory of the SI system. The SI system may then deploy the new version of the contents of the label to the BI environment based on a user request.

In some implementations, the SI system may present the automatically updated label and/or package to the user. The user may confirm the request to update the label, package, and/or the contents of the package. The user may or may not provide one or more changes to the updated label (e.g., the user may restrict updating the property set to allow the previous property set to remain in effect) and/or updated package (e.g., the user may alter the version of BI Artifacts used in the package). The SI system may save the changes as a version of the labels, BI Artifacts, property sets, etc., as appropriate. The SI system may deploy the label contents and/or the package based on a user request (e.g. the user request may include information, such as information regarding: whether to automatically or manually deploy label contents and/or a package; whether to generate and wait for user initiated deployment of the package, in which BI environment to deploy the package, etc.).

In some implementations, the SI system may allow version control of property sets. For example, a property set may designate which properties (e.g., one or more or no properties) associated with a BI Artifact are to be deployed with a BI Artifact to be deployed. Properties of a BI Artifact may include a number of different properties, including but not limited to, name, description, tooltip, specification, owner, contact, security policies (e.g. security permissions), the associated package, etc. A SI system may identify changes to property sets and store versions of property sets based on the changes. By allowing version control of property sets, properties of BI Artifacts may be managed, versioned and/or tracked. For example, if a property of a BI Artifact such as a security permission of a BI Artifact is altered, the change may be identified. In some implementations, version control of property sets may facilitate deployment between BI environments. For example, when a set of BI Artifacts and/or a package are to be deployed in a second BI environment, a property set may be utilized with the package to retain a portion of the previously deployed property set (e.g., default values and/or property sets associated with previous versions of the BI Artifacts) associated with the second BI environment. In some implementations, one or more properties of BI Artifact(s) may be updated along with deployment of an update of BI Artifacts using a property set. For example, a user may request update of a package by identifying the package and/or a label of the package. The SI system may automatically determine the latest version of components of the package such as BI Artifact(s) and appropriate property set(s). Thus, the property set may allow the properties of BI Artifacts in a BI environment to be updated with an update of BI Artifacts by the SI system.

In some implementations, deployment of properties associated with BI Artifact(s) may be based at least partially on the property set. For example, the property set may include information regarding which properties associated with a BI Artifact are altered and/or updated and in which properties alteration is restricted. Thus, selected properties of a BI Artifact (e.g., which may be updated and/or altered) may be updated and/or altered based on the information in the property set and/or the versions of property sets stored in the SI system.

In various implementations, the SI system may allow version control of other components of the SI system and/or BI system, such as assertion types, test scripts, tests, external data sources, references to external data sources, instance settings, BI environment settings, SI system BI Artifacts, SI system settings, projects, etc. In some implementations, the SI system may automatically update the version of various component used in the SI system and/or BI system based on actions of the SI system. For example, when a deployment of a BI Artifact is updated and/or undone, a test case associate with the BI Artifact may be updated and/or undone as appropriate.

In some implementations, the SI system may be utilized to identify differences between BI Artifacts and/or their associated BI Artifact Output(s). The SI system may automatically ignore some changes and/or portions of the BI Artifact(s), associated specification(s), and/or associated BI Artifact Output(s) (e.g., as part of an assertion utilized by the system). For example, when the SI system analyzes a BI Artifact Output, specific data in a column may be considered, while data in a header may be ignored by the SI system. In some implementations, a master report output may be identified and/or generated and other BI Artifact Output(s) may be compared to the master report output. By ignoring some portions of the BI Artifact Output(s), a master report output may be utilized for comparison against a plurality of different BI Artifact Outputs (e.g., even without the same underlying data).

When a BI Artifact is executed (e.g., in a BI environment), one or more BI Artifact Outputs may be generated. For example, when a Cognos Report is executed in a Cognos BI environment, an HTML Report Output may be generated. Each time the BI Artifact is executed in the BI environment, the BI Artifact Output(s) may change. For example, the underlying data on which the BI Artifact depends may change, other related BI Artifact(s) may change, the properties of the BI Artifact may change, etc. Thus, the BI Artifact Output generated by the execution of the BI Artifact in the BI environment may change. In some implementations, a user may want portions of the BI Artifact Output to remain the same even through other portions may change in later executions of the same and/or different version of the BI Artifact. Thus, a user may generate an assertion using the SI system to identify differences in portions of the BI Artifact Output while ignoring other portions of the BI Artifact Output. The user may designate portions (e.g., types of portions) in a set of portions to ignore and/or portions to consider. The assertion may be run by the SI system on a BI Artifact Output to compare the BI Artifact Output generated by the BI Artifact to another BI Artifact Output. The SI system may ignore and/or consider predetermined portions of BI Artifact (e.g., based on the set of portions to ignore and/or consider) to determine whether differences and/or similarities exist between the BI Artifact Outputs.

Figure 7:
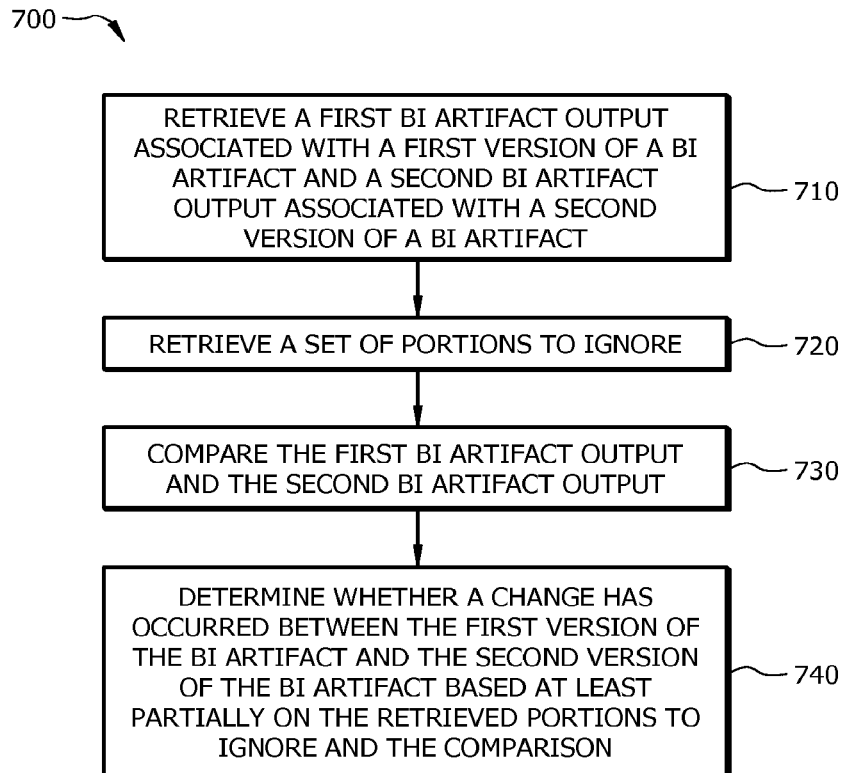
FIG. 7 illustrates an implementation of an example process 700 for identifying differences between BI Artifacts.

In some implementations, the SI system may automatically determine whether a change has occurred in a component such as a BI Artifact, package, label, and/or property set. FIG. 7 illustrates an implementation of an example process 700 for identifying differences between BI Artifacts and/or their associated BI Artifact Outputs. The SI system may retrieve two versions of the component (e.g., a first version and second version; and/or current version and a previous version, such as the last version). The SI system may compare two or more versions of the one or more BI Artifact(s). For example, SI system may compare the BI Artifact Outputs generated by two versions of the component and determine whether differences and/or similarities exist between the two BI Artifact Outputs (e.g., and thus the two versions of the BI Artifact). For example, the CI system may retrieve BI Artifact Outputs associated with the versions of the BI Artifact (operation 710) and/or execute a BI Artifact to generate BI Artifact Outputs.

The SI system may then retrieve a set of portions to ignore (e.g., when a column of a report is defined to change between runs, page functions, day report is run, etc.) (operation 720). The set of portions to ignore may be retrieved from a memory of the SI system. The set of portions to ignore may be received from a user, in some implementations.

The BI Artifact Outputs may then be compared (operation 730).

The SI system may then determine if the determined differences include items in the set of portions to ignore to determine whether a change has occurred between the two versions (operation 740).

Process 700 may be implemented by systems, such as the systems illustrated in FIGS. 1A and 1F. In addition, various operations may be added, deleted, and/or modified. For example, two or more versions of the same BI Artifact may be compared. In some implementations, user may want to identify differences in the BI Artifact Output generated by different versions of the same BI Artifact. In some implementations, the SI system may perform analysis based on the identified differences and/or similarities. The analysis may include tests and/or impact analysis based at least partially on the comparisons and/or restriction of comparisons. An analysis may determine whether the differences indicate a change in underlying data or a problem retrieving data (e.g., when values are null and/or when references are unspecified). For example, if a problem (e.g., a stability or other problem and/or undesired characteristic, such as long run time) exists in a first version (e.g., a current version or previous version) of a BI Artifact, the first version may be compared to other versions of the BI Artifact to identify differences and/or similarities. The identified differences may be utilized by the SI system and/or the user to identify problems with a first version of a BI Artifact and/or a second version of a BI Artifact. In some implementations, two or more different BI Artifacts may be compared. For example, a uniform header may be utilized across an enterprise. The SI system may utilize this assertion to compare the portion of the BI Artifact Output, which includes the header, to one or more other BI Artifact Outputs associated with different BI Artifacts to identify differences in the header portion.

In some implementations, the SI system may compare two or more BI Artifact Outputs to identify similarities and/or differences. The SI system may then determine whether identified similarities and/or differences are included in the set of portions to ignore and/or set of portions to compare. The SI system may determine that differences exist between BI Artifacts and/or BI Artifact Outputs based on whether the identified differences and/or similarities are included in the set of portions to ignore and/or set of portions to compare.

In some implementations, one or more second set of portions to ignore and/or portions to compare may be utilized. For example, in some implementations, a set of portions to ignore may be selected by the CI system and/or a user in which to restrict comparison. Then a second set of portions to ignore may be provided (e.g., by the user). For example, a user may be aware of a problem with a datasource and may include types of portions that are associated with the datasource in the second set of portions to ignore to identify differences other than the differences related to problems with a datasource. Differences and/or similarities between the BI Artifact Outputs may be identified (e.g., by the SI system) based at least partially the comparison between the BI Artifacts, the second set of portions to ignore, and the first set of portions to ignore.

In some implementations, the second version may include a master copy and a first version may be compared to a master copy. The master copy may include a set of predefined properties, such as headers, format, etc. A user may select a BI Artifact Output to be designated as a master copy and the SI system may retrieve the master copy for the comparison to a BI Artifact Output. In some implementations, the SI system may manually (e.g., based on a user request) and/or automatically (e.g., when changes are made to an associated BI Artifact, when changes are made to a related BI Artifact, when a datasource for generation of a BI Artifact Output changes, and/or when deploying the BI Artifact) compare a BI Artifact Output to a master copy. The comparison may allow identification of changes to a BI Artifact. For example, a user may identify a first set of portions of a BI Artifact Output in which changes should not occur. The set of portions to ignore may be selected to include the portions of a BI Artifact that are not included in the first set of portions identified by the user. Thus, when the SI system allows (e.g., automatically and/or manually based on a request) an assertion that includes this set of portions to ignore, the BI Artifact Output may be analyzed by the SI system to identify differences in the first set of portions (e.g., since the other portions may be ignored by the SI system through their inclusion in the set of portions to ignore). This targeted comparison may be performed in the background of other operations (e.g., after changes are detected and/or as a part of a periodic test run). The results of the comparison (e.g., based on the identified differences and/or similarities) may be presented to a user. For example, a user may be provided with an indication that the assertion failed. In some implementations, one or more indicia (e.g., flags, highlights, and/or sounds) of the differences may be provided when viewing the specification and/or BI Artifact Output. A message may be transmitted to the user regarding the identified differences and/or similarities. Although process 700 illustrates an implementation for identifying differences between BI Artifacts, the process and/or portions thereof may be utilized in identifying differences between versions labels, packages, properties, etc.

In some implementations, the SI system may utilize markers to facilitate identification of portions (e.g., of the BI Artifact Output). In some implementations, the SI system may automatically include markers (e.g., HTML item markers) such that when a BI Artifact is run or executed the markers are inserted into the BI Artifact output, as appropriate. For example, the SI system may retrieve a copy of the BI Artifact from a first BI environment and alter the specification of a BI Artifact to inject markers (e.g., specification markers) into the specification. Thus, when the BI Artifact is executed (e.g., in the first BI environment), the specification renders markers (e.g., output makers) in the BI Artifact Output. The markers may be associated with properties of a BI Artifact output. For example, the SI system may insert specification markers in the specification associated with the BI Artifact. The specification markers may identify portions of the specification. For example, a type of portion of the specification, such as a header, may be identified with a first marker. A second type of portion in the specification may be identified with a second marker. The markers (e.g., specification markers and/or output markers) may be unique to the type of portion and/or the component (e.g., specification and/or BI Artifact Output) in which it resides, in some implementations. The output makers are rendered in the BI Artifact Output by the specification markers are associated with the specification marker which rendered it, and thus the type of portion may be identified based on the output marker.

Figure 8:
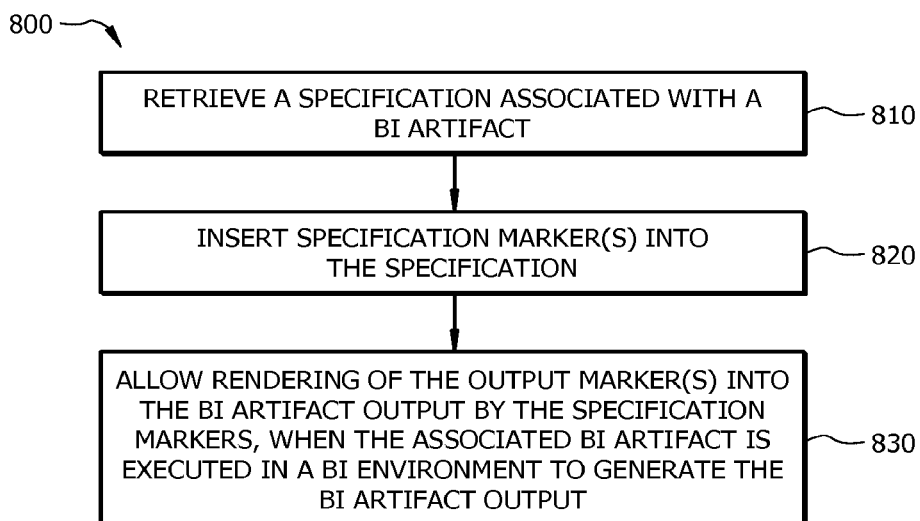
FIG. 8 illustrates an implementation of an example process 800 for inserting markers.

FIG. 8 illustrates an implementation of an example process 800 for inserting markers. For example, the SI system may retrieve a specification associated with a BI Artifact (operation 810). For example, a user may select a BI Artifact and the SI system may retrieve the specification of the BI Artifact. In some implementations, the BI Artifact may be retrieved from the BI environment and/or a memory of the SI system and the specification associated with the BI Artifact may be identified.

The SI system may insert specification markers into a specification associated with a BI Artifact (e.g., a specification associated with a BI Artifact may be retrieved and altered) (operation 820). For example, the SI system may analyze the retrieved specification. The SI system may identify types of properties, based on for example, but not limited to, key words, types, font size, file path, etc. For example, a date to be included in the BI Artifact Output may be identified by the type (e.g., date field). The specification markers may include any appropriate marker. The specification markers may identify portions of the specification. The altered specification may be saved in a memory of the SI system and/or BI environment. For example, a version of the BI Artifact with the altered specification may be saved in a memory of the SI system. In some implementations, the BI Artifact with the altered specification may be deployed to the BI environment and/or saved in a memory coupled to the BI environment.

When the BI Artifact is executed in a BI Environment to generate a BI Artifact Output, the specification markers may cause output marker(s) to be rendered into the BI Artifact Output (operation 830). Since the altered specification of the BI Artifact includes the specification markers, associated output markers may be produced in the BI Output. An output marker may be produced in the BI Output proximate the portion with which the specification marker is associated.

The markers (e.g., output markers and/or specification markers) may be used to perform targeted comparisons between two or more BI Outputs. In some implementations, it may be difficult to identify similar portions based on the BI Artifact Output. For example, a container block may appear differently in two different BI Artifact Outputs (e.g., the position of the container block may be different in the two BI Artifact Outputs and/or the contents of the container block may be different). Thus, the output markers (e.g., rendered by the specification markers) may be used to identify portions of the BI Artifact Output such that comparisons between the same portions may be made. For example, first output portions of the first BI Artifact Output and second output portions of the second BI Artifact Output may be identified (e.g., identified by the output makers, specification markers, and/or portions listed in a set of portions to ignore) by the SI system. The SI system may then compare the first output portions to the second output portions. By utilizing the markers for the identification of which portions of the BI Artifact Output are included in the set of portions to ignore, identification of differences and/or similarities after the generation of BI Artifact Outputs may be facilitated. For example, rather than comparing an entire first BI Artifact Output to an entire second BI Artifact Output, comparison may be restricted to portions of the BI Artifact Output not identified in the set of portions to ignore. Thus, the comparison may utilize fewer resources (e.g., processor time and/or memory) and may more accurately identify portions for comparison (e.g., using the markers).

Process 800 may be implemented by systems, such as the systems illustrated in FIGS. 1A and 1F. In addition, various operations may be added, deleted, and/or modified. For example, in some implementations, a set of portions to compare may be retrieved in addition to and/or instead of a set of portions to ignore. The set of portions to compare may identify portions in which a comparison will be made by the SI system. In some implementations, a user may provide and/or select the components of the portions to ignore and/or portions to compare. For example, a user may select one or more portions in which to restrict comparison and/or allow comparison. The selections may generate the set of portions to ignore and/or portions to compare. The set of portions to ignore and/or portions to compare may be saved in a memory of the user computer and/or the SI system. In some implementations, the SI system may (e.g., automatically and/or manually at the request of a user, for example) inject markers in a specification of a BI Artifact. The SI system may then allow deployment of the BI Artifact with the altered specification (e.g., through property sets and/or other appropriate processes) in a BI environment. Thus, when the SI system is to compare a BI Artifact Output and the BI Artifact Output has been executed in the BI environment (e.g., with the altered specification to produce an altered BI Artifact Output with markers), the SI system may retrieve one or more BI Artifact Outputs from the BI environment and/or memory coupled to the BI environment (e.g., a repository for storing reports generated by the BI environment). In some implementations, the SI system may inject specification markers into a copy of the BI Artifact (and/or a copy of the BI Artifact's specification). The altered copy of the BI Artifact with the specification markers may be deployed to and/or executed in the BI Environment to generate a BI Artifact Output, which contains output markers. The altered copy of the BI Artifact may not replace the original BI Artifact (e.g., the BI Artifact from which the copy was made) in the BI environment, in some implementations.

In some implementations, the user may not request retrieval of a specification of a BI Artifact and the SI system may automatically retrieve specification(s) of one or more BI Artifacts. The portions of the specification that may be marked by a specification marker may include, but are not limited to marking, page headers, page footers, report body, lists, list columns, crosstabs, crosstab edges, measures, prompts, blocks, container/layout tables, charts, chart series, chart measures, legends, text items, images, repeaters, and/or other appropriate parts of the specification. In some implementations, a template may be utilized to create a specification of a BI Artifact. The fields may be identified by the SI system at least partially based on the template. For example, the template utilized to create the BI Artifact specification in the BI environment may include portions, which a user specifies. The SI system may identify one or more of the portions of the template and/or resulting specification and may associate a portion with a marker, in some implementations.

In some implementations, the output markers may be non-visual (e.g., the output marker may not be displayed in the normal rendering of the BI Artifact Output). For example, for an HTML report output, an output marker may be implemented as an HTML element which is not rendered by a browser (e.g. a div element or span element whose display style has been set to "none") and presentation of the marker in the BI Artifact Output may be restricted.

In some implementations, the differences between the two or more BI Artifact Outputs may be identified (e.g., based on specification markers, output markers and/or set(s) of portions to ignore or portions to consider) and based on the identified differences: notifications may be generated (e.g., for presentation to a user) and/or information based on the identified differences may be stored in a memory of the SI system.

In some implementations, executing a BI Artifact in a BI Environment may generate one or more BI Artifact Outputs. For example, executing a BI Artifact, such as a Report, in a Cognos BI Environment may produce one or more BI Artifact Outputs, such as report outputs (e.g. a PDF report output, an HTML report output, a CSV report output, an Excel report output, an MHTML report output, etc.). A BI Artifact may be associated with a specification property. The specification may provide instructions to the BI environment software regarding, for example, which datasources should be queried; which data should pulled from those data sources; how the data should be filtered, grouped, sorted, summarized and/or otherwise processed; and/or how the resultant data should be rendered visually in the resultant BI outputs. A specification may be executed in the BI environment with execution of an associated BI artifact and/or without execution of an associated BI artifact (e.g., as an anonymous specification). For example, in a BI Artifact Authoring Tool, a user may create an anonymous, unnamed specification and execute the specification prior to saving the specification as a property of a BI artifact.

The specification of a BI artifact may contain one or more specification portions. A specification portion may be a container of other specification portions. For example, specification portions in a Cognos report specification may include a page set; a prompt page; a prompt; a page; a page header; a page body; a page footer; a list; a crosstab; a chart; a chart series; a chart measure; a chart legend; a chart category; a graph; a container block; container table (e.g., used for the organization/layout other specification elements); an individual element contained in a page header; an individual element contained in a page footer; an individual column contained in a list; a summary row in a list; a row edge in a crosstab; a column edge contained in a crosstab; a measure contained in a crosstab; a summary row contained in a crosstab; and/or a static or non-static textual, numeric, and/or image based item located on a page in the report specification. When a BI Artifact is executed in a BI environment to generate BI Artifact Output(s), a specification portion may result in the generation of one or more output portions in one or more of the generated BI Artifact Outputs.

For example, a Cognos report specification, which is executed in a Cognos BI environment, may produce an HTML report output. The Cognos report specification may include a list, which may include specification portions such as, for example, six columns. Each column of the list may reference a query item from an associated Cognos package. The associated Cognos package may be coupled with a Cognos datasource, and the datasource may be coupled to a relational database. The query items from the associated Cognos package may expose underlying columns in relational tables from the relational database and/or calculated values defined in the Cognos package. When the report specification is successfully executed in a Cognos BI Environment, the list from the report specification may generate a one or more HTML tables in a HTML report output, and the columns from the report specification may generate a series of HTML table cells contained within the HTML tables in the HTML report output. The list may be a specification portion, which is related to the HTML tables (e.g., output portions) in the HTML report output. Each of these columns may be related to HTML table cells (e.g., output portions) in the HTML report output.

In some implementations, the SI system may instrument a BI Artifact specification by injecting marker(s), such as specification marker element(s) into the BI Artifact Specification. The specification marker(s) may be automatically applied by the SI system to a BI Artifact specification, in some implementations. The specification marker(s) may facilitate identification of portions of the BI Artifact specification and/or corresponding portions of a BI Artifact output produced by the execution of the instrumented BI Artifact specification (e.g., in a BI environment). The specification markers may generate output markers (e.g., non-obtrusive, hidden, and/or non-visual markers), which are contained in the generated BI Artifact output. The output markers may correlate specification portions in the BI Artifact specification and associated output portions in BI output(s) (e.g., instrumented output) generated by execution of the BI Artifact and/or the instrumented BI Artifact specification.

In some implementations, the SI system may instrument specification(s) of BI Artifact(s), in response to events detected in a BI environment and/or a BI ecosystem; as part of an SI executed test and/or test script; on a scheduled basis; at the request of a user (e.g., manually initiated); and/or via other appropriate external and/or internal stimuli. For example, the SI system may automatically retrieve a first version of a first BI artifact; instrument the specification of the first version of the first BI artifact; execute the instrumented specification in a BI environment; download the resultant instrumented BI Artifact outputs from the BI environment; store the resultant instrumented BI Artifact outputs in a memory coupled to the SI system; and/or associate the stored instrumented BI Artifact outputs with the first version of the first BI artifact, the BI environment from which they were generated, an associated test and/or an associated test script.

For example, the SI system may allow, but is not limited to, instrumenting of a Cognos report specification by utilizing "HTML Item" objects as the specification markers. A Cognos report specification may be represented as an XML document. One or more of the portions in a Cognos report specification may be represented as one or more XML elements (e.g., each of which may have XML attributes, sub-elements and a parent node). In some implementations, Cognos Report Studio (e.g., an authoring studio for Cognos report specifications) may allow report authors to create and/or edit Cognos report specifications. When authoring a Cognos report specification, a report author may drag objects from a palette of "insertable objects" onto a location in a current report specification. Examples of "insertable objects" include, but are not limited to text items, blocks, tables (layout tables, not relational tables), images, crosstabs, lists, charts, columns, prompts, HTML items, etc. In Cognos Report Studio, the SI system may allow that when an insertable object is inserted into a Cognos report specification, a new specification portion is created in the corresponding XML document, which represents the Cognos report specification. When an object in a Cognos report specification is edited, the corresponding portion in the XML document, which represents the Cognos report specification, may be altered.

HTML Items are one, non-limiting, example of the types of objects, which can be placed into a Cognos report specification. When the Cognos report specification is executed in a Cognos BI Environment, an HTML Item in the specification may emit static and/or dynamic fragments of text into a generated HTML report output. During the instrumentation of a Cognos report specification, the SI system may annotate one or more of the potential specification portions of interest with an additional "HTML Item" object (e.g., the specification marker). These specification markers, such as HTML Items, may be programmatically inserted into a Cognos report specification XML document by the SI system at a location before, after, and/or inside a specification portion. The contents of the inserted HTML Item objects may be designed to emit text, which correlates an output portion to the associated specification portion. For example, the SI system may assign a unique identifier to each specification portion, in some implementations. For each specification portion, the SI System may inject an HTML item object (e.g., the specification marker) that emits a unique identifier into the generated textual output, when the instrumented report specification is executed in a Cognos environment. In some implementations, the HTML items may emit an HTML div element, which embeds the unique id as a portion of its class attribute. The emitted HTML div elements may have a style set which causes the div element to be invisible when rendered in a web browser (e.g. a style attribute of "display:none"). In this example, emitted HTML div elements (e.g., output markers) in the HTML report output may be correlated back to the HTML Item objects (e.g., specification markers) in the instrumented report specification.

In some implementations, the SI system may allow full and/or targeted comparison between multiple instrumented BI Artifact outputs. Targeted comparisons may be performed on output portions in the instrumented BI Artifact output, which correspond with designated specification portions and/or designated specification portion types. In some implementations, targeted comparisons may ignore one or more of the output portions that were generated by a designated list of specification portions and/or a designated list of specification portion types (e.g., by retrieving a set of portions to ignore and determining which specification portions to ignore). In some implementations, targeted comparisons may only consider one or more of the output portions that were generated by a designated list of specification portions and/or a designated list of specification portion types (e.g. by retrieving a set of portions to consider and limiting the comparison to only output portions generated by those specification portions).

For example, in IBM Cognos BI environments, the SI system may allow, but is not limited to allowing, instrumentation of a report specification which contains a page header portion, a page body portion, a list portion (e.g., nested within the page body portion), five individual column portions (e.g., each column being nested within the list portion and/or each column being a distinct portion), and/or a page footer portion. Instrumentation of the report specification may include injecting (e.g., altering the specification to include) specification markers into the specification for one or more of these portions to produce an instrumented report specification. The specification marker may be injected immediately before, after, and/or inside its corresponding specification portion. Execution of the instrumented report specification (e.g., successful execution) in a BI environment may produce one or more instrumented HTML report output(s). The instrumented HTML report output may include output markers that relate portions of the HTML report output to their corresponding portions from the instrumented report specification.

A user may utilize the SI system to compare two different versions of instrumented HTML report output generated from this instrumented report specification. The user may request that the SI system ignore output portions(s) in the instrumented HTML report output which correspond to certain specification portions from the instrumented report specification. Conversely, In some implementations, the user may request that the SI system only consider output portions in the instrumented HTML report output which are associated with certain specification portions or specification portion types from the instrumented report specification. For example, a user may request that the SI system ignore output portions in the instrumented HTML report output that were generated by the page header and/or page footer specification portions in the instrumented report specification, when comparing two instrumented HTML report outputs that were generated by execution of the instrumented report specification in a BI environment. The SI system may compare the two instrumented HTML report outputs, ignoring any differences in output portions associated with the page header and/or page footer specification portions. The SI system may present a visual or textual (e.g. XML, JSON) representation of the differences in the two instrumented BI outputs.

In some implementations, a user may request that the SI system compare two instrumented HTML report outputs by comparing the output portions generated by a list portion in the report specification. The user may request the SI system to compare output portions generated by two of the five columns in a list portion, in some implementations (ignoring all other output portions). A user may request the SI system to compare output portions and exclude a set of output portions, such as those generated by the page header and page footer portions in the report specification.

The SI system may leverage instrumented BI artifact specifications and corresponding instrumented BI outputs to selectively compare two or more selected instrumented BI outputs; the instrumented BI outputs of two or more selected BI artifacts; and/or the instrumented BI outputs of two or more versions of the same BI artifact.

In various implementations, the SI system may be utilized to test the contents of labels, packages, and/or portions thereof. Some BI environments may not include tests that can be executed on various BI Artifacts in the environment. Testing through the SI system may allow problems in packages or portions thereof to be discovered prior to deployment in a production BI environment and/or may allow early identification of a problem in a BI environment.

A test may include one or more assertions by which a component, such as a BI Artifact or property set may be evaluated. An assertion may include one or more checks, criteria, or steps that may be performed on a component (e.g., a selected component and/or related component, such as a component related based on analysis by the SI system and/or input provided by a user.), such as a report, folder, or package. An assertion may be associated with a test case and may be run when the test case is run. For example, an assertion may include: criteria such as whether the component includes a predefined value, criteria such as whether a BI Artifact is a predefined type, criteria such as whether the component has changed (e.g., change compared to a different version), criteria such as whether the component failed, etc. The SI system may include a predefined set of tests and/or allow custom tests to be generated by a user.

Figure 9:
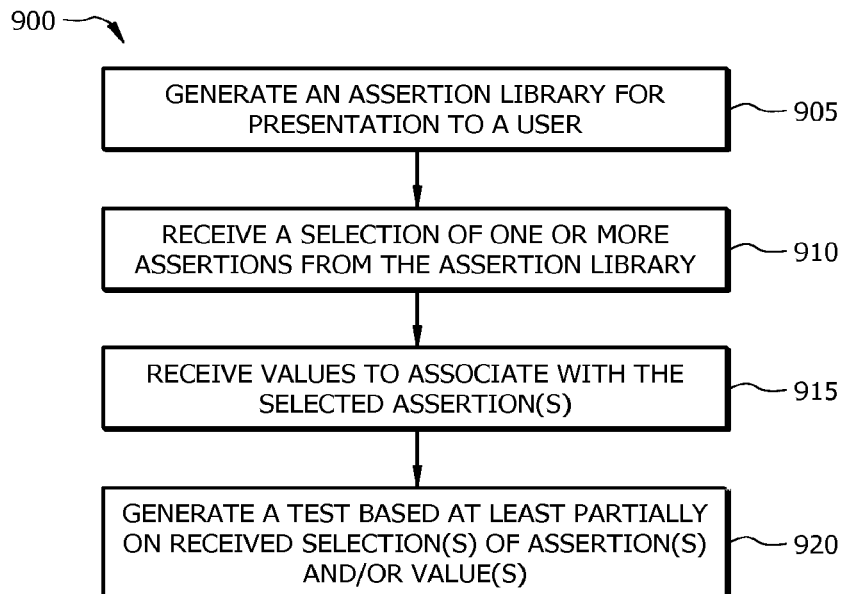
FIG. 9 illustrates an implementation of an example process for generating a test.

A test may be generated using a studio of the SI system, such as an assertion studio. The SI system may receive a request for creation of a test from a user. The SI system may receive an identification of a component, such as a BI Artifact, to be associated with the test. FIG. 9 illustrates an implementation of an example process 900 for generation of a test. An assertion library may be generated for presentation to a user (operation 905). For example, the SI system may generate a listing of assertions. The listing included in the assertion library may include a plurality of assertions in some implementations. For example, the assertions selected for inclusion in the listing may be based at least partially on criteria (e.g., default in the system and/or provided by the user). For example, a user may request assertions for pre-execution. In some implementations, the SI system may generate the listing based on user properties (e.g., previously used, most frequently used, and/or types of activities such as editing performed by user).

A selection of assertion(s) from the assertion library may be received (operation 910). For example, a user may select one or more of the assertions from the listing in the assertion library. The user may provide a custom assertion, in some implementations. The SI system may receive one or more assertions to be associated with the test.

Values to be associated with the selected assertion(s) may be received (operation 915). For example, an assertion may include a formula such as value x is less than value y. A user may provide a fixed number, a variable number, a file path from which the number may be retrieved, etc. for the value x and/or the value y in the formula, in some implementations. The SI system may provide default values for one or more of the values in the assertion. For example, the assertion may include a formula such as a value x is less than execution time y. The SI system may provide a default execution time. In some implementations, the values may be based at least partially on results of other assertions and/or results from portions of other assertions.

A test may be generated based at least partially on the received selection of assertion(s) and/or value(s) (operation 920). The SI system may generate the test based on the received assertions. For example, the test may include a series of assertions.

Process 900 may be implemented by various systems, such as the systems illustrated in FIGS. 1A and 1F. In addition, various operations may be added, deleted, and/or modified. For example, the test may be associated with a BI Artifact and/or a project. The value may be retrieved from a BI Output. The value may be retrieved from a datasource coupled to the SI system.

In some implementations, the listing of assertions generated for presentation to a user may be based at least partially on the identification of the BI Artifact received. For example, a portion of the assertions may be capable of being performed on a predetermined set of BI Artifact types. Thus, the identification of a BI Artifact may allow the SI system to determine which assertions should be included in the listing based on the identification of the BI Artifact.

In some implementations, an assertion may include a type, such as a pre-execution assertion (e.g., may be determined without execution of a BI Artifact) or a post-execution assertion. For example, an assertion may include evaluations of report specification (e.g., colors, spacing, etc.), which may be determined pre-execution. In some implementations, an assertion may include evaluations of a post execution output, such as whether a file is generated in an appropriate format. The test may be restricted from including more than one type of assertion, in some implementations.

In some implementations, when the generated test is run, the assertion may include one or more parts that prompt a user for information. For example, if the assertion is to determine whether a run time is less than a value, when the test is run, the assertion may prompt the user to provide the value (e.g., 2 hours). In some implementations, a user may provide the value(s) used in the assertions when generating the test.

The assertions may allow changes (e.g., when compared to previous versions and/or gold copy versions, and/or sets of portions to ignore) between outputs to be identified. For example, changes in stability, membership(s), security, etc. may be identified using tests based on assertions. For example, a change in stability may be identified when error messages appear in columns of data. A change in stability may be identified by the SI system when an invalid file path is utilized to generate a report output.

Figure 10A:
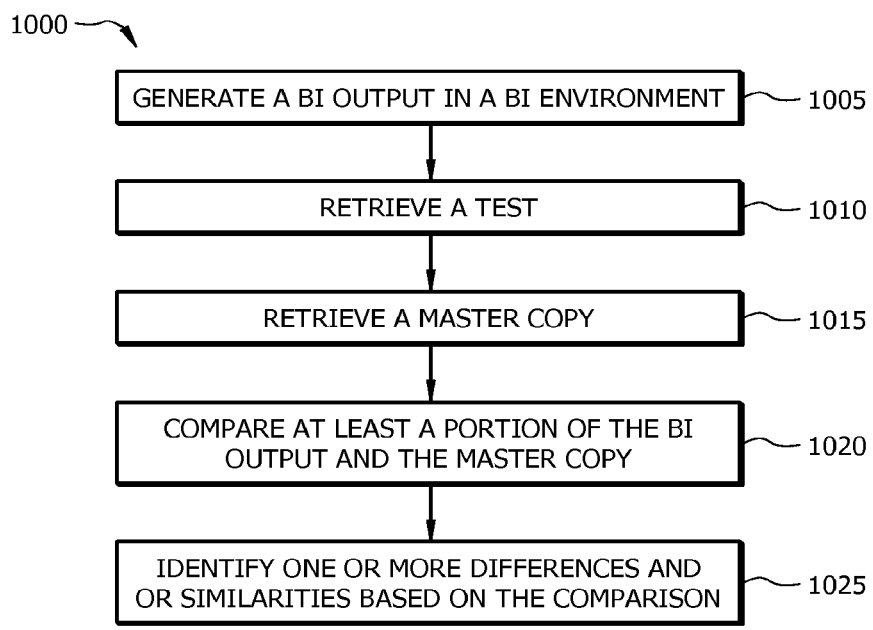
FIG. 10A illustrates an implementation of an example process for generating a test using assertions.

In some implementations, a test may be generated that includes assertions that compare an output such as a report output generated by a report BI Artifact to a predefined output. For example, the SI system may receive a request for evaluation of a BI output, such as a report. FIG. 10A illustrates an implementation of an example process 1000 for a test that includes comparison of an output to a master copy.

A BI Output may be generated in a BI environment (operation 1005). For example, a BI Artifact in a BI environment may be executed and a BI Output may be generated. The BI Output may be generated and/or the BI Artifact may be executed based on a request from the SI system.

The SI system may retrieve a test (operation 1010). For example, a user and/or the SI system may request execution of a test. The test may be requested during and/or after editing a BI Artifact. The test may be stored in a memory of the SI system. In some implementations, a request identification of a master report output upon which the comparison should be made may be received (e.g., from a user). In some implementations, the test may include an identification of a master report output and/or a default value. The SI system may receive the identification of a master report output from the user and may retrieve the master report. For example, the user may designate a previously generated Report Output as the master report output to which a report output generated by the report being tested may be compared in a test.

A master copy may be retrieved (operation 1015). For example, the master copy may be stored on a memory coupled to the SI system and the SI system may retrieve the master copy. In some implementations, the user may provide a master copy (e.g., provide a file to be designated as a master copy and/or file path from which the master copy may be retrieved).

At least a portion of the generated BI Output may be compared to at least a portion of the master copy (operation 1020). The SI system may allow the report BI Artifact to be run and compare the report output from the report BI Artifact to the master report output, in some implementations. For example, a user may provide instructions regarding which portion(s) of the generated BI Output and/or master copy to compare. The SI system may automatically determine which portion(s) of the BI Output and/or the master copy to compare, in some implementations.

One or more differences and/or one or more similarities may be identified (operation 1020). Differences and/or similarities may be identified based at least partially on the comparison. For example, the SI system may determine whether differences in data, format, style, color, etc. exist between at least a portion of the BI Output and/or at least a portion of the master copy. The differences (e.g., based on the comparison to the master report and/or a set of portions to ignore) in the report BI Artifact may be identified by the SI system.

Process 1000 may be implemented by various systems, such as the systems illustrated in FIGS. 1A and 1F. In addition, various operations may be added, deleted, and/or modified. For example, comparison of at least a portion of the BI Output and/or at least a portion of the master copy may be restricted, such as by using markers. The master copy may include a previous version of a BI Output generated by the BI Artifact associated with the generated BI Output and/or versions thereof. In some implementations, a notification may be sent based at least partially on the identified differences and/or similarities. For example, the SI system may transmit a notification (e.g., a pop-up window, a banner, an email, flags, and/or other appropriate notifications) that identifies differences and/or similarities. In some implementations, an assertion library may not be presented to the user. The user may request an assertion and/or provide custom assertions, for example.

Although a test comparing a BI Output to a master copy has been described. Master copies may be compared to other portions of the BI environment, such as metadata model files, metadata models, specifications of the BI Artifact and/or BI Artifact. The item to be compared (e.g., specification of a BI Artifact and/or BI Artifact) may be retrieved and compared to the master copy. Difference(s) and/or similarity(ies) maybe identified.

Figure 10B:
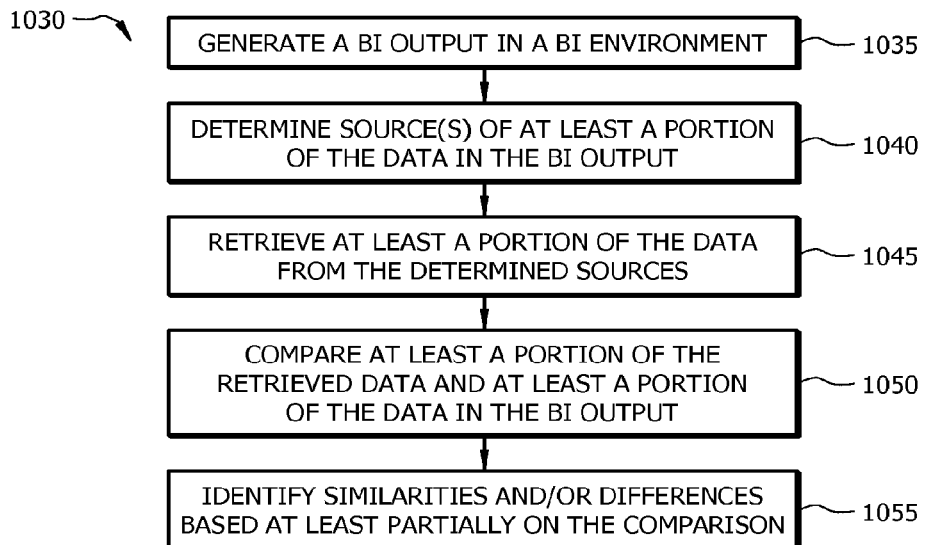
FIG. 10B illustrates an implementation of an example process for comparing data in a BI Output.

In some implementations, the SI system may verify one or more portions of an item to be tested (e.g., BI Artifact, specification of a BI Artifact, BI Output, and/or metadata model). FIG. 10B illustrates an implementation of an example process 1030 that includes a test that retrieves data for comparison with an item to be tested. A BI Output may be generated in a BI environment (operation 1035). For example, the SI system may receive a selection (e.g., from a user) of a BI Artifact for which a BI Output may be tested. In some implementations, the SI system may receive a selection of a BI Output and the SI system may determine the associated BI Artifact and generate the BI Output in the environment by requesting execution of the associated BI Artifact.

Source(s) of at least a portion of the data in the BI Output may be determined (operation 1040). The SI system may analyze the BI Output and/or portions thereof (e.g., a specification of the BI Artifact associated with the BI Output) and determine source(s) of at least a portion of the data in the BI Output. A user and/or the SI system may determine which portions of data for which the source may be identified.

At least a portion of the data may be retrieved from the determined sources (operation 1045). For example, by requesting from and retrieving the data from the databases. In some implementations, the SI system may retrieve at least a portion of the data (e.g., columns, rows, individual data points) on which a BI Output, such as a report output, is based from an external database. For example, a BI Output may include data or aggregated data from a file (e.g., sales data) and the SI system may retrieve the same data as the BI Output.

At least a portion of the retrieved data and at least a portion of the data in the BI Output may be compared (operation 1050). For example, the values aggregated to form data in the BI Output may be recalculated. In some implementations, the SI system may determine a value by performing one or more calculations (e.g., based on criteria in an assertion of a test, such as column x, row y+column n, row z). The value determined by the SI system may be compared to the value included in the report to determine if a difference exists between the two values.

One or more similarities and/or one or more differences may be identified at least partially based on the comparison (operation 1055). The differences may be presented to a user and/or one or more notifications may be transmitted based on the differences (e.g., alerts to users who altered a BI Artifact, alerts to administrators, etc.).

Process 1030 may be implemented by various systems, such as the systems illustrated in FIGS. 1A and 1F. In addition, various operations may be added, deleted, and/or modified. Differences (e.g., based on a comparison of at least two of the outputs) between the outputs may be identified. In some implementations, comparison of at least a portion of the retrieved data and at least a portion of the data in the BI Output may be restricted (e.g., using markers, such as in FIGS. 8A and/or 8B). In some implementations, notification(s) may be generated and/or inserted into the generated BI Output to mark the similarities and/or differences. For example, the differences may be flagged, colored, and/or otherwise distinguished. In some implementations, the similarities may be flagged, colored and/or otherwise distinguished. The SI system may communicate directly with the sources (e.g., external datasource) to retrieve the data, in some implementations.

Figure 10C:
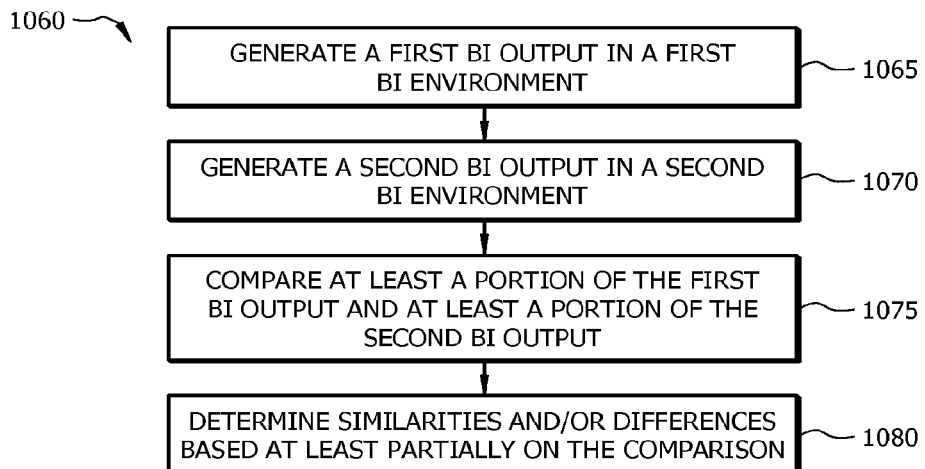
FIG. 10C illustrates an implementation of an example process for comparing output between different BI environments.
Figure 11:
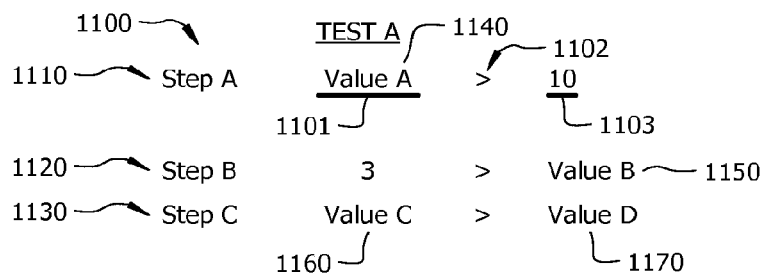

In some implementations, the BI Artifact outputs and/or properties thereof, such as report outputs and/or execution times, may be compared between two or more BI environments running similar BI Artifact in a test. FIG. 10C illustrates an implementation of an example process 1060 for comparing BI Outputs between different BI environments in a test. As illustrated, a first BI Output may be generated in a first BI environment (operation 1065). For example, a user may request that a first BI Output may be generated from a first BI Artifact in the first BI environment.

A second BI Output may be generated in a second BI environment (operation 1070). For example, a user may request that a second BI Output may be generated from a second BI Artifact in the first BI environment. In some implementations, the second BI Output may be a similar or different version of the first BI Artifact. The second BI Output may be a copy of the first BI Artifact deployed in the second BI environment. For example, the first BI environment may be a testing environment and a second BI environment may be a production environment.

At least a portion of the first BI Output and at least a portion of the second BI Output may be compared (operation 1075). For example, formatting in at least a portion may be compared between the first BI Output and the second BI Output. The data retrieved for inclusion in the first BI Output and/or the second BI Output may be compared, in some implementations.

One or more similarities and/or one or more differences may be determined based at least partially on the comparison (operation 1080). The SI system may be utilized to determine whether similarities and/or differences exist. The Notifications may be transmitted to the user and/or presented to the user (e.g., on the first BI Output and/or the second BI Output) based at least partially on the identified similarities and/or differences.

Process 1030 may be implemented by various systems, such as the systems illustrated in FIGS. 1A and 1F. In addition, various operations may be added, deleted, and/or modified. In some implementations, the SI system may automatically request the first BI Output and/or the second BI Output be generated. The SI system may automatically initiate the comparison to determine a level of success of a deployment (e.g., when first BI Output and a second BI Output are similar a passing level of success may be assigned and the when first BI Output and a second BI Output are substantially different a second failing level of success may be assigned). In some implementations, comparison of at least a portion of the first BI Output and/or at least a portion of the second BI Output may be restricted (e.g., using markers, as illustrated as in FIGS. 8A and/or 8B). In some implementations, the first BI Output may be generated from a first version of a BI Artifact and a second BI Output may be generated in a second version of a BI Artifact deployed in the same BI environment (e.g., the first and the second BI environment are the same). The identified differences and/or similarities may facilitate identification of the impact of the changes to the BI Artifact between the versions.

In various implementations, the SI system may allow version control (e.g., managing and/or storing) of assertions and/or tests.

Figure 11:
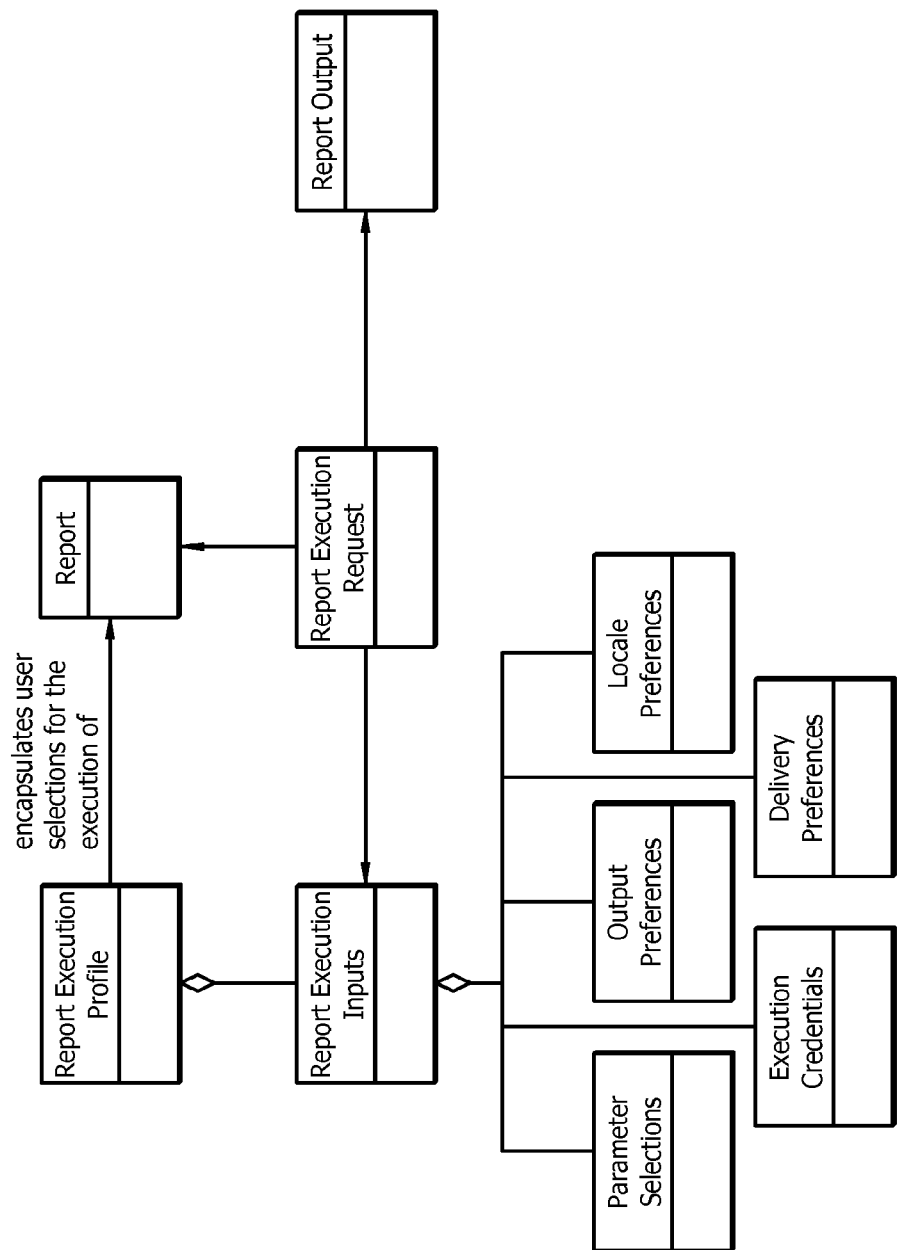
FIG. 11 illustrates an implementation of an example test.

In some implementations, a test may be generated through the SI system in which an assertion is selected more than one time. The implementation of the assertion in the test may vary based on inputs provided by the user that created the test and/or by users running the test. FIG. 11 illustrates an implementation of an example test, Test A 1100. For example, an assertion may be a portion of the test, such as whether a first value 1101 is greater 1102 than a second value 1103. A user may provide the values to be compared. As illustrated, the assertion may be used to generate 3 distinct steps, step A 1110, step B 1120, and step C 1130 in Test A 1100. In step A 1110, the user may provide the first value as a value in a report to be tested, which is designated as, value A 1140, and the second value is provided as a predetermined value of 10. In step B 1120, the user may provide the first value as a predetermined value of 3 and may indicate that the second value is a value B 1150, which is provided by the user requesting that the test be run. In step C 1130, the user may provide the first value as value C 1160, a value from a previous execution, which is retrieved by the SI system, and value D 1170, which is associated with a portion of the report. Thus, the test may be generated to include more than one step which each provide different criteria upon which to evaluate a component (e.g., BI Artifact, output, etc.) based upon a selected assertion.

In some implementations, order in which the steps of a test may be run may be based on criteria provided by the user. For example, one or more steps of a test may be run in a sequential order provided by the user and/or one or more steps may be run concurrently. In some implementations, a step may or may not be run based on the result of another step (e.g., run step 2 if value 1 is greater than 10 in step 1). In some implementations, the SI system may automatically provide at least a portion of the ordering in which steps of a test and/or tests are performed. The SI system may determine a dependency graph, in some implementations, such that an ordering of the tests and/or steps may be dynamically created by the SI system. Thus, when users change, add, and/or delete tests and/or steps, the SI system may automatically adjust the dependency graph as appropriate. For example, if a test contains a reference to a result of another step of the test and/or step of a different step, then the SI system may identify the reference and provide an order of the steps and/or tests such that the reference may be satisfied (e.g., a value has been calculated prior to referencing the value).

In some implementations, the test may produce results such as values from tests, whether a component passed or failed the test or portions thereof, warnings, and/or other information. The test results may be presented to the user (e.g., via one or more graphical user interfaces, messages, notifications, etc.).

In various implementations, assertions may include a number of criteria and/or functions. For example, an assertion may include storage of values. Assertions may include performing statistical functions such as rolling averages, standard deviations, etc. Assertions may include comparing lists of different sizes and identifying differences. Assertions may include testing intermediate SQL and/or MDX (Multidimensional expressions). For example, the SI system may perform tests on intermediate SQLs. For example, the SI system may request intermediate SQL queries (e.g., queries performed as intermediate steps in a BI Artifact processing) and provide the result into assertions of a test. The evaluation based on the assertion may facilitate identification of intermediate SQL that operates at a level different from other SQL, different from a predetermined value, and/or default value, for example. Thus, when report is associated with a long execution time (e.g., when compared to a predetermined value, a user provided value, a default value, and/or a previous execution time, one or more underlying reasons, such as an SQL query, may be identified as the reason for the execution time. The SI system may generate a message based on the identification of the underlying reason. In some implementations, the SI system may identify other components (e.g., BI Artifacts, packages) that utilize the same identified query language. The SI system may transmit message(s) based on the identification of the other components (e.g., to users editing the components, to administrators, etc.).

In some implementations, BI Artifacts may be generated in the BI environment(s) that reference the SI database (e.g., that includes data from the testing). Thus, Report(s), Report Specification(s), and/or Report Output(s), for example, may be generated using the BI environment that includes failures, identification of differences in data in output, etc.

In various implementations, the SI system may process data as it is received. Files may be stored on a memory (e.g., database) coupled to the SI system. For example, the files may include BI Artifacts, labels, property sets, metadata model files, metadata models, and/or other data. The file may be in any appropriate format, such as XML. When the SI system retrieves the file from a memory coupled to the SI system, the SI system may process (e.g., analyze and/or perform tests on) the data in the file and/or remove extraneous data (e.g., as determined by the processing) as it is received by the SI system (e.g., as opposed to loading the entire file prior to processing the file). For example, retrieving a large file from a memory, such as a database, of the SI system may be a resource-intensive process (e.g., processor time, processor usage, memory usage, and/or network usage), since the database may be hosted on a separate machine. Thus, to retrieve the large file from the database, the file may be transmitted across a network coupling the SI system and the database. In some implementations, the type of file format may also cause the retrieval process to be resource-intensive. For example, loading a file as a searchable format (e.g., XML document) may utilize a large amount of memory. These example resource-intensive processes and other resource-intensive processes may affect performance (e.g., slow processing, slow network data transmissions, cause system crashes, and/or other problems). Thus, by processing files as portions of the files are received (e.g., approximately concurrently with receipt) and/or removing extraneous based on the processing, for example, the utilization of resources may be reduced (e.g., when compared with delaying processing of the file until the file has been completely loaded).

In some implementations, this type of streaming processing (e.g., processing files as one or more portions of the files are received and/or removing extraneous based on the processing) may be utilized during various processes of the SI system. In some implementations, an assertion may include this type of streaming processing. The assertion may allow multiple assertions steps to be executed against an incoming file. For example, an assertion or portion thereof may allow multiple assertion steps to evaluate XPath expressions against a shared XML streaming event. In some implementations, each Streaming XPath step that subscribes to an XML streaming event may manage its own XML document. In some implementations, an assertion may include determining whether the file includes an absolute image path (e.g., a No Absolute Image Paths assertion). The assertion may include two steps (e.g., two Streaming XPath steps), and each step may examine a file, such as a report specification XML. A first step may identify images declared in HTML "IMG" tags and a second step may identify images declared using CSS. By utilizing a streaming processing with the assertion, the report specification XML may be loaded once for some or all steps that are configured to process the report specification XML. Thus, overall memory usage may be reduced (e.g., since each step may not separately load the file, since the file is processed as concurrently with receipt of portions of the file).

In some implementations, a streaming processing assertion may allow multiple assertion steps, which may be associated with two separate assertions, to share a resource (e.g., in a Global dependency architecture). For example, a test script may include several assertions to be executed against a BI Artifact Output, such as a Report Output. Rather than load the Report Output separately for each assertion, the Report Output may be loaded and more than one assertion may be executed against the Report Output. In some implementations, the assertions may be executed against and/or other processing may be performed on the Report Output before the entire Report Output is retrieved (e.g., as portions are received) and/or extraneous information from the Report Output may be removed based at least partially on the assertions executed and/or processing.

In some implementations, the SI system may utilize the streaming processing in combination with one or more assertions. For example, when performing a comparison between portions of BI Artifacts and/or BI Artifact Outputs, the SI system may utilize streaming processing. For example, the SI system may determine a set of portions to ignore (e.g., receive portions to ignore from a user and/or retrieve portions to ignore from a memory of the SI system and/or user computer). When the SI system retrieves BI Artifact Output(s) for comparison, the SI system may utilize streaming processing to analyze portions of the BI Artifact Output based on whether portions are included in the set of portions to ignore. Thus, rather than retrieve and compare two or more complete BI Artifact Output(s), the SI system may process one or more of the BI Artifact Output(s) approximately concurrently with receipt to remove (e.g., not save and/or remove from analysis) portions that are included in the set of portions to ignore. For example, a first BI Artifact may include 3 types of portions: portion type A, portion type B, and portion type C. The set of portions to ignore may identify portion type A to ignore. When the SI system receives a first BI Artifact Output, which was generated by the execution of the first BI Artifact, the SI system may determine that portion type A has been received and remove (or otherwise ignore) portion type A. The SI system may receive other parts of the first BI Artifact Output and identify that they include portion type B and portion type C, and continue analysis of portion type B and portion type C. For example, portion type B and portion type C of the first BI Artifact Output may be compared to a master copy, a BI Output generated from a different version of the first BI Artifact, and/or other BI Artifact Outputs. In some implementations, the SI system may utilize streaming processing in combination with a set of portions to compare. For example, the SI System may determine whether a portion of a BI Artifact Output received is included in the set of portions to compare and remove (e.g., not save and/or remove from analysis) and/or ignore portions that are not included in the set of portions to compare.

In some implementations, the SI system may utilize an assertion that may include a table reader assertion. A table reader assertion may allow tabular data to be read from a variety of sources with less configuration (than when tabular data is read from its native source format). A table reader assertion may allow the SI system to read cell values from a XML, comma-separated values, Excel, and/or list-based data source into an XML document, which may not have a format based on the source format (e.g., a source-agnostic format). The size of the XML document may be managed to allow look-ahead and/or look-behind searches while reducing memory consumption (e.g., when compared with the amount of memory associated with storing cell values in the original format). In some implementations, the assertions may include specialized XML readers for various BI environment XML output formats in order to ease usability (e.g., reduce complexity) for the end user.

The table reader assertion may include allowing data to be selected using a Selector. A table reader may include one or more table selectors. The table selectors may use XPath expressions to pull data from an XML document using, for example, look-ahead and/or look-behind searches to decide whether to select or not to select data in the current cell and/or row based on the contents of a nearby cell and/or row. For example, a Column Validation assertion may include a table reader to select a column from a Cognos XML output by name so that the values may be compared to the result of a database query. The end user may provide the column name that the user is selecting and the type of Cognos output the user would like the assertion to read. The table reader may load the cells, column names, and/or row names into an internal XML document of the table reader and the selector may identify the values associated with the specified column name. The reader may then continue processing until the table reader reaches the end of the column, for example, which allows the selector to handle variable lengths of output, in some implementations.

In some implementations, a set of predefined assertions using table readers may be provided to a user for selecting columns, rows and/or areas based on criteria such as: the name of index of the current; previous and/or next row and/or column. A user may not need familiarity with XML to use the table reader assertions, since the XML may be built into the selector of the table reader. This may ease use of the assertion by users.

In some implementations, the SI system may utilize an assertion that may include a Report Documentation and/or Model Documentation assertion. The Report Documentation assertion and/or the Model Documentation assertion may parse a specification XML for an object type and identify important metadata (e.g., the data item expressions used in the report). The identified information may be stored in a memory of the SI system (e.g., a database coupled to the SI system) and may be exposed for reporting using a package. The Report Documentation and/or Model Document assertions may identify and/or extract additional metadata as specified by the end user, in some implementations. The extracted metadata may be stored, queried, and/or reported on (e.g., for data lineage purposes). For example, the SI system may generate a Report that allows searching among more than one (e.g., all and/or a subset) of the reports in a BI environment that use a particular data item expression.

In some implementations, the SI system may allow generation of test scripts. A test script may be associated with a project and one or more tests associated with the project. The project may be established in a BI environment and/or the SI system and the tests may be executed in the BI environment and/or the SI system. For example, a test script may include a subset of the tests associated with a project.

In some implementations, the user may specify one or more critera (e.g., conditions to be satisfied) for tests to be included in the test script. When the test script is allowed to run, the SI system may identify the test(s) that meet the one or more criteria and run the identified test(s) at the time of the run. The identified test(s) may be run concurrently, with overlapping run times, and/or consecutively. For example, the user may specify that a test script includes one or more test cases meeting one or more of predetermined criteria (e.g., stored in a memory of the SI system and/or provided by a user) including, but not limited to: test cases that have failed on one or more previous runs; test cases associated with BI Artifact(s) that have changed since the last run of such test case; test cases associated with BI Artifact(s) having a particular name, path, and/or type; test cases that have particular tags associated with the test case; and/or other appropriate types of tests.

Test scripts may allow different subsets (e.g., all or a portion of the tests associated with a project) of tests to be run based on satisfaction of criteria (e.g., at different times, in response to one or more different events, and/or on different schedules). For example, if a first test script includes tests with long execution times, then it may be run nightly. If a second test script includes tests with short execution times, it may be run twice daily. In some implementations, a subset of the tests may be dynamically selected based on whether criteria are satisfied. For example, criteria may include processor usage. When processor usage is lower than a predetermined low usage, the SI system may select the tests in a test script to be run.

Figure 12A:
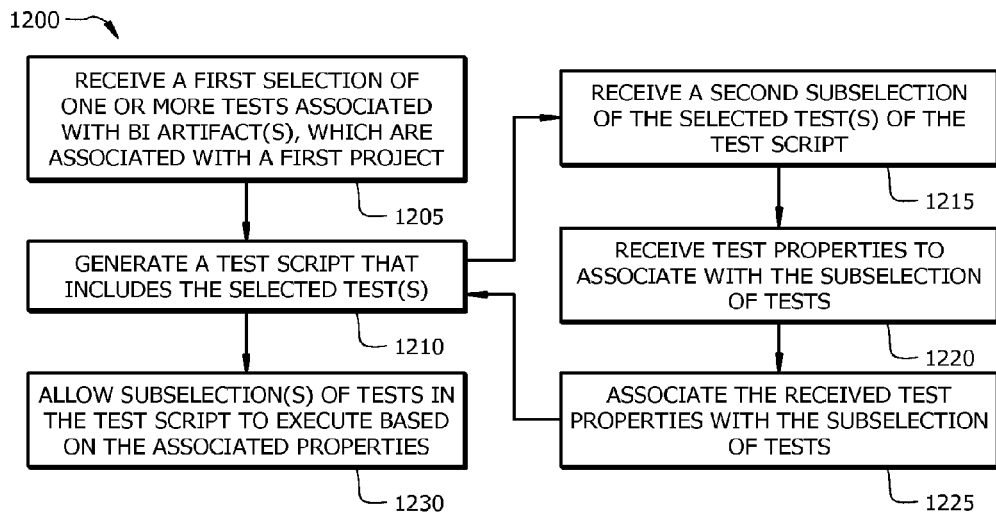
FIG. 12A illustrates an implementation of an example process for generating a test script.

In some implementations, a test script may be generated based at least partially on information provided by a user. FIG. 12A illustrates an implementation of an example process 1200 for generating a test script. A first selection may be received of one or more tests associated with BI Artifact(s), which are associated with a first Project (operation 1205). The user may select one or more tests to be associated with a test script and the SI system may receive the selections.

A test script may be generated that includes the selected test(s) (operation 1210). For example, a test script or portions thereof (e.g., a listing of the components and/or associations of a test script) may be saved in a memory of the SI system. For example, a schedule on which one or more tests are run may be saved (e.g., in a memory of the SI system) in association with the test script. In some implementations, the tests in the test script and/or an association of a test with a test script may be saved (e.g., in a memory of the SI system) in association with the test script.

A second sub-selection of one or more of the selected test(s) of the test script may be received (operation 1215). For example, a user may select one or more of the tests selected for inclusion in a test script and the second selection may be saved in a memory of the SI system.

A test property (e.g., frequency of execution, event to trigger execution, or other such event) associated with the sub-selection of test(s) may be received (operation 1220). For example, a user may provide (e.g., to a SI system via one or more interfaces generated by the SI system) a test property, such as frequency of execution (e.g., when to request execution of a test(s)).

The received test property may be associated with the sub-selection of test(s) (operation 1225). For example, a table of associations may be stored in a memory of the SI system. The test script may include one or more properties associated with one or more sub-selection(s) of tests, in some implementations.

Sub-selection(s) of tests may be allowed to execute based on associated properties (operation 1230). For example, a first sub-selection of tests may operate according to a first frequency of execution (e.g., once daily) and a second sub-selection of tests may operate according to a second frequency of execution (e.g., once weekly).

Process 1200 may be implemented by various systems, such as the systems illustrated in FIGS. 1A and 1F. In addition, various operations may be added, deleted, and/or modified. For example, a test property may include a frequency of execution. A user may provide a frequency of execution for a test script. The test property may include assertion type (e.g., pre-execution and/or post-execution), output size, etc. For example, when a test property includes assertion type, a group of pre-execution tests may be selected as a first sub-selection and a group of post-execution tests may be selected as a second sub-selection. The SI system may automatically determine the property type and/or the second sub-selection. In some implementations, a plurality of sub-selections and test properties may be received. The associations between the sub-selections and test properties may be stored in a memory of the SI system. The test script may be executed automatically and/or manually (e.g., a user may request execution of a test script or portion thereof).

In some implementations, a selection of test(s) may not be received. For example, the SI system may provide a listing of tests to be included in the test script and a user may provide conditions that are utilized in the test to determine passage of the test. For example, the SI system may include a test that determines whether a run time is less than a predetermined high run time. The user may provide the condition of the predetermined high run time. The selection of one or more criteria by a user may be made in addition to and/or instead of the selection of one or more tests. In various implementations, the SI system may automatically determine the tests to be included in the test script, may retrieve a listing of tests to be associated with a test script (e.g., automatically, for example, based on a type of test; based on a previously established listing provided by a user; and/or otherwise appropriately established listings), and/or request that a user provide a listing of tests to be included with the test script.

In some implementations, the SI system may automatically determine a test script and/or portions thereof. For example, the SI system may analyze the tests associated with a project and generate one or more test scripts based on the analysis. For example, the SI system may determine which tests have execution time greater than a predetermined period and group the longer tests in a first test script. In some implementations, the SI system may identify the type of test (e.g., post-execution and/or pre-execution) and generate test script(s) based at least partially on the type of test (e.g., group pre-execution tests together). In some implementations, the SI system may determine whether relationships exist between the tests (e.g., a first test uses a value from a second test) and generate test scripts based on the determined relationships. In other implementations, a test script may not be associated with a project.

In some implementations the SI system may allow one or more assertions to be applied to the tests of a project to automatically categorize tests in one or more test scripts. For example, an output size of a test may be evaluated based on an assertion and then the SI system may categorize the tests into one or more test scripts based on output size.

Figure 12B:
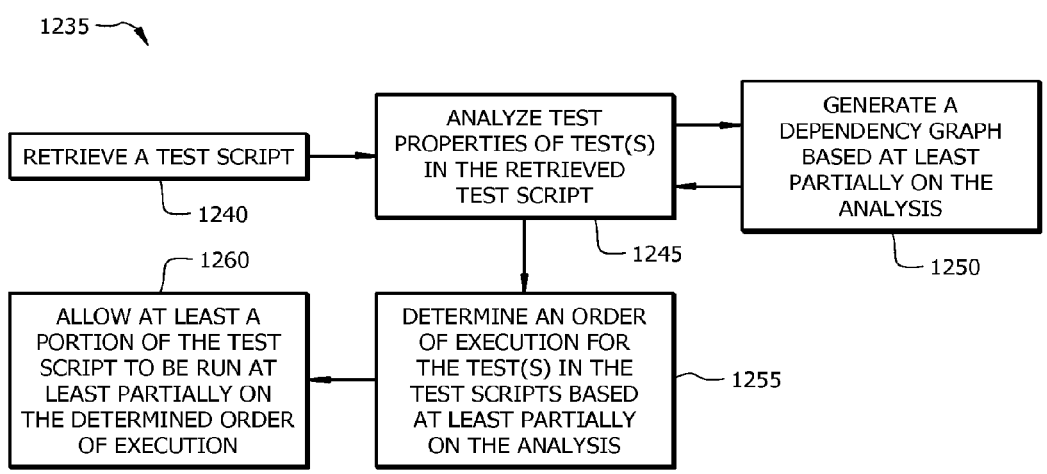
FIG. 12B illustrates an implementation of an example process for a test script.

In some implementations, the SI system may determine an order of execution for tests in test script(s). FIG. 12B illustrates an example process 1235 for a test script. A test script may be retrieved (operation 1240). In some implementations, a test script may be established using, for example, the SI system. The test script may be saved in a memory of the SI system and retrieved, as appropriate.

Test properties of test(s) in the retrieved test script may be analyzed (operation 1245). For example, test properties of the test(s) such as related BI Artifacts, information used by the assertions of the test(s), run time, type of test and/or assertion included in the test (e.g., pre-execution and/or post-execution), user provided test information (e.g., frequency of execution), previous test results, etc. The SI system may analyze the test and/or assertions of the test to determine the test properties at least partially based on the analysis. In some implementations, the SI system may request information from the user and determine test properties based on information received from the user.

A dependency graph may be generated based at least partially on the analysis (operation 1250). A dependency graph may include relationship(s) between one or more tests. For example, a test may depend on a result of a different test and/or a BI Output. The dependency graph may include information that describes relationship(s) between the tests.

An order of execution for the test(s) in a test script may be determined at least partially based on the analysis (operation 1255). For example, the SI system may retrieve the dependency graph and determine an order based at least partially on the dependency graph. For example, if a first test depends on a result of a second test, then the order of execution may indicate that the second test may be executed prior to the first test. In some implementations, a first test and a second test may depend on a result from a third test and a second test may depend on a result from a first test. Then the SI system may determine the order of execution such that the third test is executed before the first test, which is executed before the second test.

At least a portion of the test script may be allowed to run based at least partially on the determined order of execution (operation 1260). For example, the SI system may retrieve a test and allow the test to execute at least partially based on the determined order of execution.

Process 1235 may be implemented by various systems, such as the systems illustrated in FIGS. 1A and 1F. In addition, various operations may be added, deleted, and/or modified. For example, the order of execution may be based on one or more test properties, such as run time, frequency of execution, etc. The test(s) may be grouped within the order of execution based on the test properties. For example, tests that may be executed daily may be grouped together and/or the order of execution may be based on the dependency graph within the grouping. In some implementations, the execution order may be presented to the user. The user may confirm, deny, and/or alter the execution order. The execution of tests based at least partially on the execution order may be initiated automatically and/or manually.

In some implementations, the SI system may analyze the tests of the test script and determine a property of the test script, such as an execution time. If the execution time for the test script is greater than a predetermined period of time, the SI system may automatically run the test script at night rather than during the day. In some implementations, the SI system may monitor system usage and allow one or more test scripts or portions thereof when a system usage is less than a predetermined value. The SI system may restrict operation and/or termination an operation of a test script or portion thereof when a system usage is greater than a predetermined maximum value, in some implementations.

Figure 13:
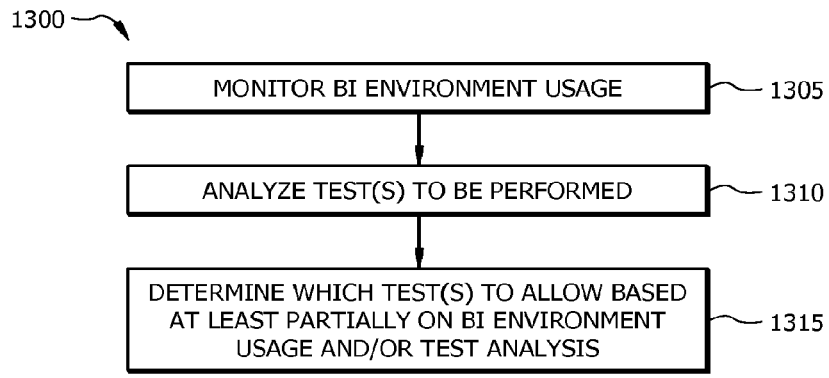
FIG. 13 illustrates an implementation of an example process for regulating execution of testing.

In some implementations, the SI system may include a governor (e.g., a module of the SI system may include a governor). For example, the governor of the SI system may monitor and/or regulate the number of requests that the SI system issues to the BI environment. The ability of the BI environment to respond to requests from users and/or requests from the SI system may be based on the current loads on the system. If the BI environment is experiencing a high load (e.g., a number of loads greater than a predetermined value), the BI environment may respond to requests slowly (e.g., when compared to response time under lower loads). Thus, the SI system may monitor the BI environment via the governor. The SI system may issue requests based on the monitoring of the BI environment. For example, the number and/or type of requests issued by the SI system may be based on the monitoring by the governor. In some implementations, the SI system may determine when, how many, and/or which tests to allow to run based on the monitoring of the BI environment by the governor of the SI system. FIG. 13 illustrates an implementation of an example process 1300 for regulating execution of testing. The BI environment usage may be monitored (operation 1305). The SI system may monitor and/or request (e.g., from the BI environment) processing loads, register usage, and/or cache usage, for example. The SI system may determine whether the BI environment usage is above a predetermined usage value, below a predetermined usage value, within predetermined ranges (e.g., very low usage, low usage, medium usage, and/or high usage).

Test(s) to be performed may be analyzed (operation 1310). For example, a run time for a test may be determined and/or a BI environment processor usage for a test may be determined (e.g., from test properties and/or from previous test execution).

A determination may be made to determine which test(s) to allow based at least partially on the BI environment usage and/or test analysis (operation 1315). For example, if a BI environment usage is at a low level, then one or more tests may be allowed. If a BI environment usage is at a medium level and/or a test analysis indicates that a test has a low processor usage, then the test may be allowed. Execution of a test may be restricted under high usage criteria. For example, high usage criteria may be established by users (e.g., system administrator) and/or by default values provided to the SI system. The high usage criteria may include test analysis that indicates that test(s) have high processor usage and/or processor levels are at high levels.

Process 1300 may be implemented by various systems, such as the systems illustrated in FIGS. 1A and 1F. In addition, various operations may be added, deleted, and/or modified. For example, the SI system may delay the execution of test(s) when the BI usage level is above a predetermined high level. The determination of which and/or whether to allow test(s) to be executed may be based on a variety of factors, such as BI environment usage, such as loads on components of the BI environment, daily load patterns within the BI environment, other test(s) and/or processes (e.g., deployment) being performed in the BI environment; and/or test analysis, such as execution time, portions of the BI environment that are accessed during testing, etc. Thus, the SI system may be able to execute testing in a manner to increase user satisfaction (e.g., such that processing loads are not substantially increased such that user functionality is not substantially decreased). In some implementations, the SI system may restrict the number of tests to execute based on the BI environment usage and/or test analysis, in some implementations. The SI system may determine an estimated BI usage while allowing the test (e.g., from previous test execution) and determine the number of tests and/or which tests to allow to execute based on the estimated BI usage, in some implementations. For example, the SI system may allow tests such that BI usage is maintained below a predetermined testing usage level (e.g., processor load and/or cache usage).

In some implementations, the test scripts may include one or more properties and the SI system may allow a test script to operate and/or restrict operation of the test script based on the properties. For example, the test script may include a property such as to use a previous run value unless the BI Artifact associated with a test changes. The SI system may determine a version of the BI Artifact and the version on which the test last ran to determine if the BI Artifact has changed since the last run of the test. The SI system may restrict operation of the test script if the BI Artifact did not change since the last test run. The SI system may allow the test script to run based at least partially on other properties (e.g., execution properties) if the BI Artifact did change since the last run. In some implementations, a test script may include timing properties. For example, a timing property may include that if the test script ran within a predetermined period of time (e.g., last 3 hours), the results from the previous run should be utilized (e.g., in BI Artifact outputs, such as reports, in other tests, etc.).

In various implementations, a test script, a test, an assertion of a test, and/or testing loop may be automatically and/or manually initiated. For example, the SI system may automatically initiate a test script, a test, an assertion of a test, and/or testing loop based on testing criteria. Testing criteria may be, but is not limited to, being provided by a user, being stored as a default in the SI system, and/or be saved in association with the BI environment, in some implementations. For example, testing criteria may cause initiation of a test script, a test, an assertion of a test, and/or testing loop at intervals predefined in the testing criteria. The testing criteria may cause initiation of a test script, a test, an assertion of a test, and/or testing loop when a criterion is satisfied (e.g., processor usage below a predetermined low level). In some implementations, a test script, a test, an assertion of a test, and/or testing loop may be manually initiated. For example, a user may request initiation of a test script, a test, an assertion of a test, and/or testing loop.

In various implementations, a test script, a test, an assertion of a test, and/or testing loop may be triggered (e.g., automatically and/or manually) by other events. For example, the SI system may determine that a predetermined event has occurred (e.g., by retrieving a listing of predetermined events and/or predetermined event criteria and comparing conditions occurring in the BI environment to the listing and/or criteria) and initiate a test script, a test, an assertion of a test, and/or testing loop. The SI system may determine that a predetermined event has occurred and request that a user initiate a test script, a test, an assertion of a test, and/or testing loop. For example, a predetermined event may include failure of an associated test; failure of a related test; change in an associated and/or related BI Artifact; deployment of a new and/or altered package; deployment of a new and/or altered BI Artifact; and/or change in property set. In some implementations, if a determination is made that an underlying datasource and/or reference to a database changes, then a test script, a test, an assertion of a test, and/or testing loop may be triggered (e.g., automatically and/or manually).

In some implementations, a test script, a test, an assertion of a test, and/or testing loop may be run independently of one or more features of version control provided by the SI system. For example, a test script, a test, an assertion of a test, and/or testing loop may be initiated by a user. A test script, a test, an assertion of a test, and/or testing loop may be initiated by deployment of a BI Artifact, for example. In some implementations, a test script, a test, an assertion of a test, and/or testing loop may be initiated and/or operate in conjunction with version control features provided by the SI system. For example, the SI system may detect changes and automatically initiate a test script, a test, an assertion of a test, and/or testing loop.

In some implementations, test scripts may allow a dynamic selection of tests (e.g., to executed and/or modifying the tests). For example, a test script may allow dynamic selection of tests based on criteria. For example, criteria may allow selection of tests, such as, tests that are executed on BI Artifacts that have changed. Allowing a test script to discriminately select test cases (e.g., such as tests executed on changed BI Artifacts), may inhibit and/or reduce redundant automated testing. Inhibiting and/or reducing redundant testing may reduce resource utilization.

In some implementations, test case categories may be utilized. Test case categories may include indicia, such as flags that may be added to a test case and/or may be utilized with criteria for dynamic test script selection. For example, the SI system may include an assertion, such as a category update assertion. A Category Update assertion may allows conditional logic to be used to automatically add a test case to a category based on conditions that can be defined within the assertion. This may allow assertions to manage scheduling based on conditions identified during testing. For example, a Execution Time Stability assertion may include the ability to add its test case to the Short Running category if its execution time is less than a configurable threshold, or the Long Running category if its execution time exceeds a second configurable threshold. A test script that selects test cases in the Short Running category could be scheduled to run every two hours and a second test script that selects Long Running test cases could be schedule to run during non-peak hours.

In some implementations, the SI system may utilize assertions that may include component assertions. Component assertions may include re-usable sets of pre-configured assertion steps that perform a task but may not constitute an assertion on their own. The SI system may provide a set of pre-built component assertions and/or Assertion Studio users may create their own components. Since the component assertions are not complete assertions, the component assertions may be specially handled. For example, when the component assertion is validated by the SI system prior to saving the component assertion in a memory of the SI system, certain types of validation errors that may inhibit other types of assertions from being saved may be allowed. In some implementations, multiple assertions may identify a list of the image paths in a report. The Image Paths component may include the five steps that are utilized to create that list. A user creating a custom assertion that consumes the image paths may add the five pre-configured steps by choosing to add the component assertions to the custom assertion. The user may then add other steps that consume the output of the component assertions. This may increase the ease of use for a user (e.g., by reducing complexity since an understanding of XPath and/or regular expressions may not be utilized when creating a custom assertion)

Figure 14:
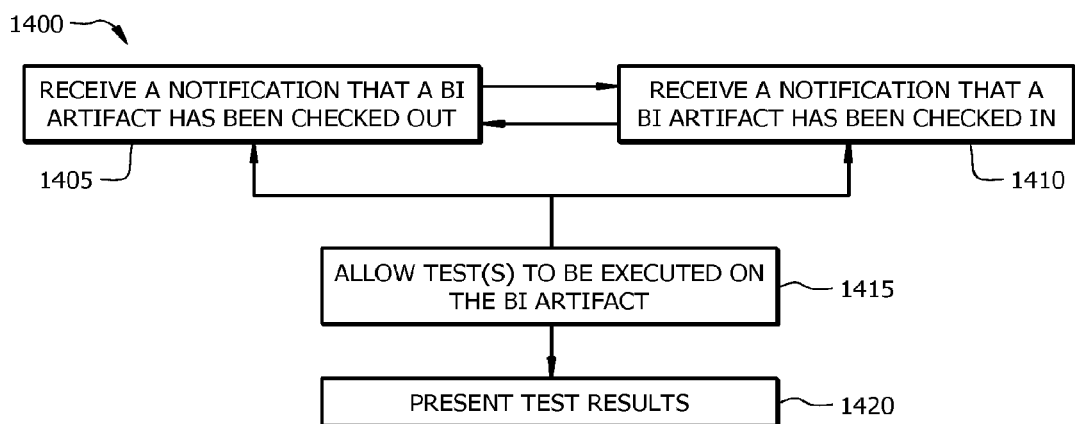
FIG. 14 illustrates an implementation of an example process for testing in a studio.

In some implementations, the SI system may allow testing to be performed in studios of a BI environment, such as Report Studio, Query Studio, etc. By allowing testing in a studio, feedback for one or more changes (e.g., additions, deletions, and/or alterations) may be provided by the SI system based on the testing. FIG. 14 illustrates an implementation of an example process 1400 for testing in a studio. For example, the SI system may allow users to check in and check out a BI Artifact the user is authoring (e.g., via one or more buttons, for example, in the studio). A notification may be received that a BI Artifact has been checked out (operation 1405). For example, a user in a Report Studio of IBM Cognos may be allowed to check out a BI Artifact. The SI system may communicate with the BI environment and receive a notification that the BI Artifact has been checked out. In some implementations, the SI system may include a button or link (e.g., on an interface of the studio of the BI environment) that when selected allows a BI Artifact to checked out. A user may check out a BI Artifact when editing and/or creating the BI Artifact. Checking out the BI Artifact may restrict editing and/or execution of the checked out BI Artifact by other users. A checked out BI Artifact may be viewable by other users, in some implementations.

A notification may be received when the BI Artifact has been checked in (operation 1410). For example, the SI system may receive a notification that the BI Artifact has been checked in. In some implementations, the SI system may include a button or link that when selected allows a BI Artifact to checked in. The button that allows a BI Artifact to be checked out may be reselected by a user to check in the BI Artifact. A user may check in the BI Artifact to allow other users to edit the BI Artifact.

Test(s) may be allowed to execute on the BI Artifact (operation 1415). The tests may be executed when the BI Artifact is checked in and/or checked out. In some implementations, the SI system may determine which tests to executed while the BI Artifact is checked in and/or checked out.

The tests results may be presented (operation 1410). For example, the test results or portions thereof may be presented on the BI Artifact in the studio. For example, indicia may be presented on portions of the BI Artifact that pass and/or fail (e.g., red flags for failure of tests, green flags for passing of tests, and/or other indicia as appropriate).

Process 1400 may be implemented by various systems, such as the systems illustrated in FIGS. 1A and 1F. In addition, various operations may be added, deleted, and/or modified. For example, the SI system may determine which tests to execute while the BI Artifact is checked in and/or checked out (e.g., based on test analysis, type of test, and/or user provided information). The SI system may receive an indication that the BI Artifact is being checked in and may perform one or more tests (e.g., a test script to be run in studio generated based on input from a user and/or automatically generated by the SI system based on defaults or evaluations by the SI system). The SI system may determine test results and present the test results to the user (e.g., through an icon, through color, through notifications, and/or messages in the studio). Thus, after changes are made to a BI Artifact and the BI Artifact is checked into the system, one or more tests may be performed and an evaluation of the changes made to the BI Artifact may be determined (e.g., increased execution time, produced a report that does not meet company standards, etc.).

In some implementations, rather than receiving a notification that a BI Artifact has been checked out and/or checked in, the SI system may determine whether a BI Artifact has been changed. For example, the SI system may retrieve a previous version of the BI Artifact and compare the version of the BI Artifact in the studio to determine whether the BI Artifact has been changed. In some implementations, the SI system may analyze user actions in the studio (e.g., by analyzing communications transmitted by the user to the BI environment and/or from the BI environment to the user) to determine whether the BI Artifact has been changed.

In some implementations, a test may be executed automatically and/or manually (e.g., based on user request). For example, when a BI Artifact is checked out a user may alter the BI Artifact and request that one or more tests be performed on the checked out BI Artifact. The user may check in a BI Artifact and request that tests be performed on the BI Artifact. In some implementations, the SI system may automatically executed one or more of the tests (e.g., based on test properties and/or default test instructions).

In some implementations, test results may be presented as flags and/or color on an interface of the studio. A notification may be transmitted (e.g., by a SI system to a user) based on test results. In some implementations, a notification may be transmitted to a user based on tests results of a BI Artifact related to the BI Artifact checked out by a user.

In some implementations, the determination of which tests to execute when a BI Artifact is checked in and/or checked out may be based on information provided by a user and/or based on a determination by the SI system.

In some implementations, the SI system may allow version control (e.g., monitoring and/or saving of versions) of BI Artifacts. For example, when a BI Artifact is checked in, the SI system may save the checked in version of the BI Artifact. In some implementations, the SI system may determine whether the checked in version of the BI Artifact is different from the checked out version of the BI Artifact and save the checked in version of the BI Artifact when the checked in version is different from the checked out version. The SI system may perform one or more tests on the BI Artifact if a determination is made that the checked in version of the BI Artifact is different from the checked out version (e.g., a new version of the BI Artifact was created).

In some implementations, when a BI Artifact is checked out and/or while a BI Artifact is checked out, a related failure notification may be transmitted (e.g., to a user via an interface of the studio and/or other interface, as appropriate) when a test related to the BI Artifact fails. For example, if a datasource fails, then a related failure notification may be transmitted. If a test related to another BI Artifact fails and the BI Artifact depends on the other BI Artifact (e.g., a query result), then a related failure notification may be transmitted. Thus, a user editing and/or viewing a presentation of test results of the BI Artifact may be aware of related failures that may affect the tests results of the BI Artifact.

In some implementations, test(s) that include, but are not limited to, pre-execution assertions may be executed while the BI Artifact is checked out. For example, a header and/or footer may be checked by a test while the BI Artifact is checked out. The test(s) that include pre-execution assertions may be saved in a temporary folder in the BI environment (e.g., the same BI environment) and tests may be executed on the version of the test in the temporary folder. The test(s) that include pre-execution assertions may be allowed manually (e.g., based on a user request) and/or automatically (e.g., periodically). In some implementations, the test(s) that include pre-execution assertions may be executed while the BI Artifact is checked in. The test results may be presented (e.g., pop-up in studio, color based on test result in studio, and/or presenting a header with test result in studio).

In some implementations, the testing may be initiated in studio based on a detected event by the SI system. For example, when a BI Artifact is saved one or more tests may be executed. When a BI Artifact is checked out and/or checked in, test(s) may be executed. In some implementations, testing may be initiated by a user request (e.g., selecting a link, a field, and/or a button).

In some implementations, the SI system may deploy the changed BI Artifact to a folder, such as a temporary folder, of the BI environment (e.g., a copy of the BI Artifact may be created in the folder). The SI system may test the deployed changed BI Artifact (e.g., the copy of the changed BI Artifact in the folder of the BI environment) to determine one or more test results. The SI system may present at least a portion of the test results (e.g., failure, increased run time, etc.) to a user in a corresponding studio (e.g., the studio in which the BI Artifact was changed). The SI system may test and/or present test results automatically, in some implementations. In some implementations, the SI system may allow version control of the temporary folder and a user may be able to revert to previous changes, undo changes, and/or compare versions, for example. Version control of the temporary folder may be restricted, in some implementations.

In some implementations, the SI system may perform tests (e.g., a test script generated to be performed on changed BI Artifacts) when one or more predetermined changes are made in a studio, such as deleting a property of a BI Artifact and/or changing reference to a datasource. The tests may be performed on the BI Artifact and/or other BI artifacts in the BI environment. The other BI artifacts may be determined using predetermined criteria, such as whether the other BI artifacts have a dependency on the BI artifact. One example of such a dependency is a query object having a dependency on a package object.

Figure 15:
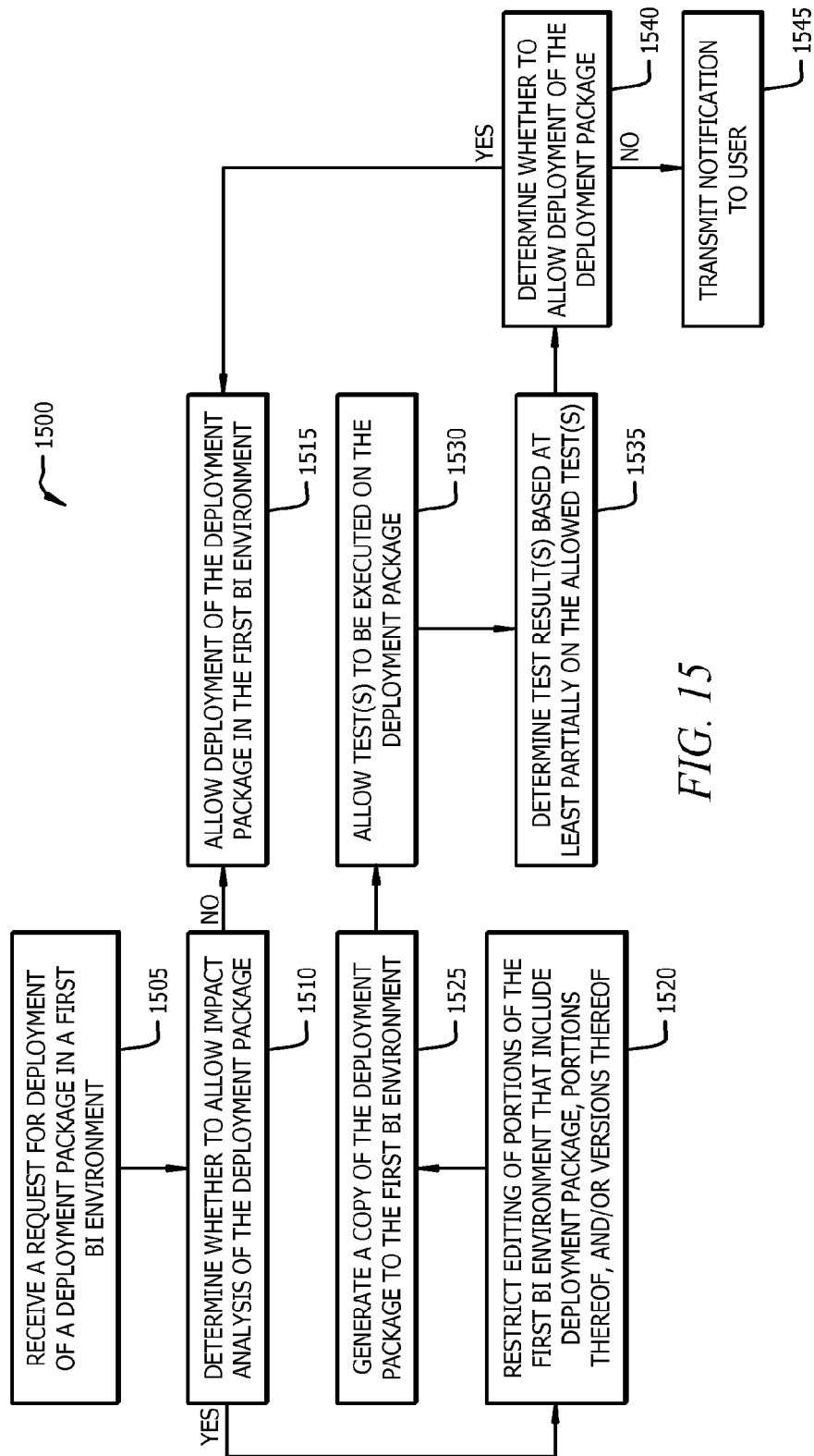
FIG. 15 illustrates an implementation of an example process for analysis of the impact of a deployment.

In some implementations, the testing the SI system may be able to perform may include impact analysis. For example, a user may utilize impact analysis to determine properties associated with deploying a package in a BI environment (e.g., such that system crashes, circular reference problems, etc. may be determined). FIG. 15 illustrates an implementation of an example process 1500 for analysis of the impact of a deployment. A request for deployment of a deployment package in a first BI environment may be received (operation 1505). The SI system may receive identification (e.g., a label and/or version) of package(s) to be deployed and identification of a BI environment in which the identified package(s) may be deployed. The BI environment may include a deployment of a different version of the package, in some implementations.

A determination may be made whether to allow impact analysis of the deployment package (operation 1510). A user may request impact analysis of a deployment package. For example, a user may select a button on an interface and the SI system may receive the request for impact analysis.

If a determination is made not to allow impact analysis, then deployment of the deployment package in the first BI environment may be allowed (operation 1515). For example, a copy of the deployment package may be generated in the first BI environment.

If a determination is made to allow impact analysis, editing of portions of the BI environment that include the deployment package (e.g., the deployment package, portions of the deployment package, versions of the deployment package, and/or portions of the BI environment related to the deployment package) may be restricted (operation 1520). For example, if a first BI Artifact in the deployment package is related to a second BI Artifact (e.g., the first BI Artifact includes an output of the second BI Artifact, such as a report or query), then editing of the second BI Artifact may be restricted.

During impact analysis, a copy of the deployment package may be generated in the first BI environment (operation 1525). The SI system may retrieve the identified package(s) and generate a copy of the identified package(s) in a folder, such as a temporary folder, in the first BI environment(s). The identified package(s) may be restricted from deleting, overwriting, or otherwise altering one or more other BI Artifacts in the identified BI environment (e.g., the identified package may be restricted from overwriting the version of the package currently deployed in the identified BI environment), in some implementations.

During impact analysis, test(s) may be executed on the deployment package (operation 1530). The SI system may run one or more tests (e.g., test scripts, tests, etc.) on the package(s) and/or components thereof in the folder. In some implementations, one or more tests may be performed on BI Artifacts or portions thereof that are related to (e.g., associated with, reference(s), depend on, and/or depend from) the components of the deployment package. Since the package(s) are operating in the BI environment in which the user would like to deploy the package, more accurate information about the deployment of the package may be determined (e.g., when compared to running the tests on the package in a different BI environment, such as a development BI environment).

Test result(s) based at least partially on the allowed test(s) may be determined (operation 1535). For example, a determination may be made whether test(s) were passed and/or score(s) (e.g., execution time) from test may be determined. One or more metrics may be determined based on test results (e.g., test results may be compared to previous test results, current test results for the current BI environment, and/or other analytics). At least a portion of the test result(s) may be presented to the user. For example, at least a portion of the test result(s) may be presented to the user through an interface and/or via a message transmitted by the SI system.

A determination may be made whether to allow deployment of the deployment package (1540). For example, the SI system may receive a request from the user to deploy the deployment package. In some implementations, the SI system may automatically deploy the deployment package based at least partially on the test result(s). For example, if the deployment package passes a predetermined number or type(s) of test(s), then the SI system may automatically deploy the deployment package.

If a determination is made not to allow deployment of the deployment package, then a notification may be transmitted to the user (operation 1545). In some implementations, the user may view the presented test result(s) or portions thereof and determine that the deployment package is not ready for deployment and/or interferes with operations of the BI environment. The user may request that deployment of the deployment package may be inhibited. In some implementations, the SI system may inhibit deployment of the deployment package automatically (e.g., for failure of a predetermined number of and/or type of test(s)).

If a determination is made to allow deployment of the deployment package, then the deployment of the deployment package may be allowed in the first BI environment (operation 1515). For example, a copy of the deployment package may be generated in the first BI environment. The copy of the deployment package may be deleted from the temporary folder in the first BI environment and a second copy of the deployment package may be generated in a different folder (e.g., the folder with previous versions of one or more of the components of the deployment package).

Process 1500 may be implemented by various systems, such as the systems illustrated in FIGS. 1A and 1F. In addition, various operations may be added, deleted, and/or modified. In some implementations, a request for deployment of content(s) of a label or BI Artifact(s) may be received instead of or in addition to a request for deployment of a deployment package. In some implementations, impact analysis may be automatically and/or manually initiated. For example, the SI system may automatically allow impact analysis for deployment packages. In some implementations, a default setting may allow the SI system to automatically initiate impact analysis. A user may request impact analysis not be performed on a deployment package. In some implementations, the determination of whether to allow impact analysis may be based on properties of the deployment package and/or the first BI Environment. For example, if a deployment package reverts to a previously successful deployment, impact analysis may be restricted. In some implementations, the SI system may determine the type of change (e.g., property set change, new BI Artifact included, and/or type of edit to a BI Artifact) to the BI environment is included in the deployment package. A determination of whether to allow impact analysis may be at least partially based on the type of change to the BI environment.

In some implementations, a request for instructions regarding impact analysis of the deployment package may be transmitted to the user. For example, a pop-up window or other notification may be transmitted on an interface generated (e.g., by the SI system) for presentation to the user. A user may indicate whether to allow impact analysis and/or whether to inhibit impact analysis.

In some implementations, the test(s) are performed on the deployment package, portions thereof, and/or related BI Artifacts may be selected by a user and/or the SI system. The order of execution of the tests may be determined by the SI system, in some implementations.

In some implementations, the SI system may version control the impact analysis. For example, the SI system may store versions of the deployment packages in the folder (e.g., temporary folder) of the first BI system. The SI system may associate test results generated during the impact analysis with the deployment package and/or versions thereof and/or with the versions of deployment packages that were copied to the folder (e.g. a temporary folder).

The SI system may generate an interface, such as a dashboard, based on the results of the tests. For example, the interface may include at least a portion of the test results for the new package in the folder and another package in the BI environment (e.g., a similar package, an old version of the package, etc.). The test results for the other package may be obtained from previously run test on the package, in some implementations. The SI may determine one or more metrics (e.g., percentage change, amount above or below a predetermined target value, etc.) and present the metrics on the dashboard.

In some implementations, the package may include a reference to one or more other components (e.g., BI Artifacts and/or property sets). When the tests are performed on the package in folder of the identified BI environment, the tests may be performed on one or more of the components, which are referenced in the package.

In some implementations, the package may not include at least a portion of the information for deployment of the package in the identified BI environment. For example, the package may not include a property set (e.g., to inhibit overwriting property sets applicable to a specific BI environment). The SI system may identify the portion of information for deployment not included in the package and retrieve the portion of the information for deployment from the identified BI environment (e.g., from a different version of the package deployed in the BI environment, from a similar package deployed in the BI environment, and/or from a default value for the BI environment). The SI system may copy the portion of information from the identified BI environment and include it in the identified package (e.g., copy the portion into the folder in which the identified package is to be deployed). The SI system may then test the identified package in the identified BI environment.

In some implementations, the SI system may compare the behavior of two or more BI environments in processing BI artifacts. For example, the SI system may cause a first BI environment to execute a first Report. The SI system may also, at the same time or a later time, request execution, in a second BI environment, of a copy of the Report, second Report (e.g., a copy of the Report from the first BI environment and deployed in the second BI environment). The copy of the Report, second Report may include one or more similarities (e.g., similar portions) to the first Report and/or one or more differences (e.g., different portions) to the first Report. For example, the second Report may include different content, properties, dependencies and/or location in the second BI environment.

In some implementations, the SI system may measure a first execution time used by the first BI environment to execute the first Report and a second execution time used by the second BI environment to execute the second Report. The SI system may then compare the first execution time and the second execution time.

In some implementations, once the first BI environment has finished executing the first Report, the SI system may identify the size of the output and/or content of the output generated by executing the first Report. The SI system, when the second BI environment has finished executing the second Report, may identify the size and/or content of the output generated by execution of the second Report. The SI system may compare the identified size(s) and/or identified output(s). In some implementations, the SI system may identify the SQL and/or MDX query and/or queries used to generate the output for the Report and the copy of the Report.

The SI system may then compare the output size(s), execution time(s), and/or content of the first Report and the second Report. The SI system may then store the comparison and/or analytics (e.g., percentage difference, etc.) based on the comparison in a memory coupled to the SI system. The SI system may transmit one or more notifications (e.g., to a user) that includes information related to one or more differences and/or similarities in the execution time, output size, and/or content of the two report outputs (e.g. first Report Output and/or second Report Output).

In some implementations, the SI system may store the one or more of the differences and/or one or more of the similarities. The SI system may transmit a notification (e.g., to the user) when the execution time, output size, and/or content of the report outputs (e.g., first Report output and/or second Report output) is greater than a predetermined value (e.g., variance based on previous execution times and/or default execution times, user provided execution time variance, etc.). The predetermined value may be specified by a user, for example, in seconds or a percentage. Although a process in which the SI system compares data between two environments has been described in this example, the SI system may also compare data (e.g., size, output content, execution time, and/or other appropriate data) from more than two BI environments.

The SI system may compare and/or identify one or more differences between the properties of BI Artifacts in a first BI environment and copies of the BI Artifacts in two or more other BI environments, in some implementations. A first BI Artifact may be associated with a first environment and a copy of the first BI Artifact may be associated in one or more second BI environments (e.g., when the first BI Artifact is deployed in a second BI environment, a copy of the first BI environment may be created in the second BI environment, in some implementations. For example, the SI system may identify one or more differences and/or similarities between security setting(s) on a first folder object in a first BI environment and a copy of the folder object, a second folder object, in a second BI environment. The SI system may store one or more of the identified differences and/or similarities. The SI system may transmit a notification (e.g., to the user) that includes information related to one or more of the identified differences and/or similarities. In some implementations, the user may identify one or more properties and the SI system may identify differences in one or more of the user identified properties (e.g., between a first BI Artifact in a first environment and a copy of the first BI Artifact in one or more second BI environments).

In some implementations, the first BI environment and the second BI environment may include different BI software or different versions of the same BI software. For example, the first BI environment is based at least partially on IBM Cognos version 10.1 and the second BI environment is based at least partially on IBM Cognos version 10.2.

Although FIG. 1A illustrates a simplified system in which BI environments and a SI system are utilized, other implementations may be utilized as appropriate. Although FIGS. 1B-1I illustrate an implementation of an example system in which one or more of the described processes and/or operations may be implemented, other implementations may be utilized.

Although FIG. 1A-1I illustrates examples of systems in which BI environments and a SI system are utilized, other implementations may be utilized as appropriate. U.S. Pat. No. 7,885,929 filed on Jan. 3, 2006 and entitled "Continuous Integration of Business Intelligence Software" describes example systems that may be at least partially utilized with various described processes and/or systems. In some implementations, one or more of the features of U.S. Pat. No. 7,885,929 may be utilized with one or more of the described systems and/or processes.

Although specific implementations have been described in various operations may be added, deleted, and/or modified. In some implementations, operation(s) of the described processes may be performed in combination with other processes. For example, process 300 may be performed in combination with other processes such as process 300, process 330, process 350, process 375, process 400, process 500, process 550, process 600, process 700, process 800, process 825, process 900, process 1000, process 1030, process 160, process 1200, process 1235, process 1300, process 1400, process 1500, and/or process 1600.

The processes described and/or operations thereof may be implemented by various systems, such as the system described in FIGS. 1A and 1F. For example, instructions stored in a memory of the system may be executed by a processor (e.g., processor of the SI system) to perform one or more of the described processes, described operations, and/or portions thereof. In addition, various operations may be added, deleted, and/or modified. In some implementations, operation(s) of the described processes may be performed in combination with other processes.

Although users have been described as a human, a user may be a person, a group of people, a person or persons interacting with one or more computers, and/or a computer system. Although in various implementations, users are described (e.g., as providing user information, validating, etc.), any security principal may be utilized. For example, a set of users to which a message is transmitted may a set of roles and/or groups to which a message may be transmitted.

In various implementations, specific BI ecosystem(s), BI environment(s), BI artifact(s), BI artifact properties(s), BI outputs, etc. have been described. However, the described system(s) and process(es) may be utilized with a variety of BI ecosystem(s), BI environment(s), BI artifact(s), BI artifact properties, BI artifact aspect(s), and/or BI outputs. For example, an IBM Cognos BI environment and/or various components of the IBM Cognos BI have been described in various implementations as examples; however, other types of BI environments and/or components of other types of BI environments may be utilized in the described systems and processes.

Systems that include computers, such as the BI environment, user devices, SI system, and/or external security sources, have been described in various implementations. The computer may include a processor that executes instructions and manipulates data to perform operations of the computer. The processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as lists of components of a BI ecosystem, communication protocols, sets of security principals, user identification information, format information, access lists, audit trails, historical data, business data, tests, assertions, set of users, versions (e.g., files, BI Artifacts, tests, assertions, etc.), shell BI Artifacts property sets, and/or any other appropriate information. In addition, various software may be stored on the memory. For example, instructions, such as operating systems and/or other types of software (e.g., instruction(s) and/or modules) may be stored on the memory. The instructions of the SI system and/or BI system may perform (e.g., when executed by a processor) various operations, such as the operations in the described systems and processes. For example, the instructions may identify and/or transmit for storage one or more versions, allow version control, communicate with external corporate version control systems, retrieve data, allow test creations, generate assertion sets for presentation to a user, generate testing suites, generate testing suite properties, allow deployment, allow messaging, and/or functions of the described systems and/or processes, and/or other appropriate operations. In some implementations, instructions may be combined as a single module or may be distinct modules. Modules may include various modules and/or sub-modules.

A communication interface may allow the computer to communicate with other components of the BI ecosystem, other repositories, and/or other computer systems. The communication interface may transmit data from the computer and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the described system stored in the memory may be updated and/or altered through the communication via network protocols (e.g., remotely through a firmware update and/or by a device directly coupled to the computer).

The computer may include a presentation interface to present data to a user, such as though a monitor and speakers. The presentation interface may facilitate receipt of selections from users.

Although example computers that may be used with the disclosure have been described, the described systems and processes may be implemented through various computers such as servers, as well as a server pool. For example, the BI environment may include a general-purpose computer (PC) a Macintosh, a workstation, a UNIX-based computer, a server computer, or any other suitable device. The computer may be adapted to execute any operating system including UNIX, Linux, Windows, or any other suitable operating system. The computer may include software and/or hardware in any combination suitable to provide access to data and/or translate data to an appropriate compatible format.

Although a single processor has been described, multiple processors may be used according to particular needs, and reference to processor is meant to include multiple processors where appropriate.

A memory of the computer may include any appropriate memory including a variety of repositories, such as, SQL databases, relational databases, object oriented databases, distributed databases, XML databases, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/or phase-change memory (PRAM).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

To provide for interaction with a User, the systems and techniques described here can be implemented on a computer having a display device (e.g., LCD (liquid crystal display) monitor) for displaying information to the User and a keyboard and a pointing device (e.g., a mouse or a trackpad) by which the User can provide input to the computer. Other kinds of devices can be used to provide for interaction with a User as well; for example, feedback provided to the User by an output device can be any form of sensory feedback (e.g., visual feedback, auditory feedback, or tactile feedback); and input from the User can be received in any form, including acoustic, speech, or tactile input.

A graphical user interface (GUI) of the interface(s) generated by the system may be displayed on a presentation interface of the user device, such as a monitor or screen. GUI may be operable to allow the user of a user device to interact with repositories and/or various interface(s). Generally, GUI provides a user with an efficient and user-friendly presentation of data provided by the system. GUI includes a plurality of displays having interactive fields, such as image icons, pull-down lists, fillable fields, and editable text operated by the user. And in one example, GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in the system and/or user device and efficiently presents the information to the User. In some implementations, GUI may present a web page embedding content. The server can accept data from a user device(s) via the web browser (e.g., Microsoft Internet Explorer or Safari) and return the appropriate Hyper Text Markup Language (HTML) or eXtensible Markup Language (XML) responses.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a test" includes a combination of two or more tests and reference to "an assertion" includes different types and/or combinations of assertions. As another example, "coupling" includes direct and/or indirect coupling of members (e.g., of the BI environment, SI system, and/or external security systems).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and operations described in the specification. As one of ordinary skill in the art will readily appreciate from the disclosure, processes, machines, manufacture, compositions of matter, means, methods, or operations, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or operations.

GLOSSARY OF SELECTED TERMS

While dictionary meanings are also implied by certain terms used herein, the following glossary of certain terms may be useful.

"Business Intelligence", which is also known by the acronym "BI", generally refers to computer-based techniques used in identifying, extracting, and analyzing business data. BI is a set of methodologies, processes, architectures, and technologies that transform raw data into meaningful and useful information used to enable more effective strategic, tactical, and operational insights and decision-making BI technologies provide historical, current, and predictive views of business operations. Common functions of BI technologies include reporting, online analytical processing, analytics, data mining, process mining, complex event processing, business performance management, benchmarking, text mining, and predictive analytics. While BI and competitive intelligence both support decision making, BI typically uses technologies, processes, and applications to analyze mostly internal, structured data and business processes while competitive intelligence gathers, analyzes and disseminates information with a topical focus on company competitors. Accordingly, BI can be broadly understood to include competitive intelligence as a subset thereof.

"Business Intelligence software" means software that provides BI functionality. Commercially available BI software includes: the Eclipse BIRT (Business Intelligence and Reporting Tools) Project from Actuate and the Eclipse Foundation; IBM Cognos®; SAP Business Objects®; MicroStrategy®; and others.

"Business Intelligence environment" means a single instance of the BI software, installed on one or more computers. The instance may be made up of many processes that may coordinate together in some fashion to provide BI functionality to a set of users. The instance may host content such as BI artifacts, and may provide insight into one or more datasources (generally abstracted by one or more BI metadata layers). Many organizations will have multiple BI environments that are targeted toward different purposes, for example:

Development—A BI environment where BI developers create or update BI content (e.g. BI artifacts). The content in this type of environment is not yet published to users.

QA—A BI environment where quality assurance ("QA") professionals (also known as testers) verify the proper functioning of BI artifacts. Developers usually build out new versions of BI content in the development environment and then, at periodic checkpoints, promote that BI content from the development BI environment into the QA BI environment so that it can be tested.

Production—A "live" BI environment where users are reviewing, analyzing, and using the BI content. BI content is not generally created or updated in this type of environment. Tested BI content is typically promoted from the QA BI environment into the production environment once it has passed through the organization's quality assurance processes.

"Business Intelligence ecosystem" means the entirety of the BI system, including the BI environment, the BI artifacts, metadata models, and configuration details contained within that environment or authored for the purpose of being deployed in that environment, the BI-accessible datasources utilized by the BI environment, the ETL (extract, transform, load) processes that push data into BI-accessible datasources, the upstream datasources from which the ETL processes pull data, and the computer(s) that host all of these components.

"Business Intelligence artifact" is a generic categorization for an authored BI object that resides in a BI environment and may be accessed by users (typically by utilizing the BI artifact to expose BI data from one or more datasources). Examples of BI artifacts in the context of IBM Cognos® include report, metadata model, query, analysis, dashboard, and business insight advanced object, among others. Certain properties are generally common to many types of BI artifacts, including: name; description; policy set (security policies); and screentip.

"Metadata model" means a BI abstraction layer that sits on top of one or more physical or virtualized datasources (a virtualized datasource is achieved using software that makes multiple physical datasources appear as a single datasource). The metadata model typically provides a relatively user- and business-friendly view of the underlying datasources, and may also record various properties and categorizations for individual or derived data elements. A small sampling of what can be defined in a metadata model includes: (a) certain data elements may be categorized into dimensional hierarchies (for example, a geographic hierarchy, a product hierarchy, a time based hierarchy (year>month>day>hour>second), among others); (b) aggregation rules or "roll up" behavior may be defined for facts or measures; (c) row level security strategies may be implemented; and (d) internationalization strategies for the data may be implemented. Most BI artifacts in a system are dependent upon a metadata model—in other words, such BI artifacts are typically written in terms of an associated metadata model, and when executed in a BI environment, the combination of supplied execution inputs, the security identity, the BI artifact and the associated metadata model are utilized by the BI software to query, summarize, post-process and render visualizations of data in the underlying datasources.

"Report" is a type of BI artifact. The successful execution of a report in the BI environment will produce one or more report outputs. A report typically has many properties, including: name; description; policy set (security policies); screentip; specification (also known as report specification); associated metadata model; and others. A report is linked with a specific metadata model and this linkage may be specified as a property on the report (or, optionally, in the report specification).

"Report specification" is one property of a report. It describes to the BI software how one or more datasources should be queried (most often through references to abstractions defined in the metadata model); how intermediate result sets should be summarized, post-processed, and potentially merged with other datasets; and how the resultant datasets should be rendered visually. Report specifications are typically authored within an editing tool provided by the vendor of the BI software (e.g., in IBM Cognos®, report specifications are edited in Report Studio). A report specification often encodes most, if not all, of the information necessary for a BI system to service an execution request (although other properties such as the associated metadata model or security policies may be recorded as other properties on the report itself).

"Report output" means an output produced by execution of a report or a report specification. A report output is typically one or more electronic files in a format selected by a user (e.g., PDF, HTML, CSV, and/or Excel, among others). In the case of web oriented report outputs (e.g. HTML, XHTML, or other suitable programming language), the report output file may contain references to other external resources (e.g. css files, JavaScript files, static images, dynamic images for charts or other visualizations, vector graphics, etc.).

The invention claimed is:

1. A method comprising:
   retrieving a first Business Intelligence Artifact Output, wherein the first Business Intelligence Artifact Output is generated by execution of a first version of a Business Intelligence Artifact in a first Business Intelligence Environment, and wherein a first specification associated with the first version of the Business Intelligence Artifact includes one or more specification markers, and wherein the first Business Intelligence Artifact Output comprises one or more output markers associated with at least one of the specification markers in the first specification;
   retrieving a second Business Intelligence Artifact Output, wherein the second Business Intelligence Artifact is generated by execution of a second version of the Business Intelligence Artifact in the first Business Intelligence environment, and wherein a second specification is associated with the second version of the Business Intelligence Artifact, and wherein the second specification includes one or more specification markers; and wherein the second Business Intelligence Artifact Output comprises one or more output markers associated with at least one of the specification markers in the second specification;
   retrieving a set of portions to ignore;
   identifying whether one or more differences exist between the first version of the Business Intelligence Artifact and the second version of the Business Intelligence Artifact based at least partially on a comparison of at least one of the output markers in the first Business Intelligence Artifact Output and at least one of the output markers in the second Business Intelligence Artifact Output; and
   determining whether one or more of the identified differences are included in the retrieved set of portions to ignore to determine whether differences exist between the first version of the Business Intelligence Artifact and the second version of the Business Intelligence Artifact.

2. The method of claim 1 wherein retrieving the first Business Intelligence Artifact Output comprises:
   retrieving the first version of the Business Intelligence Artifact, wherein one or more of the specification markers of the first specification identify portions of the specification; and
   executing the first version of the Business Intelligence Artifact in the first Business Intelligence Environment to generate the first Business Intelligence Artifact Output.

3. The method of claim 1 wherein retrieving the second Business Intelligence Artifact Output comprises:
   retrieving the second version of the Business Intelligence Artifact, wherein one or more of the specification markers of the first specification identify portions of the specification; and
   executing the second version of the Business Intelligence Artifact in the first Business Intelligence Environment to generate the second Business Intelligence Artifact Output.

4. The method of claim 1 wherein one or more of the specification markers identify portions of a specification.

5. The method of claim 1 wherein one or more of the output markers comprise a non-visual marker.

6. The method of claim 1 further comprising altering the first specification of the first version of the Business Intelligence Artifact such that one or more specification markers of the first specification are inserted into the first specification to identify one or more portions of the first specification.

7. The method of claim 1 further comprising altering the second specification of the second version of the Business Intelligence Artifact such that one or more specification markers of the second specification are inserted into the second specification to identify one or more portions of the second specification.

8. The method of claim 1 further comprising comparing the first Business Intelligence Artifact Output to the second Business Intelligence Artifact Output, and wherein comparing the first Business Intelligence Artifact Output to the second Business Intelligence Artifact Output comprises:
   identifying one or more first output portions of the first Business Intelligence Artifact Output which are not associated with one or more portions identified in the retrieved set of portions to ignore;
   identifying one or more second output portions of the second Business Intelligence Artifact Output which are not associated with one or more of the portions identified in the retrieved set of portions to ignore; and
   comparing one or more of the first output portions of the first Business Intelligence Artifact output to one or more of the second output portions of the second Business Intelligence Artifact.

9. The method of claim 1 further comprising identifying one or more differences that exist between the first version of the Business Intelligence Artifact and the second version of the Business Intelligence Artifact based at least partially on the determination of whether one or more of the identified differences are included in the retrieved set of portions to ignore.

10. The method of claim 9 further comprising generating a notification, to be presented to a user, based at least partially on one or more of the identified differences between the first version of the Business Intelligence Artifact and the second version of the Business Intelligence Artifact.

11. The method of claim 9 further comprising saving, in a memory of the Supplemental system, the identified differences between the first version of the Business Intelligence Artifact and the second version of the Business Intelligence Artifact.

12. The method of claim 9 further comprising identifying one or more similarities that exist between the first version of the Business Intelligence Artifact and the second version of the Business Intelligence Artifact based at least partially on the comparison of the first Business Intelligence Artifact Output to the second Business Intelligence Artifact Output.

13. The method of claim 1 further comprising determining that one or more differences do not exist between the first version of the Business Intelligence Artifact and the second version of the Business Intelligence Artifact when each of the identified differences are included in the retrieved set of portions to ignore.

14. A method comprising:
retrieving a first instrumented Business Intelligence Artifact Output produced from the execution of a first version of a first Business Intelligence Artifact;
retrieving at least one first assertion associated with the first Business Intelligence Artifact, wherein one or more specification portions to ignore from the first version of the first Business Intelligence Artifact are associated with at least one of the first assertions;
retrieving a second version of the first Business Intelligence Artifact;
adjusting the specification of the second version of the first Business Intelligence artifact to produce a second instrumented specification, wherein the second instrumented specification comprises one or more second specification markers to uniquely identify portions of the specification of the second version of the first Business Intelligence Artifact;
executing the second instrumented specification in the Business Intelligence environment to produce a second instrumented Business Intelligence Artifact Output, wherein the second instrumented Business Intelligence Artifact Output comprises one or more associated output markers emitted by one or more of the second specification markers of the second instrumented specification;
comparing the second instrumented Business Intelligence Artifact Output to the first instrumented Business Intelligence Artifact Output such that output portions that are associated with the specification portions designated in the specification portions to ignore are restricted from being compared; and
generating an indication that at least one of the first assertions has failed if one or more differences are identified based on the comparison.

15. The method of claim 14 wherein retrieving a first instrumented Business Intelligence Artifact Output produced from the execution of a first version of a first Business Intelligence artifact further comprises:
adjusting the specification of the first version of the first Business Intelligence artifact to produce a first instrumented specification, wherein the first instrumented specification comprises one or more first specification markers to uniquely identify portions of the specification of the first version of the first Business Intelligence Artifact, and wherein one or more of the first specification markers are adapted to emit one or more associated output markers into a resultant Business Intelligence Artifact output; and
executing the first instrumented specification in a Business Intelligence environment to produce a first instrumented Business Intelligence Artifact Output, wherein the first instrumented Business Intelligence Artifact Output comprises one or more of the associated output markers emitted by one or more of the first specification markers of the first instrumented specification.

16. The method of claim 15 wherein adjusting the specification of the first version of the first Business Intelligence Artifact comprises instrumenting the specification of the first version of the first Business Intelligence Artifact such that one or more of the first specification markers are injected into the specification of the first version of the first Business Intelligence Artifact.

17. The method of claim 14 wherein adjusting the specification of the second version of the first BI Artifact comprises instrumenting the specification of the second version of the first Business Intelligence Artifact such that one or more of the second specification markers are injected into the specification of the second version of the first Business Intelligence Artifact.

18. The method of claim 14 wherein the first instrumented Business Intelligence Artifact Output is associated with at least one of the first assertions.

19. The method of claim 14 further comprising storing, in a memory, the first instrumented Business Intelligence Artifact Output and an association between the first instrumented Business Intelligence Artifact Output and the first version of the Business Intelligence Artifact, wherein the memory comprises a memory of a Supplemental system.

20. The method of claim 14 further comprising generating an indication that at least one of the first assertions has passed if one or more differences are not identified based on the comparison.

* * * * *